United States Patent
Tateishi et al.

(10) Patent No.: US 10,711,148 B2
(45) Date of Patent: Jul. 14, 2020

(54) COLORING COMPOSITION, INK JET RECORDING INK, INK JET RECORDING METHOD, AND INK JET PRINTER CARTRIDGE

(71) Applicant: FUJIFILM Corporation, Tokyo (JP)

(72) Inventors: Keiichi Tateishi, Kanagawa (JP);
Takashi Saitou, Kanagawa (JP);
Yusuke Sakai, Kanagawa (JP);
Yoshihiko Fujie, Kanagawa (JP);
Yoshiaki Nagata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 58 days.

(21) Appl. No.: 16/057,182

(22) Filed: Aug. 7, 2018

(65) Prior Publication Data

US 2018/0340085 A1 Nov. 29, 2018

Related U.S. Application Data

(63) Continuation of application No. PCT/JP2017/007215, filed on Feb. 24, 2017.

(30) Foreign Application Priority Data

Feb. 24, 2016 (JP) .................................. 2016-032829
Feb. 21, 2017 (JP) .................................. 2017-030497

(51) Int. Cl.
*C09D 11/328* (2014.01)
*C09D 11/037* (2014.01)
(Continued)

(52) U.S. Cl.
CPC ............... *C09D 11/328* (2013.01); *B41J 2/01* (2013.01); *B41M 5/0023* (2013.01); *C09B 67/0041* (2013.01); *C09D 11/037* (2013.01)

(58) Field of Classification Search
None
See application file for complete search history.

(56) References Cited

U.S. PATENT DOCUMENTS

| 8,628,588 B2 * | 1/2014 | Fujie | ....................... C09B 11/24 106/31.47 |
| 8,636,814 B2 * | 1/2014 | Fujie | .................... C09D 11/328 106/31.47 |

(Continued)

FOREIGN PATENT DOCUMENTS

| CN | 104011142 A | 8/2014 |
| EP | 3098268 A1 | 11/2016 |

(Continued)

OTHER PUBLICATIONS

Communication dated Jan. 30, 2019, from the European Patent Office in counterpart European Application No. 17756669.2.

(Continued)

*Primary Examiner* — Helene Klemanski
(74) *Attorney, Agent, or Firm* — Sughrue Mion, PLLC

(57) ABSTRACT

Provided are a coloring composition including a compound represented by Formula (1) shown in this specification and a compound represented by Formula (D) shown in this specification, an ink jet recording ink including the coloring composition, an ink jet recording method using the ink jet recording ink, and an ink jet printer cartridge that is filled with the ink jet recording ink.

11 Claims, 2 Drawing Sheets

(51) Int. Cl.
  *C09B 11/24* (2006.01)
  *C09B 67/00* (2006.01)
  *B41J 2/01* (2006.01)
  *C09B 67/22* (2006.01)
  *B41M 5/00* (2006.01)

(56) References Cited

U.S. PATENT DOCUMENTS

| | | | | |
|---|---|---|---|---|
| 9,023,138 | B2* | 5/2015 | Fujie | C09B 29/0037 106/31.43 |
| 9,023,139 | B2* | 5/2015 | Fujie | C09B 11/24 106/31.43 |
| 9,701,839 | B2* | 7/2017 | Fujie | C09B 11/28 |
| 9,963,605 | B2* | 5/2018 | Fujie | C09D 11/328 |
| 10,487,210 | B2* | 11/2019 | Yagi | B41J 3/4078 |
| 2007/0052783 | A1* | 3/2007 | Taguchi | B41M 5/5227 347/100 |
| 2011/0067598 | A1* | 3/2011 | Takahashi | C09B 11/20 106/31.43 |
| 2014/0285567 | A1* | 9/2014 | Suenaga | B41J 2/17503 347/20 |
| 2014/0305336 | A1 | 10/2014 | Fujie et al. | |
| 2016/0312032 | A1 | 10/2016 | Fujie et al. | |
| 2017/0101534 | A1* | 4/2017 | Fujie | C09D 11/328 |
| 2017/0210928 | A1 | 7/2017 | Fujie et al. | |
| 2018/0127584 | A1* | 5/2018 | Sakai | B41J 2/01 |
| 2018/0340085 | A1* | 11/2018 | Tateishi | B41J 2/01 |
| 2018/0346743 | A1* | 12/2018 | Tateishi | C09D 11/328 |
| 2018/0371254 | A1* | 12/2018 | Tateishi | C09D 11/328 |
| 2019/0218408 | A1* | 7/2019 | Tateishi | C09D 11/033 |

FOREIGN PATENT DOCUMENTS

| | | |
|---|---|---|
| EP | 3321328 A1 | 5/2018 |
| JP | 2013-133397 A | 7/2013 |
| JP | 2016-47908 A | 4/2016 |
| JP | 2016-69655 A | 5/2016 |
| JP | 2016-069657 A | 5/2016 |
| TW | 201529563 A | 8/2015 |
| WO | 2013/099677 A1 | 7/2013 |
| WO | 2015-105108 A1 | 7/2015 |
| WO | 2015/147112 A1 | 10/2015 |
| WO | 2016/052685 A1 | 4/2016 |
| WO | 2016/052688 A1 | 4/2016 |
| WO | 2017/006939 A1 | 1/2017 |

OTHER PUBLICATIONS

Communication dated May 14, 2019, issued by the Japanese Patent Office in counterpart Japanese Application No. 2018-501811.
Search Report dated Apr. 11, 2017 by the International Searching Authority in counterpart International Patent Application No. PCT/JP2017/007215 (PCT/ISA/210).
International Preliminary Report on Patentability dated Mar. 6, 2018 by the International Searching Authority in counterpart International Patent Application No. PCT/JP2017/007215. (PCT/IPEA/409).
Written Opinion (PCT/ISA/237) issued by the International Searching Authority in corresponding International Application No. PCT/JP2017/007215, dated Apr. 11, 2017.
Communication dated Apr. 2, 2019, issued by the Chinese Patent Office in counterpart Chinese Application No. 201780013204.0.
Office Action dated Mar. 11, 2020, issued by the State Intellectual Property Office of P.R. China in counterpart Chinese Application No. 201780013204.0.
Communication dated Apr. 28, 2020 from the European Patent Office in European application No. 17756669.2.

* cited by examiner

COLORING COMPOSITION, INK JET RECORDING INK, INK JET RECORDING METHOD, AND INK JET PRINTER CARTRIDGE

CROSS REFERENCE TO RELATED APPLICATION

This is a continuation of International Application No. PCT/JP2017/007215 filed on Feb. 24, 2017, and claims priority from Japanese Patent Application No. 2016-032829 filed on Feb. 24, 2016 and priority from Japanese Patent Application No. 2017-030497 filed on Feb. 21, 2017, the entire disclosures of which are incorporated therein by reference.

BACKGROUND OF THE INVENTION

1. Field of the Invention

The present invention relates to a coloring composition, an ink jet recording ink, an ink jet recording method, and an ink jet printer cartridge.

2. Description of the Related Art

In the ink jet recording method, as is well-known in the related art, small ink droplets are jetted to be attached to a recording medium such as paper to perform printing. In this printing method, a high-resolution and high-quality image can be printed rapidly and simply using an inexpensive device. Particularly in color printing, recently, a technique of the printing method has been developed as an image forming method capable of replacing photography.

For example, JP2013-133397A and WO2015/105108A describe an ink jet recording ink including a xanthene compound.

SUMMARY OF THE INVENTION

However, in the dye field, further improvement of performance is required.

An object of the present invention is to provide: a coloring composition with which an image having excellent color, saturation, and adhesion (printing density) and having excellent light fastness, ozone fastness, and moisture resistance can be formed and that has excellent jetting stability in an ink jet printer; an ink jet recording ink including the coloring composition; an ink jet recording method using the ink jet recording ink; and an ink jet printer cartridge that is filled with the ink jet recording ink.

The present inventors performed a thorough investigation and found that the above-described object can be achieved by the following means. In the present invention, by using a compound represented by Formula (1) and an azo compound represented by Formula (D) in combination, high adhesion (printing density) and image fastness (light fastness, ozone fastness, and moisture resistance) can be realized while reducing the dye concentration (contributing to improvement of jetting stability of the ink) in the coloring composition (ink). In the present invention, it is presumed that, by using different coloring agent mother nuclei having excellent color, saturation, and high adhesion in combination, the adhesion and the image fastness can be satisfied at a high level as compared to a case where one of the coloring agent mother nuclei is used alone.

The detailed reason is not clear but is presumed to be that, in a case where a xanthene dye represented by Formula (1) and an azo dye represented by Formula (D) are present together (for example, in an ink jet recording ink, or a printed material prepared using an ink jet recording method; on paper for ink jet recording), a physicochemical interaction hardly occurs, and required performance can be realized without causing a large drawback such as deterioration in light fastness or deterioration in ink jetting stability.

<1> A coloring composition comprising:
a compound represented by the following Formula (1); and
a compound represented by the following Formula (D),

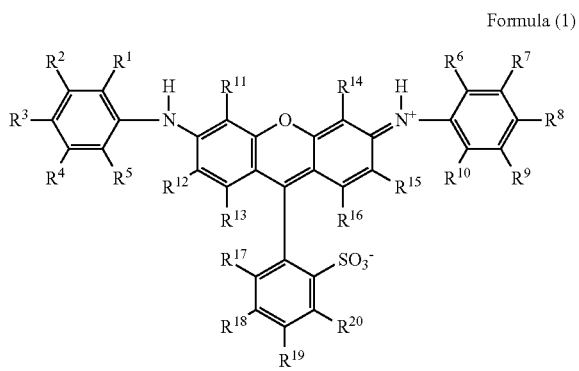

Formula (1)

in Formula (1), $R^1$, $R^5$, $R^6$, and $R^{10}$ each independently represent an alkyl group,
$R^4$, $R^9$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent,
$R^2$, $R^3$, $R^7$, and $R^8$ each independently represent a hydrogen atom, an alkyl group, or a substituent represented by the following Formula (A), and
at least one of $R^2$, $R^3$, $R^7$, or $R^8$ represents a substituent represented by the following Formula (A),

Formula (A)

in Formula (A), X represents a substituent represented by the following Formula (X1), (X2), or (X3), and
* represents a direct bond to a benzene ring,

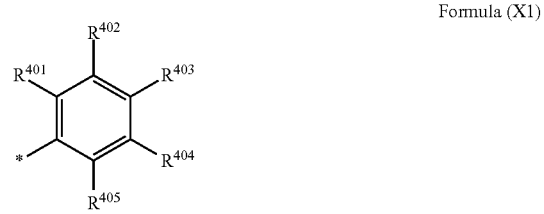

Formula (X1)

in Formula (X1), $R^{401}$, $R^{402}$, $R^{403}$, $R^{404}$, and $R^{405}$ each independently represent a hydrogen atom or a substituent,
$R^{401}$, $R^{402}$, $R^{403}$, $R^{404}$, and $R^{405}$ satisfy the following condition (i) or (ii),
* represents a direct bond to a sulfur atom,
the condition (i): at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group, and the condition (ii): at least two of $R^{401}$, $R^{402}$, $R^{403}$, $R^{404}$, or $R^{405}$ represent a carboxyl group,

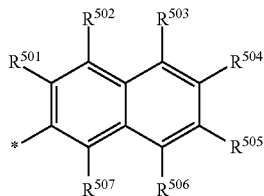

Formula (X2)

in Formula (X2), $R^{501}$, $R^{502}$, $R^{503}$, $R^{504}$, $R^{505}$, $R^{506}$, and $R^{507}$ each independently represent a hydrogen atom or a substituent, $R^{501}$, $R^{502}$, $R^{503}$, $R^{504}$, $R^{505}$, $R^{506}$, and $R^{507}$ satisfy the following condition (iii) or (iv),

* represents a direct bond to a sulfur atom, the condition (iii): at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group, and the condition (iv): at least two of $R^{501}$, $R^{502}$, $R^{503}$, $R^{504}$, $R^{505}$, $R^{506}$, or $R^{507}$ represent a carboxyl group,

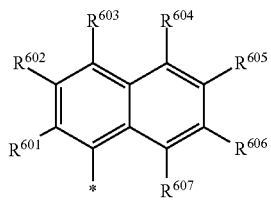

Formula (X3)

in Formula (X3), $R^{601}$, $R^{602}$, $R^{603}$, $R^{604}$, $R^{605}$, $R^{606}$, and $R^{607}$ each independently represent a hydrogen atom or a substituent, $R^{601}$, $R^{602}$, $R^{603}$, $R^{604}$, $R^{605}$, $R^{606}$, and $R^{607}$ satisfy the following condition (v) or (vi),

* represents a direct bond to a sulfur atom, the condition (v): at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group, and the condition (vi): at least two of $R^{601}$, $R^{602}$, $R^{603}$, $R^{604}$, $R^{605}$, $R^{606}$, or $R^{607}$ represent a carboxyl group,

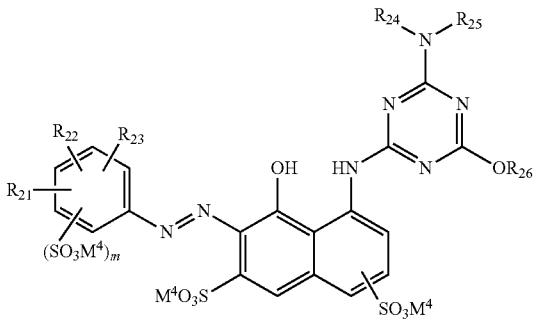

Formula (D)

in Formula (D), $R_{21}$, $R_{22}$, and $R_{23}$ each independently represent a hydrogen atom, a substituted or unsubstituted alkyl group having 1 to 9 carbon atoms, an alkoxy group having 1 to 9 carbon atoms, a halogen atom, a hydroxyl group, a substituted or unsubstituted carbamoyl group, a substituted or unsubstituted sulfamoyl group, a substituted or unsubstituted amino group, a nitro group, a sulfonate group, a substituted or unsubstituted alkylsulfonyl group having 1 to 9 carbon atoms, an arylsulfonyl group having 6 to 15 carbon atoms, a carboxyl group, or a carboxylate group, m represents 0, 1, or 2, $R_{24}$, $R_{25}$, and $R_{26}$ each independently represent a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group, or a substituted or unsubstituted heterocyclic group, $M^4$ represents a hydrogen atom or a counter cation, and $M^4$'s may be the same as or different from each other, <2> The coloring composition according to <1>, in which X in Formula (A) represents a substituent represented by Formula (X1), and $R^{401}$, $R^{402}$, $R^{403}$, $R^{404}$, and $R^{405}$ in Formula (X1) satisfy the condition (i).

<3> The coloring composition according to <1>, in which X in Formula (A) represents a substituent represented by Formula (X2), and $R^{501}$, $R^{502}$, $R^{503}$, $R^{504}$, $R^{505}$, $R^{506}$, and $R^{507}$ in Formula (X2) satisfy the condition (iii).

<4> The coloring composition according to <1>, in which X in Formula (A) represents a substituent represented by Formula (X3), and $R^{601}$, $R^{602}$, $R^{603}$, $R^{604}$, $R^{605}$, $R^{606}$, and $R^{607}$ in Formula (X3) satisfy the condition (v).

<5> The coloring composition according to any one of <1> to <4>, in which a total content of the compound represented by Formula (1) and the compound represented by Formula (D) is 5.0 mass % or lower with respect to the coloring composition.

<6> The coloring composition according to any one of <1> to <5> in which a mass ratio $W_1/W_D$ of a content $W_1$ of the compound represented by Formula (1) to a content $W_D$ of the compound represented by Formula (D) is 99/1 to 50/50.

<7> The coloring composition according to any one of <1> to <6>, further comprising a coloring material other than the compound represented by Formula (1) and the compound represented by Formula (D).

<8> An ink jet recording ink comprising the coloring composition according to any one of <1> to <7>.

<9> An ink jet recording method using the ink jet recording ink according to <8>.

<10> An ink jet printer cartridge that is filled with the ink jet recording ink according to <8>.

According to the present invention, it is possible to provide: a coloring composition with which an image having excellent color, saturation, and adhesion (printing density) and having excellent light fastness, ozone fastness, and moisture resistance can be formed and that has excellent jetting stability in an ink jet printer; an ink jet recording ink including the coloring composition; an ink jet recording method using the ink jet recording ink; and an ink jet printer cartridge that is filled with the ink jet recording ink.

DESCRIPTION OF THE PREFERRED EMBODIMENTS

Figure 1:
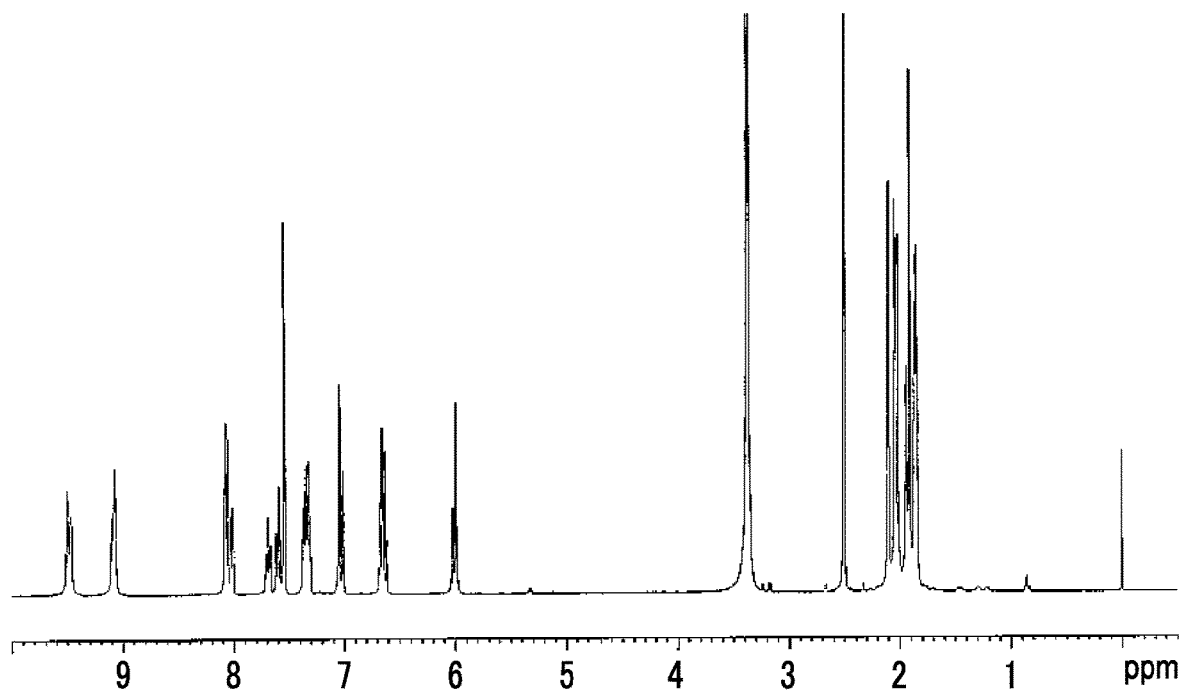
FIG. 1 is a diagram showing a $^1$H-NMR (nuclear magnetic resonance) spectrum of an exemplary compound (1-11) in dimethyl sulfoxide-d6.

Hereinafter, the present invention will be described in detail.

First, specific examples of a substituent in the present invention are defined as a substituent group A.

(Substituent Group A)

Examples of the substituent group A include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, a silyl group, and an ionic hydrophilic group. These substituents may further have a substituent, and examples of this substituent include a group selected from the above-described substituent group A.

Examples of the halogen atom include a fluorine atom, a chlorine atom, a bromine atom, and an iodine atom.

Examples of the alkyl group include a linear, branched, or cyclic substituted or unsubstituted alkyl group. In addition, a cycloalkyl group, a bicycloalkyl group, a tricycloalkyl structure and the like having many ring structures are also included. Alkyl groups (for example, an alkyl group in an alkoxy group or an alkylthio group) in substituents described below are also included in the examples of the above-described alkyl group.

As the alkyl group, an alkyl group having 1 to 30 carbon atoms is preferable, and examples thereof include a methyl group, an ethyl group, an n-propyl group, an i-propyl group, a t-butyl group, an n-octyl group, an eicosyl group, a 2-chloroethyl group, a 2-cyanoethyl group, and a 2-ethylhexyl group. As the cycloalkyl group, a substituted or unsubstituted cycloalkyl group having 3 to 30 carbon atoms is preferable, and examples thereof include a cyclohexyl group, a cyclopentyl group, and a 4-n-dodecylcyclohexyl group. As the bicycloalkyl group, a substituted or unsubstituted bicycloalkyl group having 5 to 30 carbon atoms is preferable, that is, a monovalent group obtained by removing one hydrogen atom from bicycloalkane having 5 to 30 carbon atoms is preferable, and examples thereof include a bicyclo[1,2,2]heptan-2-yl group and a bicyclo[2,2,2]octan-3-yl group.

Examples of the aralkyl group include a substituted or unsubstituted aralkyl group. As the substituted or unsubstituted aralkyl group, an aralkyl group having 7 to 30 carbon atoms is preferable, and examples thereof include a benzyl group and a 2-phenethyl group.

Examples of the alkenyl group include a linear, branched, or cyclic substituted or unsubstituted alkenyl group. In addition, a cycloalkenyl group and a bicycloalkenyl group are also included.

As the alkenyl group, a substituted or unsubstituted alkenyl group having 2 to 30 carbon atoms is preferable, and examples thereof include a vinyl group, an allyl group, a prenyl group, a geranyl group, and an oleyl group. As the cycloalkenyl group, a substituted or unsubstituted cycloalkenyl group having 3 to 30 carbon atoms is preferable, that is, a monovalent group obtained by removing one hydrogen atom from cycloalkene having 3 to 30 carbon atoms is preferable, and examples thereof include a 2-cyclopenten-1-yl group and a 2-cyclohexen-1-yl group. As the bicycloalkenyl group, a substituted or unsubstituted bicycloalkenyl group can be used. A substituted or unsubstituted bicycloalkenyl group having 5 to 30 carbon atoms is preferable, that is, a monovalent group obtained by removing one hydrogen atom from bicycloalkene having one double bond is preferable, and examples thereof include a bicyclo[2,2,1]hept-2-en-1-yl group and a bicyclo[2,2,2]oct-2-en-4-yl group.

As the alkynyl group, a substituted or unsubstituted alkynyl group having 2 to 30 carbon atoms is preferable, and examples thereof include an ethynyl group, a propargyl group, and a trimethylsilylethynyl group.

As the aryl group, a substituted or unsubstituted aryl group having 6 to 30 carbon atoms is preferable, and examples thereof include a phenyl group, a p-tolyl group, a naphthyl group, an m-chlorophenyl group, an o-hexadecanoylaminophenyl group.

As the heterocyclic group, a monovalent group obtained by removing one hydrogen atom from a 5- or 6-membered substituted or unsubstituted aromatic or nonaromatic heterocyclic compound is preferable, and a 5- or 6-membered aromatic heterocyclic group having 3 to 30 carbon atoms is more preferable, and examples thereof include a 2-furyl group, a 2-thienyl group, a 2-pyrimidinyl group, and a 2-benzothiazolyl group. Examples of the nonaromatic heterocyclic group include a morpholinyl group.

As the alkoxy group, a substituted or unsubstituted alkoxy group having 1 to 30 carbon atoms is preferable, and examples thereof include a methoxy group, an ethoxy group, an isopropoxy group, a t-butoxy group, an n-octyloxy group, and a 2-methoxyethoxy group.

As the aryloxy group, a substituted or unsubstituted aryloxy group having 6 to 30 carbon atoms is preferable, and examples thereof include a phenoxy group, a 2-methylphenoxy group, a 4-t-butylphenoxy group, a 3-nitrophenoxy group, and a 2-tetradecanoylaminophenoxy group.

As the silyloxy group, a substituted or unsubstituted silyloxy group having 0 to 20 carbon atoms is preferable, and examples thereof include a trimethylsilyloxy group and a diphenylmethylsilyloxy group.

As the heterocyclic oxy group, a substituted or unsubstituted heterocyclic oxy group having 2 to 30 carbon atoms is preferable, and examples thereof include a 1-phenyltetrazole-5-oxy group and a 2-tetrahydropyranyloxy group.

As the acyloxy group, a formyloxy group, a substituted or unsubstituted alkylcarbonyloxy group having 2 to 30 carbon atoms, or a substituted or unsubstituted arylcarbonyloxy group having 6 to 30 carbon atoms is preferable, and examples thereof include an acetyloxy group, a pivaloyloxy group, a stearoyloxy group, a benzoyloxy group, and a p-methoxyphenylcarbonyloxy group.

As the carbamoyloxy group, a substituted or unsubstituted carbamoyloxy group having 1 to 30 carbon atoms is preferable, and examples thereof include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

As the alkoxycarbonyloxy group, a substituted or unsubstituted alkoxycarbonyloxy group having 2 to 30 carbon atoms is preferable, and examples thereof include a methoxycarbonyloxy group, an ethoxycarbonyloxy group, a t-butoxycarbonyloxy group, and an n-octylcarbonyloxy group.

As the aryloxycarbonyloxy group, a substituted or unsubstituted aryloxycarbonyloxy group having 7 to 30 carbon atoms is preferable, and examples thereof include a phenoxycarbonyloxy group, a p-methoxyphenoxycarbonyloxy group, and a p-n-hexadecyloxyphenoxycarbonyloxy group.

Examples of the amino group include an alkylamino group, an arylamino group, and a heterocyclic amino group. As the amino group, an amino group, a substituted or unsubstituted alkylamino group having 1 to 30 carbon atoms, a substituted or unsubstituted anilino group having 6 to 30 carbon atoms is preferable, and examples thereof include a methylamino group, a dimethylamino group, an anilino group, an N-methyl-anilino group, a diphenylamino group, and a triazinylamino group.

As the acylamino group, a formylamino group, a substituted or unsubstituted alkylcarbonylamino group having 1 to 30 carbon atoms, or a substituted or unsubstituted arylcarbonylamino group having 6 to 30 carbon atoms is preferable, and examples thereof include an acetylamino group, a pivaloylamino group, a lauroylamino group, a benzoylamino group, and a 3,4,5-tri-n-octyloxyphenylcarbonylamino group.

As the aminocarbonylamino group, a substituted or unsubstituted aminocarbonylamino group having 1 to 30 carbon atoms is preferable, and examples thereof include a carbamoylamino group, an N,N-dimethylaminocarbonylamino group, an N,N-diethylaminocarbonylamino group, and a morpholinocarbonylamino group.

As the alkoxycarbonylamino group, a substituted or unsubstituted alkoxycarbonylamino group having 2 to 30 carbon atoms is preferable, and examples thereof include a methoxycarbonylamino group, an ethoxycarbonylamino group, a t-butoxycarbonylamino group, an n-octadecyloxycarbonylamino group, and an N-methyl-methoxycarbonylamino group.

As the aryloxycarbonylamino group, a substituted or unsubstituted aryloxycarbonylamino group having 7 to 30 carbon atoms is preferable, and examples thereof include a phenoxycarbonylamino group, a p-chlorophenoxycarbonylamino group, and an m-n-octyloxyphenoxycarbonylamino group.

As the sulfamoylamino group, a substituted or unsubstituted sulfamoylamino group having 0 to 30 carbon atoms is preferable, and examples thereof include a sulfamoylamino group, an N,N-dimethylaminosulfonylamino group, and an N-n-octylaminosulfonylamino group.

As the alkyl- or aryl-sulfonylamino group, a substituted or unsubstituted alkylsulfonylamino group having L to 30 carbon atoms or a substituted or unsubstituted arylsulfonylamino group having 6 to 30 carbon atoms is preferable, and examples thereof include a methylsulfonylamino group, a butylsulfonylamino group, a phenylsulfonylamino group, a 2,3,5-trichlorophenylsulfonylamino group, and a p-methylphenylsulfonylamino group.

As the alkylthio group, a substituted or unsubstituted alkylthio group having 1 to 30 carbon atoms is preferable, and examples thereof include a methylthio group, an ethylthio group, and an n-hexadecylthio group.

As the arylthio group, a substituted or unsubstituted arylthio group having 6 to 30 carbon atoms is preferable, and examples thereof include a phenylthio group, a p-chlorophenylthio group, and an m-methoxyphenylthio group.

As the heterocyclic thio group, a substituted or unsubstituted heterocyclic thio group having 2 to 30 carbon atoms is preferable, and examples thereof include a 2-benzothiazolylthio group and a 1-phenyltetrazole-5-ylthio group.

As the sulfamoyl group, a substituted or unsubstituted sulfamoyl group having 0 to 30 carbon atoms is preferable, and examples thereof include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group.

As the alkyl- or aryl-sulfinyl group, a substituted or unsubstituted alkylsulfinyl group having 1 to 30 carbon atoms or a substituted or unsubstituted arylsulfinyl group having 6 to 30 carbon atoms is preferable, and examples thereof include a methylsulfinyl group, an ethylsulfinyl group, a phenylsulfinyl group, and a p-methylphenylsulfinyl group.

As the alkyl- or aryl-sulfonyl group, a substituted or unsubstituted alkylsulfonyl group having 1 to 30 carbon atoms or a substituted or unsubstituted arylsulfonyl group having 6 to 30 carbon atoms is preferable, and examples thereof include a methylsulfonyl group, an ethylsulfonyl group, a phenylsulfonyl group, and a p-methylphenylsulfonyl group.

As the acyl group, a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 2 to 30 carbon atoms and being bonded to a carbonyl group through a carbon atom is preferable, and examples thereof include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

As the aryloxycarbonyl group, a substituted or unsubstituted aryloxycarbonyl group having 7 to 30 carbon atoms is preferable, and examples thereof include a phenoxycarbonyl group, an o-chlorophenoxycarbonyl group, an m-nitrophenoxycarbonyl group, and a p-t-butylphenoxycarbonyl group.

As the alkoxycarbonyl group, a substituted or unsubstituted alkoxycarbonyl group having 2 to 30 carbon atoms is preferable, and examples thereof include a methoxycarbonyl group, an ethoxycarbonyl group, a t-butoxycarbonyl group, and an n-octadecyloxycarbonyl group.

As the carbamoyl group, a substituted or unsubstituted carbamoyl group having 1 to 30 carbon atoms is preferable, and examples thereof include a carbamoyl group, an N-methylcarbamoyl group, an N,N-dimethylcarbamoyl group, an N,N-di-n-octylcarbamoyl group, and an N-(methylsulfonyl)carbamoyl group.

As the aryl- or heterocyclic azo group, a substituted or unsubstituted aryl azo group having 6 to 30 carbon atoms or a substituted or unsubstituted heterocyclic azo group having 3 to 30 carbon atoms is preferable, and examples thereof include a phenylazo group, a p-chlorophenylazo group, and a 5-ethylthio-1,3,4-thiadiazol-2-ylazo group.

As the imido group, for example, an N-succinimido group or an N-phthalimido group is preferable.

As the phosphino group, a substituted or unsubstituted phosphino group having 0 to 30 carbon atoms is preferable, and examples thereof include a dimethylphosphino group, a diphenylphosphino group, and a methylphenoxyphosphino group.

As the phosphinyl group, a substituted or unsubstituted phosphinyl group having 0 to 30 carbon atoms is preferable, and examples thereof include a phosphinyl group, a dioctyloxyphosphinyl group, and a diethoxyphosphinyl group.

As the phosphinyloxy group, a substituted or unsubstituted phosphinyloxy group having 0 to 30 carbon atoms is preferable, and examples thereof include a diphenoxyphosphinyloxy group and a dioctyloxyphosphinyloxy group.

As the phosphinylamino group, a substituted or unsubstituted phosphinylamino group having 0 to 30 carbon atoms is preferable, and examples thereof include a dimethoxyphosphinylamino group and a dimethylaminophosphinylamino group.

As the silyl group, a substituted or unsubstituted silyl group having 0 to 30 carbon atoms is preferable, and examples thereof include a trimethylsilyl group, a t-butyldimethylsilyl group, and a phenyldimethylsilyl group.

Examples of the ionic hydrophilic group include a sulfo group, a carboxyl group, a thiocarboxyl group, a sulfino group, a phosphono group, a dihydroxyphosphino group, a quaternary ammonium group, and a hydroxyl group which is substituted with an s-triazine ring. In particular, a sulfo group, a carboxyl group, or a hydroxyl group which is substituted with an s-triazine ring is preferable, and a sulfo group or a carboxyl group is more preferable. In addition, the ionic hydrophilic group may be a cation or an anion, and a state including a cation or an anion is called a salt. In addition, the carboxyl group, the phosphono group, the sulfo group, or the hydroxyl group may be in the form of a salt, and examples of a counter cation which forms a salt with the carboxyl group, the phosphono group, or the sulfo group include an ammonium ion, an alkali metal ion (for example, a lithium ion, a sodium ion, or a potassium ion), and an organic cation (for example, a tetramethylammonium ion, a tetramethylguanidium ion, or tetramethylphosphonium ion). Among these, a lithium salt, a sodium salt, a potassium salt, or an ammonium salt is preferable, a sodium salt or a mixed salt containing a sodium salt as a major component is more preferable, and a sodium salt is most preferable.

In the present invention, in a case where a compound is a salt, the salt is dissociated and present in a water-soluble ink in the form of ions.

[Compound Represented by Formula (1)]

A compound represented by the following Formula (1) will be described.

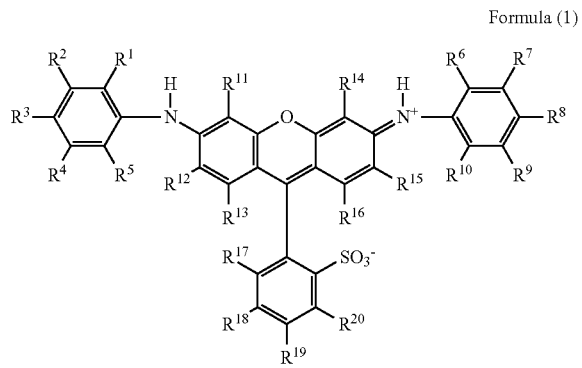

Formula (1)

In Formula (1), $R^1$, $R^5$, $R^6$, and $R^{10}$ each independently represent an alkyl group. $R^4$, $R^9$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent. $R^2$, $R^3$, $R^7$, and $R^8$ each independently represent a hydrogen atom, an alkyl group, or a substituent represented by the following Formula (A), and at least one of $R^2$, $R^3$, $R^7$, or $R^8$ represents a substituent represented by the following Formula (A).

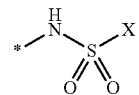

Formula (A)

In Formula (A), X represents a substituent represented by the following Formula (X1), (X2), or (X3). * represents a direct bond to a benzene ring.

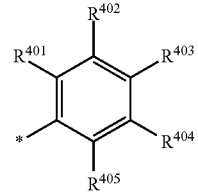

Formula (X1)

In Formula (X1), $R^{401}$, $R^{402}$, $R^{403}$, $R^{404}$, and $R^{405}$ each independently represent a hydrogen atom or a substituent. $R^{401}$, $R^{402}$, $R^{403}$, $R^{404}$, and $R^{405}$ satisfy the following condition (i) or (ii). * represents a direct bond to a sulfur atom.

Condition (i): at least one of $R^{401}$, $R^{402}$, $R^{403}$, $R^{404}$, and $R^{405}$ represents a hydroxyl group and at least one of $R^{401}$, $R^{402}$, $R^{403}$, $R^{404}$, and $R^{405}$ represents a carboxyl group Condition (ii): at least two of $R^{401}$, $R^{402}$, $R^{403}$, $R^{404}$, and $R^{405}$ represent a carboxyl group

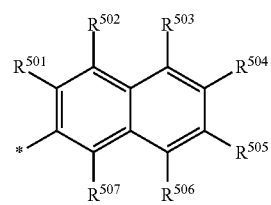

Formula (X2)

In Formula (X2), $R^{501}$, $R^{502}$, $R^{503}$, $R^{504}$, $R^{505}$, $R^{506}$, and $R^{507}$ each independently represent a hydrogen atom or a substituent. $R^{501}$, $R^{502}$, $R^{503}$, $R^{504}$, $R^{505}$, $R^{506}$, and $R^{507}$ satisfy the following condition (iii) or (iv). * represents a direct bond to a sulfur atom.

Condition (iii): at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group Condition (iv): at least two of $R^{501}$, $R^{502}$, $R^{503}$, $R^{504}$, $R^{505}$, $R^{506}$, or $R^{507}$ represent a carboxyl group

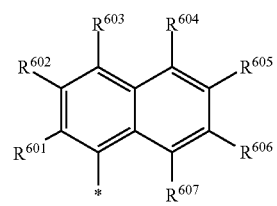

Formula (X3)

In Formula (X3), $R^{601}$, $R^{602}$, $R^{603}$, $R^{604}$, $R^{605}$, $R^{606}$, and $R^{607}$ each independently represent a hydrogen atom or a substituent. $R^{601}$, $R^{602}$, $R^{603}$, $R^{604}$, $R^{605}$, $R^{606}$, and $R^{607}$ satisfy the following condition (v) or (vi). * represents a direct bond to a sulfur atom.

Condition (v): at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group Condition (vi): at least two of $R^{601}$, $R^{602}$, $R^{603}$, $R^{604}$, $R^{605}$, $R^{606}$, or $R^{607}$ represent a carboxyl group In Formula (1), $R^{11}$, $R^{13}$, $R^{14}$, $R^{16}$, $R^{17}$, $R^{18}$, $R^{19}$, and $R^{20}$ each independently represent a hydrogen atom or a substituent. In a case where $R^{11}$, $R^{13}$, $R^{14}$, $R^{16}$, $R^{17}$, $R^{18}$, $R^{19}$, and $R^{20}$ represent a substituent, the substituent is selected from, for example, the substituent group A.

It is preferable that $R^{11}$, $R^{13}$, $R^{14}$, $R^{16}$, $R^{17}$, $R^{18}$, $R^{19}$, and $R^{20}$ represent a hydrogen atom.

In Formula (1), $R^1$, $R^5$, $R^6$, and $R^{10}$ each independently represent an alkyl group. From the viewpoint of raw material availability and synthesis easiness, an alkyl group having 1 to 6 carbon atoms is preferable, an alkyl group having 1 to 3 carbon atoms is more preferable, and a methyl group or an ethyl group is still more preferable. In addition, the alkyl group represented by $R^1$, $R^5$, $R^6$, and $R^{10}$ may have a substituent, and this substituent is selected from, for example, the substituent group A.

In Formula (1), $R^4$, $R^9$, $R^{12}$, and $R^{15}$ each independently represent a hydrogen atom or a substituent. In a case where $R^4$, $R^9$, $R^{12}$, and $R^{15}$ represent a substituent, the substituent is preferably an alkyl group or an ionic hydrophilic group.

As the alkyl group, an alkyl group having 1 to 6 carbon atoms is preferable, an alkyl group having 1 to 3 carbon atoms is more preferable, a methyl group or an ethyl group is still more preferable, and a methyl group is even still more preferable.

As the ionic hydrophilic group, a carboxyl group, a sulfo group, or a phosphono group is preferable. Examples of a counter cation of the ionic hydrophilic group include a hydrogen atom (proton), an alkali metal cation (a lithium ion, a sodium ion, or a potassium ion), and an ammonium ion. From the viewpoint of synthesis easiness (easy handleability of dye powder), the counter cation of the ionic hydrophilic group is preferably an alkali metal cation.

It is preferable that at least one of $R^4$, $R^9$, $R^{12}$, or $R^{15}$ represents an ionic hydrophilic group, and it is more preferable that two or more of $R^4$, $R^9$, $R^{12}$, or $R^{15}$ represents an ionic hydrophilic group.

A case where $R^{12}$ and $R^{15}$ represent an ionic hydrophilic group and $R^4$ and $R^9$ represent a hydrogen atom or a case where $R^4$ and $R^9$ represent an ionic hydrophilic group and $R^{12}$ and $R^{15}$ represent a hydrogen atom is preferable, and a case where $R^{12}$ and $R^{15}$ represent an ionic hydrophilic group and $R^4$ and $R^9$ represent a hydrogen atom is more preferable.

$R^4$ and $R^9$ each independently represent a hydrogen atom, a sulfo group, or a carboxyl group and preferably a hydrogen atom or a sulfo group.

$R^{12}$ and $R^{15}$ each independently represent a hydrogen atom, a sulfo group, or a carboxyl group and preferably a hydrogen atom or a sulfo group.

In Formula (1), $R^2$, $R^3$, $R^7$, and $R^8$ each independently represent a hydrogen atom, an alkyl group, or a substituent represented by Formula (A), and at least one of $R^2$, $R^3$, $R^7$, or $R^8$ represents a substituent represented by Formula (A).

In a case where $R^2$, $R^3$, $R^7$, and $R^8$ represent an alkyl group, an alkyl group having 1 to 6 carbon atoms is preferable, an alkyl group having 1 to 3 carbon atoms is more preferable, and a methyl group or an ethyl group is still more preferable. In addition, the alkyl group represented by $R^2$, $R^3$, $R^7$, and $R^8$ may have a substituent, and this substituent is selected from, for example, the substituent group A.

A case where $R^2$ and $R^7$ each independently represent a substituent represented by Formula (A) and $R^3$ and $R^8$ each independently represent an alkyl group or a case where $R^3$ and $R^8$ each independently represent a substituent represented by Formula (A) and $R^2$ and $R^7$ each independently represent an alkyl group is preferable, and a case where $R^2$ and $R^7$ each independently represent a substituent represented by Formula (A) and $R^3$ and $R^8$ each independently represent an alkyl group is more preferable.

In Formula (A), X represents a substituent represented by Formula (X1), (X2), or (X3).

Examples of a counter cation of the carboxyl group represented by Formula (X1), (X2), or (X3) include a hydrogen atom (proton), an alkali metal cation (a lithium ion, a sodium ion, or a potassium ion), and an ammonium ion. The counter cation of the carboxyl group is preferably an alkali metal cation.

In Formula (X1), $R^{401}$, $R^{402}$, $R^{403}$, $R^{404}$, and $R^{405}$ each independently represent a hydrogen atom or a substituent. $R^{401}$, $R^{402}$, $R^{403}$, $R^{404}$, and $R^{405}$ satisfy the following condition (i) or (ii).

Condition (i): at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group Condition (ii): at least two of $R^{401}$, $R^{402}$, $R^{403}$, $R^{404}$, or $R^{405}$ represent a carboxyl group It is preferable that $R^{401}$, $R^{402}$, $R^{403}$, $R^{404}$, and $R^{405}$ in Formula (X1) satisfy the condition (i). That is, it is preferable that at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group.

Among $R^{401}$, $R^{402}$, $R^{403}$, $R^{404}$, and $R^{405}$, the number of hydroxyl groups is preferably 1 to 3, more preferably 1 or 2, and still more preferably 1. The number of carboxyl groups is more preferably 1 to 3 and still more preferably 1 or 2.

A case where $R^{403}$ represents a hydroxyl group and $R^{402}$ represents a carboxyl group or a case where $R^{401}$ represents a hydroxyl group and $R^{402}$ represents a carboxyl group is preferable, and a case where $R^{401}$ represents a hydroxyl group and $R^{402}$ represents a carboxyl group is more preferable.

In a case where $R^{401}$, $R^{402}$, $R^{403}$, $R^{404}$, and $R^{405}$ represent a substituent, the substituent is selected from, for example, the substituent group A. In particular, an alkyl group or an alkoxy group is preferable, an alkyl group having 1 to 6 carbon atoms or an alkoxy group is more preferable, an alkyl group having 1 to 3 carbon atoms or an alkoxy group is still more preferable, and a methyl group or a methoxy group is even still more preferable. In addition, in a case where $R^{401}$, $R^{402}$, $R^{403}$, $R^{404}$, and $R^{405}$ represent a substituent, examples of the substituent in an aspect different from the above-described aspect include a carboxyl group, a chlorine atom, a nitro group, and a trifluoromethyl group. Among these, a carboxyl group, a chlorine atom, or a nitro group is more preferable, and a carboxyl group is still more preferable. In particular, in a case where $R^{401}$ represents a hydroxyl group and $R^{402}$ represents a carboxyl group, it is preferable that $R^{404}$ represents the above-described substituent (a carboxyl group, a chlorine atom, a nitro group, or a trifluoromethyl group).

In a case where $R^{401}$, $R^{402}$, $R^{403}$, $R^{404}$, and $R^{405}$ in Formula (X1) satisfy the condition (ii), it is preferable that $R^{402}$ and $R^{404}$ represent a carboxyl group.

Specific examples of the group represented by Formula (X1) will be shown below, but the present invention is not limited to the examples. In structural formulae of the following specific compounds, Me represents a methyl group. * represents a direct bond to a sulfur atom.

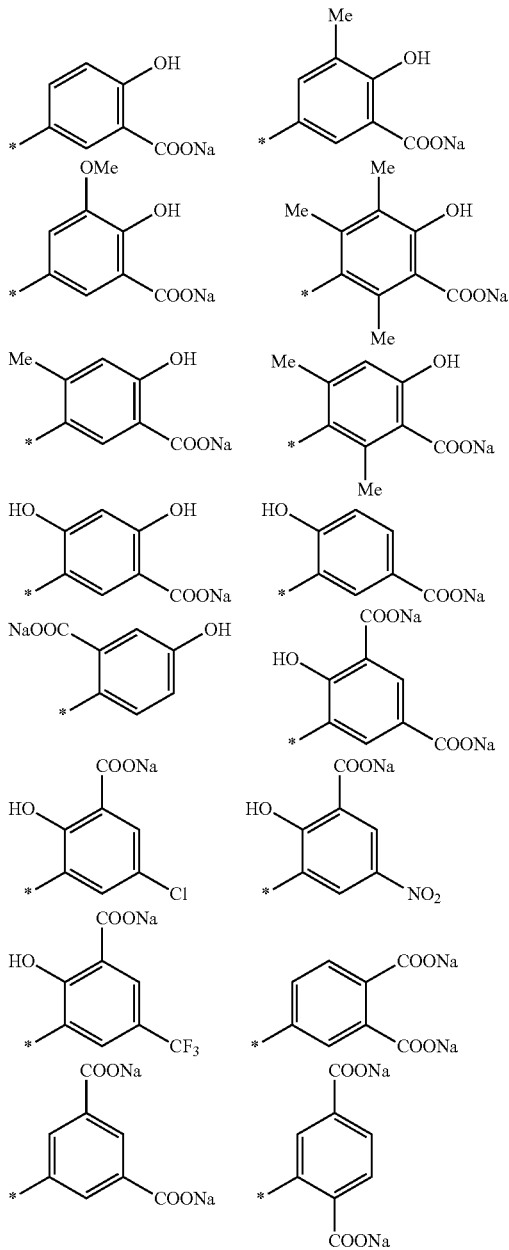

In Formula (X2), $R^{501}$, $R^{502}$, $R^{503}$, $R^{504}$, $R^{505}$, $R^{506}$, and $R^{507}$ each independently represent a hydrogen atom or a substituent. $R^{501}$, $R^{502}$, $R^{503}$, $R^{504}$, $R^{505}$, $R^{506}$, and $R^{507}$ satisfy the following condition (iii) or (iv).

Condition (iii): at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group Condition (iv): at least two of $R^{501}$, $R^{502}$, $R^{503}$, $R^{504}$, $R^{505}$, $R^{506}$, or $R^{507}$ represent a carboxyl group It is preferable that $R^{501}$, $R^{502}$, $R^{503}$, $R^{504}$, $R^{505}$, $R^{506}$, and $R^{507}$ in Formula (X2) satisfy the condition (iii). That is, it is preferable that at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group.

In a case where $R^{501}$, $R^{502}$, $R^{503}$, $R^{504}$, $R^{505}$, $R^{506}$, and $R^{507}$ represent a substituent, the substituent is selected from, for example, the substituent group A. In particular, an alkyl group or an alkoxy group is preferable, an alkyl group having 1 to 6 carbon atoms or an alkoxy group is more preferable, an alkyl group having 1 to 3 carbon atoms or an alkoxy group is still more preferable, and a methyl group or a methoxy group is even still more preferable.

Among $R^{501}$, $R^{502}$, $R^{503}$, $R^{504}$, $R^{505}$, $R^{506}$, and $R^{507}$, the number of hydroxyl groups is preferably 1 to 3, more preferably 1 or 2, and still more preferably 1. The number of carboxyl groups is more preferably 1 or 2 and still more preferably 1.

A case where $R^{504}$ represents a hydroxyl group and $R^{503}$ represents a carboxyl group or a case where $R^{504}$ represents a hydroxyl group and $R^{505}$ represents a carboxyl group is preferable, and a case where $R^{504}$ represents a hydroxyl group and $R^{503}$ represents a carboxyl group is more preferable.

Specific examples of the group represented by Formula (X2) will be shown below, but the present invention is not limited to the examples. * represents a direct bond to a sulfur atom.

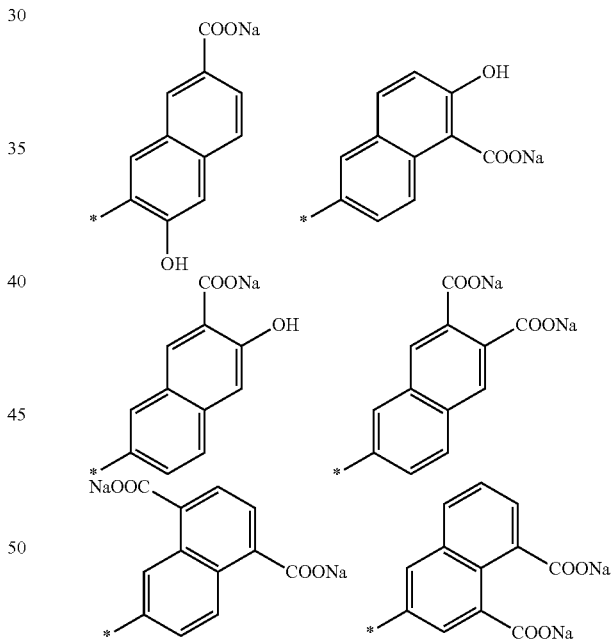

In Formula (X3), $R^{601}$, $R^{602}$, $R^{603}$, $R^{604}$, $R^{605}$, $R^{606}$, and $R^{607}$ each independently represent a hydrogen atom or a substituent. $R^{601}$, $R^{602}$, $R^{603}$, $R^{604}$, $R^{605}$, $R^{606}$, and $R^{607}$ satisfy the following condition (v) or (vi). * represents a direct bond to a sulfur atom.

Condition (v): at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group Condition (vi): at least two of $R^{601}$, $R^{602}$, $R^{603}$, $R^{604}$, $R^{605}$, $R^{606}$, or $R^{607}$ represent a carboxyl group It is preferable that $R^{601}$, $R^{602}$, $R^{603}$, $R^{604}$, $R^{605}$, $R^{606}$, and $R^{607}$ in Formula (X3) satisfy the condition (v). That is, it is preferable that at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group.

In a case where $R^{601}$, $R^{602}$, $R^{603}$, $R^{604}$, $R^{605}$, $R^{606}$, and $R^{607}$ represent a substituent, the substituent is selected from, for example, the substituent group A. In particular, an alkyl group or an alkoxy group is preferable, an alkyl group having 1 to 6 carbon atoms or an alkoxy group is more preferable, an alkyl group having 1 to 3 carbon atoms or an alkoxy group is still more preferable, and a methyl group or a methoxy group is even still more preferable.

Among $R^{601}$, $R^{602}$, $R^{603}$, $R^{604}$, $R^{605}$, $R^{606}$, or $R^{607}$, the number of hydroxyl groups is preferably 1 to 3, more preferably 1 or 2, and still more preferably 1. The number of carboxyl groups is more preferably 1 or 2 and still more preferably 1.

A case where $R^{606}$ represents a hydroxyl group and $R^{605}$ represents a carboxyl group or a case where $R^{603}$ represents a hydroxyl group and $R^{602}$ represents a carboxyl group is preferable, and a case where $R^{606}$ represents a hydroxyl group and $R^{605}$ represents a carboxyl group is more preferable.

Specific examples of the group represented by Formula (X3) will be shown below, but the present invention is not limited to the examples. * represents a direct bond to a sulfur atom.

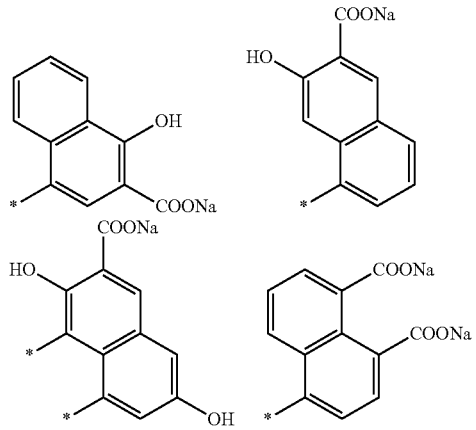

It is preferable that the compound represented by Formula (1) is a compound represented by the following Formula (2), (3), or (4).

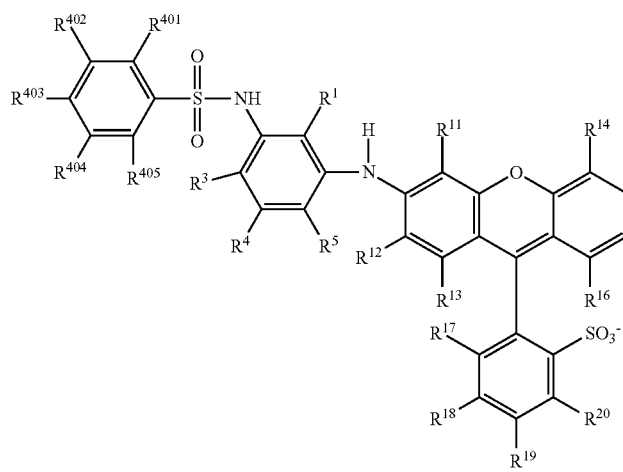 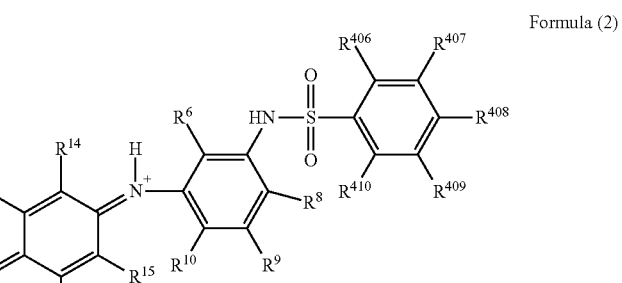

Formula (2)

In Formula (2), $R^1$, $R^5$, $R^6$, and $R^{10}$ each independently represent an alkyl group. $R^4$, $R^9$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent. $R^3$ and $R^8$ each independently represent a hydrogen atom or an alkyl group. $R^{401}$, $R^{402}$, $R^{403}$, $R^{404}$, and $R^{405}$ each independently represent a hydrogen atom or a substituent. $R^{401}$, $R^{402}$, $R^{403}$, $R^{404}$, and $R^{405}$ satisfy the following condition (i-1) or (ii-1). $R^{406}$, $R^{407}$, $R^{408}$, $R^{409}$, and $R^{410}$ each independently represent a hydrogen atom or a substituent. $R^{406}$, $R^{407}$, $R^{408}$, $R^{409}$, and $R^{410}$ satisfy the following condition (i-2) or (ii-2).

Condition (i-1): at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group Condition (ii-1): at least two of $R^{401}$, $R^{402}$, $R^{403}$, $R^{404}$, or $R^{405}$ represent a carboxyl group Condition (i-2): at least one of $R^{406}$, $R^{407}$, $R^{408}$, $R^{409}$, or $R^{410}$ represents a hydroxyl group and at least one of $R^{406}$, $R^{407}$, $R^{408}$, $R^{409}$, or $R^{410}$ represents a carboxyl group Condition (ii-2): at least two of $R^{406}$, $R^{407}$, $R^{408}$, $R^{409}$, or $R^{410}$ represent a carboxyl group

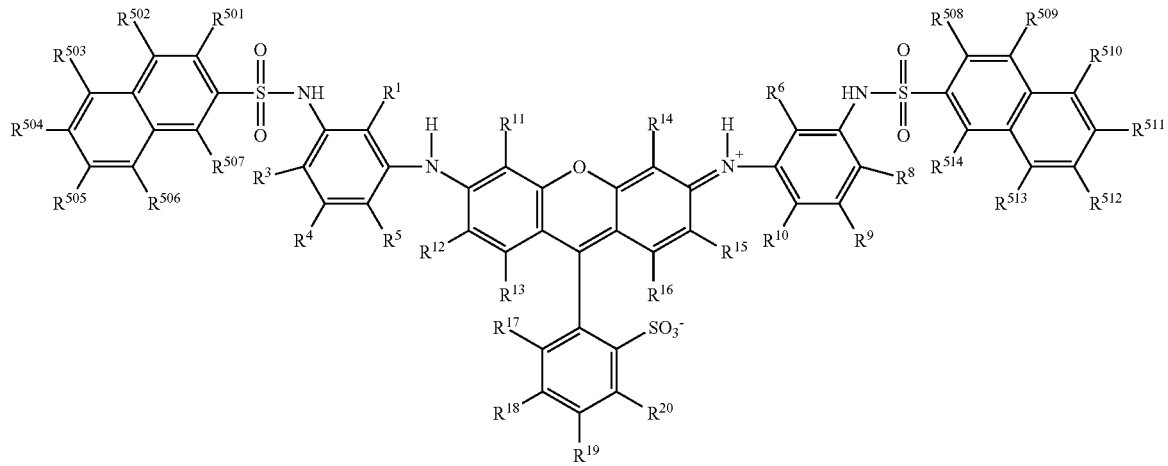

Formula (3)

In Formula (3), $R^1$, $R^5$, $R^6$, and $R^{10}$ each independently represent an alkyl group. $R^4$, $R^9$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent. $R^3$ and $R^8$ each independently represent a hydrogen atom or an alkyl group. $R^{501}$, $R^{502}$, $R^{503}$, $R^{504}$, $R^{505}$, $R^{506}$, and $R^{507}$ each independently represent a hydrogen atom or a substituent. $R^{501}$, $R^{502}$, $R^{503}$, $R^{504}$, $R^{505}$, $R^{506}$, and $R^{507}$ satisfy the following condition (iii-1) or (iv-1). $R^{508}$, $R^{509}$, $R^{510}$, $R^{511}$, $R^{512}$, $R^{513}$, and $R^{514}$ each independently represent a hydrogen atom or a substituent. $R^{508}$, $R^{509}$, $R^{510}$, $R^{511}$, $R^{512}$, $R^{513}$, and $R^{514}$ satisfy the following condition (iii-2) or (iv-2).

Condition (iii-1): at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group Condition (iv-1): at least two of $R^{501}$, $R^{502}$, $R^{503}$, $R^{504}$, $R^{505}$, $R^{506}$, or $R^{507}$ represent a carboxyl group Condition (iii-2): at least one of $R^{508}$, $R^{509}$, $R^{510}$, $R^{511}$, $R^{512}$, $R^{513}$, and $R^{514}$ represents a hydroxyl group and at least one of $R^{508}$, $R^{509}$, $R^{510}$, $R^{511}$, $R^{512}$, $R^{513}$, and $R^{514}$ represents a carboxyl group Condition (iv-2): at least two of $R^{508}$, $R^{509}$, $R^{510}$, $R^{511}$, $R^{512}$, $R^{513}$, and $R^{514}$ represent a carboxyl group In Formula (4), $R^1$, $R^5$, $R^6$, and $R^{10}$ each independently represent an alkyl group. $R^4$, $R^9$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent. $R^3$ and $R^8$ each independently represent a hydrogen atom or an alkyl group. $R^{601}$, $R^{602}$, $R^{603}$, $R^{604}$, $R^{605}$, $R^{606}$, and $R^{607}$ each independently represent a hydrogen atom or a substituent. $R^{601}$, $R^{602}$, $R^{603}$, $R^{604}$, $R^{605}$, $R^{606}$, and $R^{607}$ satisfy the following condition (v-1) or (vi-1). $R^{608}$, $R^{609}$, $R^{610}$, $R^{611}$, $R^{612}$, $R^{613}$, and $R^{614}$ each independently represent a hydrogen atom or a substituent. $R^{608}$, $R^{609}$, $R^{610}$, $R^{611}$, $R^{612}$, $R^{613}$, and $R^{614}$ satisfy the following condition (v-2) or (vi-2).

Condition (v-1): at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group Condition (vi-1): at least two of $R^{601}$, $R^{602}$, $R^{603}$, $R^{604}$, $R^{605}$, $R^{606}$, or $R^{607}$ represent a carboxyl group Condition (v-2): at least one of $R^{608}$, $R^{609}$, $R^{610}$, $R^{611}$, $R^{612}$, $R^{613}$, or $R^{614}$ represents a hydroxyl group and at least one of $R^{608}$, $R^{609}$, $R^{610}$, $R^{611}$, $R^{612}$, $R^{613}$, or $R^{614}$ represents a carboxyl group Condition (vi-2): at least two of $R^{608}$, $R^{609}$, $R^{610}$, $R^{611}$, $R^{612}$, $R^{613}$, or $R^{614}$ represent a carboxyl group

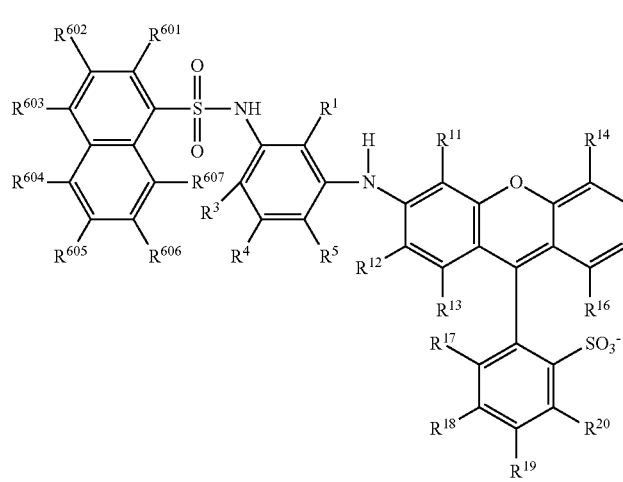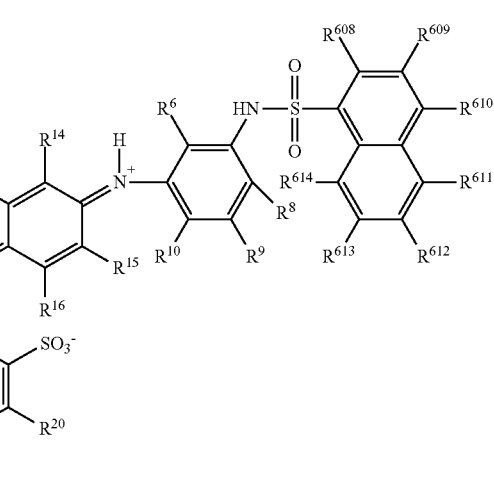

Formula (4)

$R^1$, $R^4$, $R^5$, $R^6$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ in Formula (2) have the same definitions and the same preferable ranges as $R^1$, $R^4$, $R^5$, $R^6$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ in Formula (1), respectively.

$R^3$ and $R^8$ in Formula (2) each independently represent a hydrogen atom or an alkyl group and preferably an alkyl group. As the alkyl group, an alkyl group having 1 to 6 carbon atoms is preferable, an alkyl group having 1 to 3 carbon atoms is more preferable, and a methyl group or an ethyl group is still more preferable. In addition, the alkyl group may have a substituent, and this substituent is selected from, for example, the substituent group A.

It is preferable that $R^{401}$, $R^{402}$, $R^{403}$, $R^{404}$, and $R^{405}$ in Formula (2) satisfy the condition (i-1). That is, it is preferable that at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group. $R^{401}$, $R^{402}$, $R^{403}$, $R^{404}$, and $R^{405}$ have the same preferable ranges as $R^{401}$, $R^{402}$, $R^{403}$, $R^{404}$, and $R^{405}$ in Formula (X1), respectively.

It is preferable that $R^{406}$, $R^{407}$, $R^{408}$, $R^{409}$, and $R^{410}$ in Formula (2) satisfy the condition (i-2). That is, it is preferable that at least one of $R^{406}$, $R^{407}$, $R^{408}$, $R^{409}$, or $R^{410}$ represents a hydroxyl group and at least one of $R^{406}$, $R^{407}$, $R^{408}$, $R^{409}$, or $R^{410}$ represents a carboxyl group. $R^{406}$, $R^{407}$, $R^{408}$, $R^{409}$, and $R^{410}$ have the same preferable ranges as $R^{401}$, $R^{402}$, $R^{403}$, $R^{404}$, and $R^{405}$ in Formula (2), respectively.

$R^1$, $R^4$, $R^5$, $R^6$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ in Formula (3) have the same definitions and the same preferable ranges as $R^1$, $R^4$, $R^5$, $R^6$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ in Formula (1), respectively.

$R^3$ and $R^8$ in Formula (3) each independently represent a hydrogen atom or an alkyl group and preferably an alkyl group. As the alkyl group, an alkyl group having 1 to 6 carbon atoms is preferable, an alkyl group having 1 to 3 carbon atoms is more preferable, and a methyl group or an ethyl group is still more preferable. In addition, the alkyl group may have a substituent, and this substituent is selected from, for example, the substituent group A.

It is preferable that $R^{501}$, $R^{502}$, $R^{503}$, $R^{504}$, $R^{505}$, $R^{506}$, and $R^{507}$ in Formula (3) satisfy the condition (iii-1). That is, it is preferable that at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group. $R^{501}$, $R^{502}$, $R^{503}$, $R^{504}$, $R^{505}$, $R^{506}$, and $R^{507}$ have the same preferable ranges as $R^{501}$, $R^{502}$, $R^{503}$, $R^{504}$, $R^{505}$, $R^{506}$, and $R^{507}$ in Formula (X2), respectively.

It is preferable that $R^{508}$, $R^{509}$, $R^{510}$, $R^{511}$, $R^{512}$, $R^{513}$, and $R^{514}$ in Formula (3) satisfy the condition (iii-2). That is, it is preferable that at least one of $R^{508}$, $R^{509}$, $R^{510}$, $R^{511}$, $R^{512}$, $R^{513}$, or $R^{514}$ represents a hydroxyl group and at least one of $R^{508}$, $R^{509}$, $R^{510}$, $R^{511}$, $R^{512}$, $R^{513}$, or $R^{514}$ represents a carboxyl group. $R^{508}$, $R^{509}$, $R^{510}$, $R^{511}$, $R^{512}$, $R^{513}$, and $R^{514}$ have the same preferable ranges as $R^{501}$, $R^{502}$, $R^{503}$, $R^{504}$, $R^{505}$, $R^{506}$, and $R^{507}$ in Formula (3), respectively.

$R^1$, $R^4$, $R^5$, $R^6$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ in Formula (4) have the same definitions and the same preferable ranges as $R^1$, $R^4$, $R^5$, $R^6$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ in Formula (1), respectively.

$R^3$ and $R^8$ in Formula (4) each independently represent a hydrogen atom or an alkyl group and preferably an alkyl group. As the alkyl group, an alkyl group having 1 to 6 carbon atoms is preferable, an alkyl group having 1 to 3 carbon atoms is more preferable, and a methyl group or an ethyl group is still more preferable. In addition, the alkyl group may have a substituent, and this substituent is selected from, for example, the substituent group A.

It is preferable that $R^{601}$, $R^{602}$, $R^{603}$, $R^{604}$, $R^{605}$, $R^{606}$, and $R^{607}$ in Formula (4) satisfy the condition (v-1). That is, it is preferable that at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group. $R^{601}$, $R^{602}$, $R^{603}$, $R^{604}$, $R^{605}$, $R^{606}$, and $R^{607}$ have the same preferable ranges as $R^{601}$, $R^{602}$, $R^{603}$, $R^{604}$, $R^{605}$, $R^{606}$, and $R^{607}$ in Formula (X3), respectively.

It is preferable that $R^{608}$, $R^{609}$, $R^{610}$, $R^{611}$, $R^{612}$, $R^{613}$, and $R^{614}$ in Formula (4) satisfy the condition (v-2). That is, it is preferable that at least one of $R^{608}$, $R^{609}$, $R^{610}$, $R^{611}$, $R^{612}$, $R^{613}$, or $R^{614}$ represents a hydroxyl group and at least one of $R^{608}$, $R^{609}$, $R^{610}$, $R^{611}$, $R^{612}$, $R^{613}$, or $R^{614}$ represents a carboxyl group. $R^{608}$, $R^{609}$, $R^{610}$, $R^{611}$, $R^{612}$, $R^{613}$, and $R^{614}$ have the same preferable ranges as $R^{601}$, $R^{602}$, $R^{603}$, $R^{604}$, $R^{605}$, $R^{606}$, and $R^{607}$ in Formula (4), respectively.

Hereinafter, specific examples of the compound represented by Formula (1) will be shown, but the present invention is not limited thereto. In the following specific structural formulae of the compounds, Me represents a methyl group, and Et represents an ethyl group.

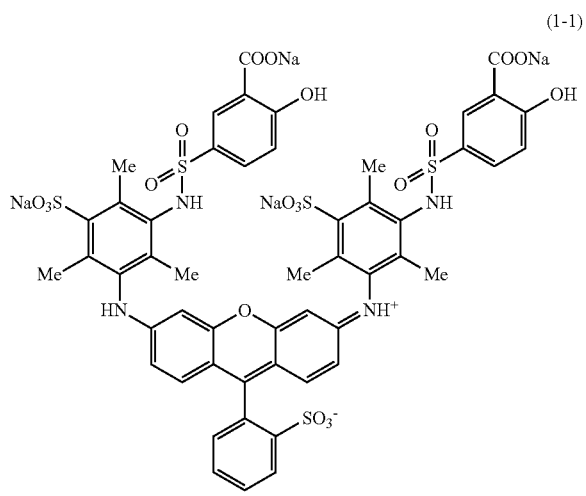

(1-1)

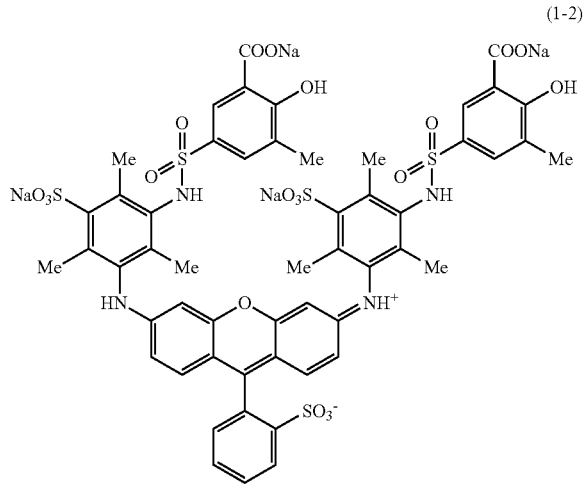

(1-2)

(1-3)
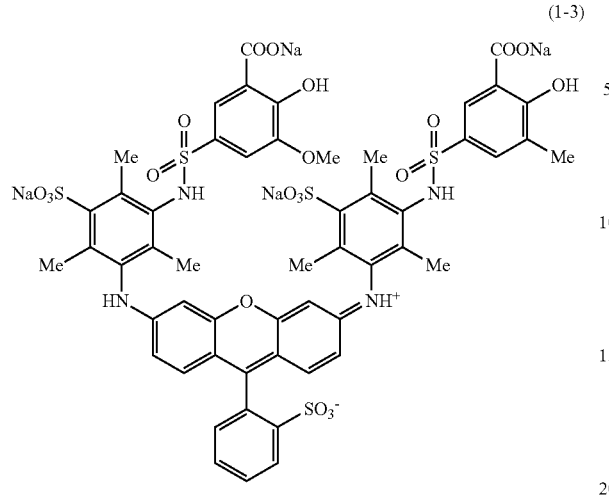
(1-6)
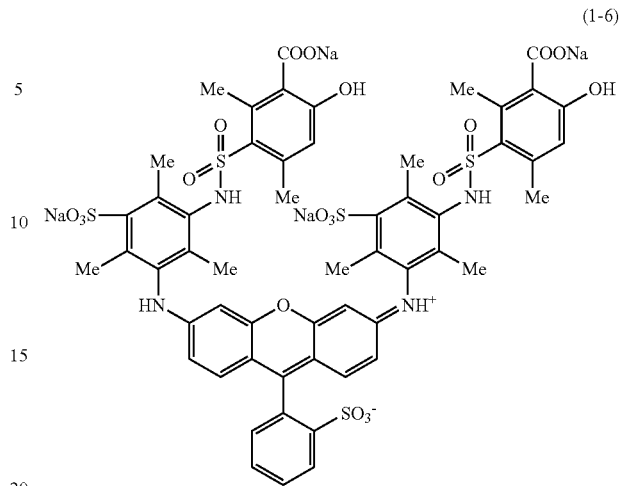
(1-4)
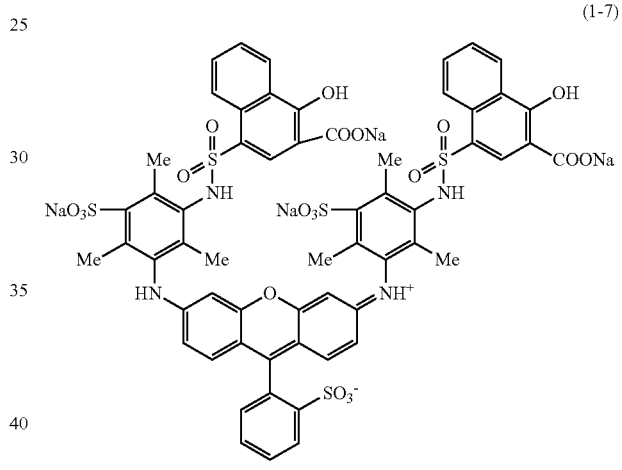
(1-7)
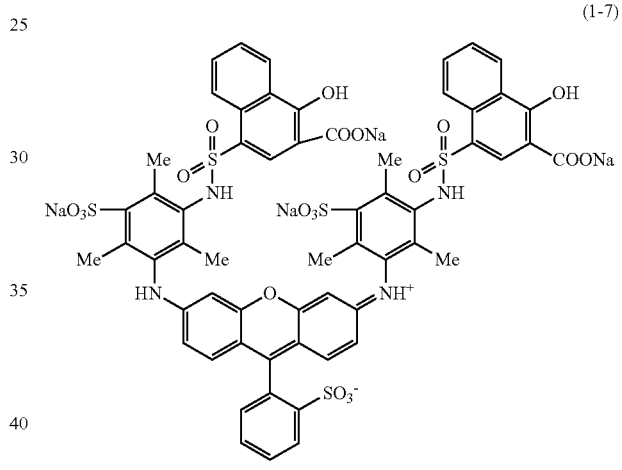
(1-5)
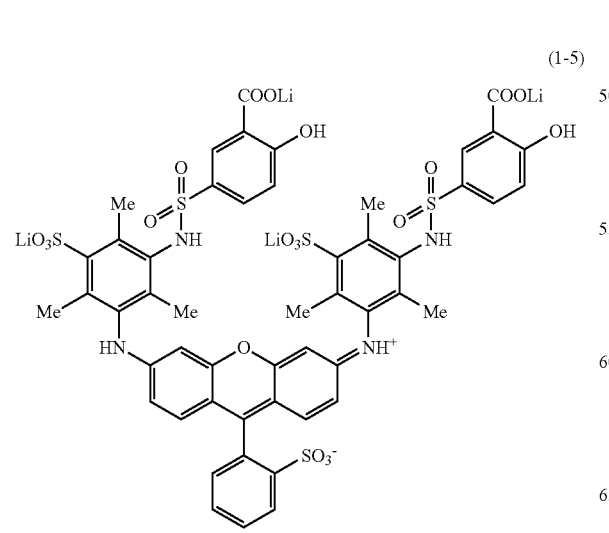
(1-8)
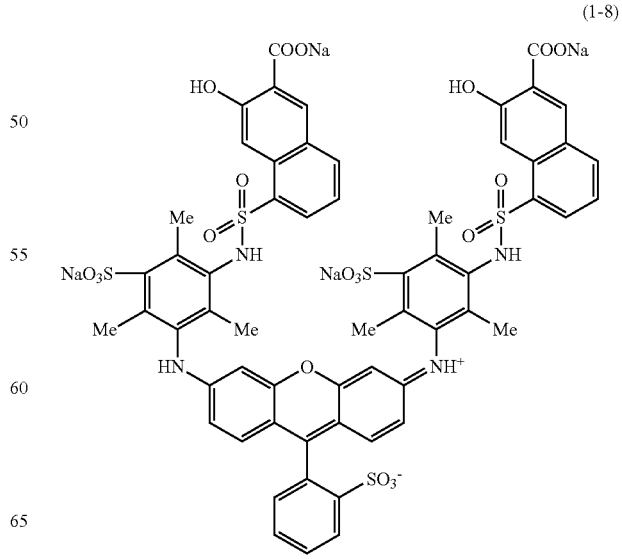

(1-9)
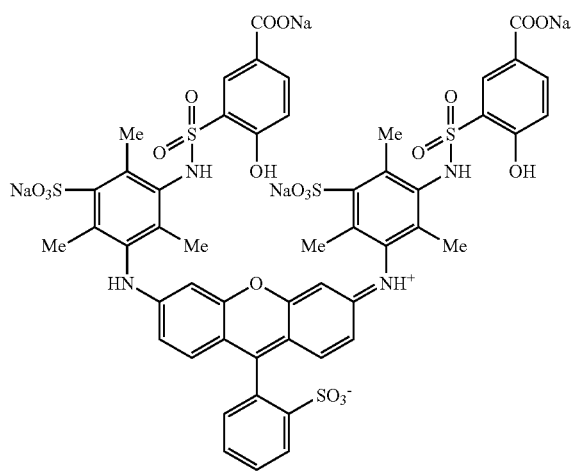
(1-12)
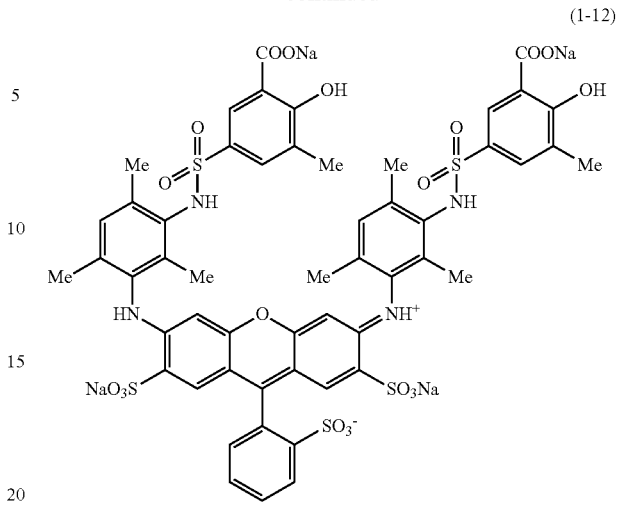
(1-10)
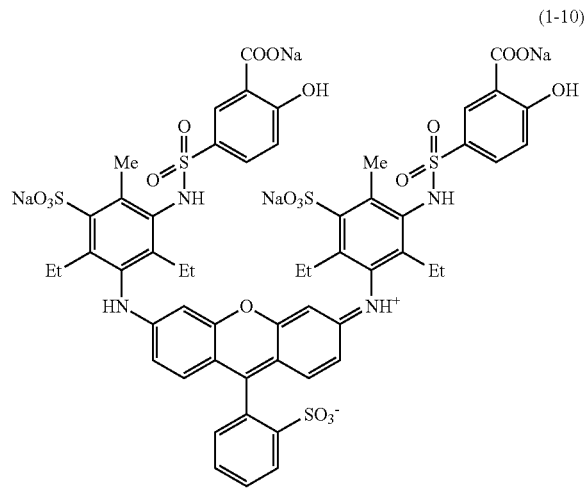
(1-13)
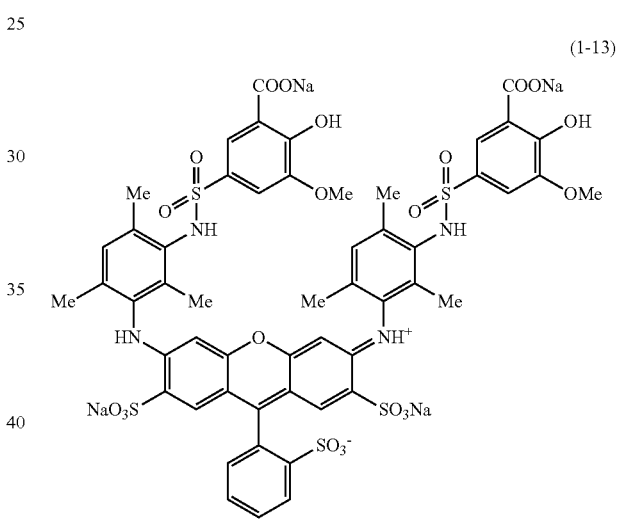
(1-11)
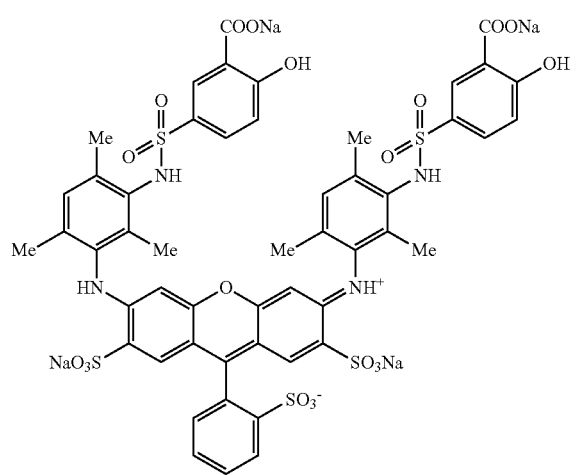
(1-14)
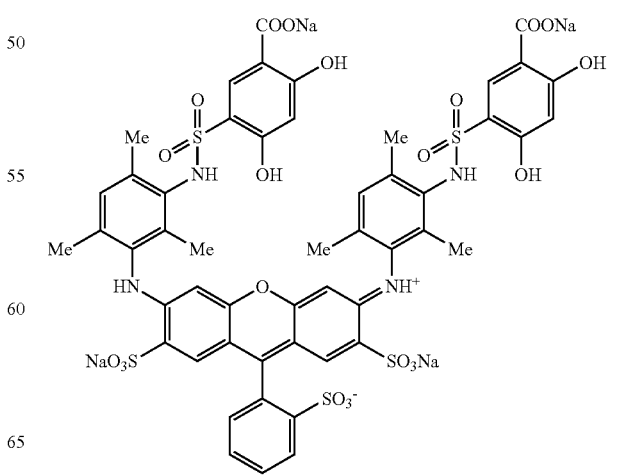

(1-15)
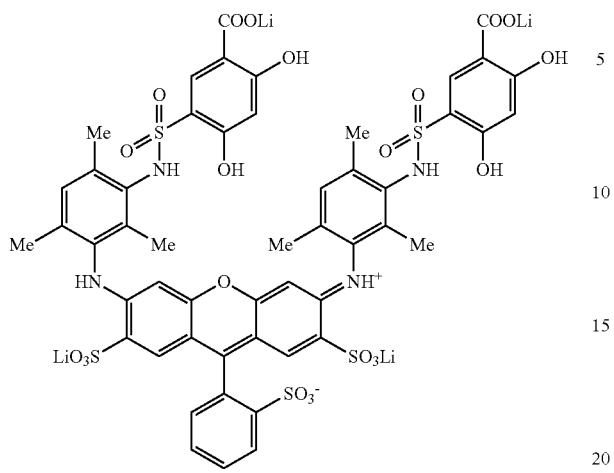
(1-16)
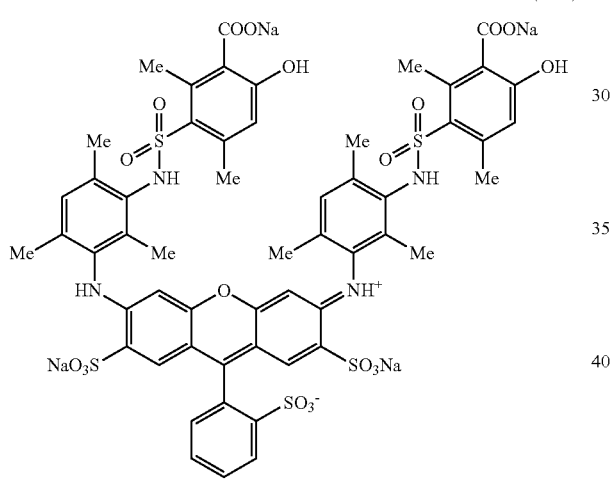
(1-17)
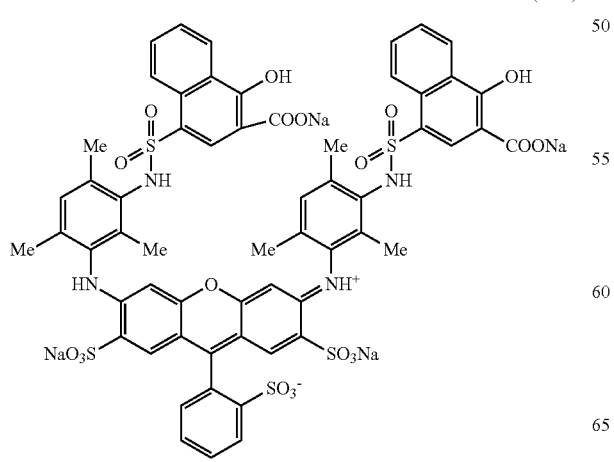
(1-18)
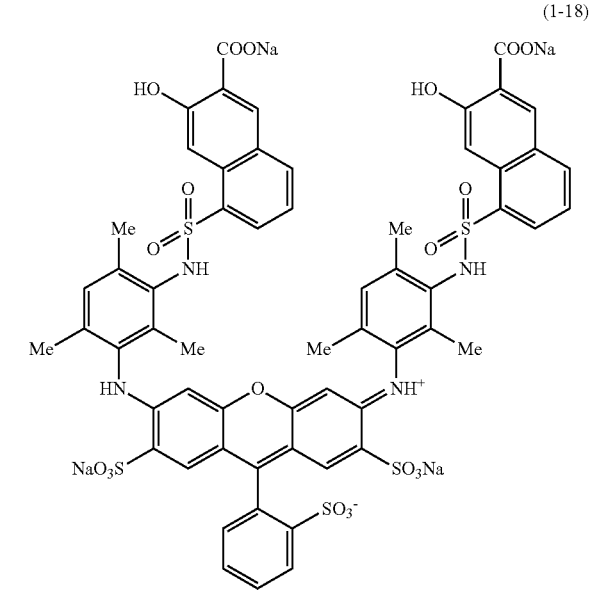
(1-19)
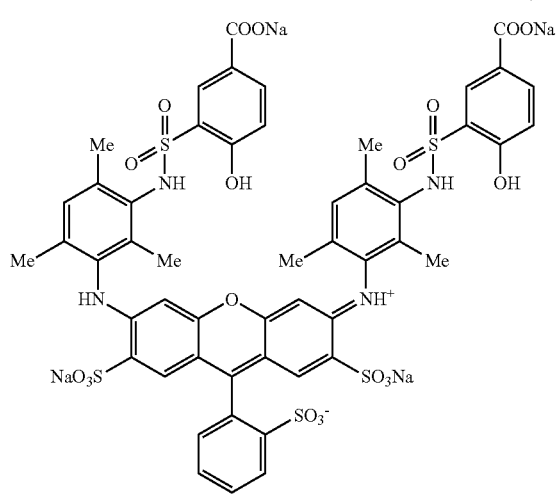
(1-20)
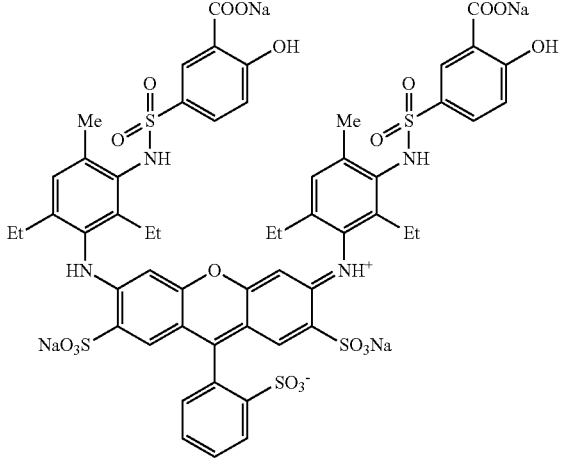

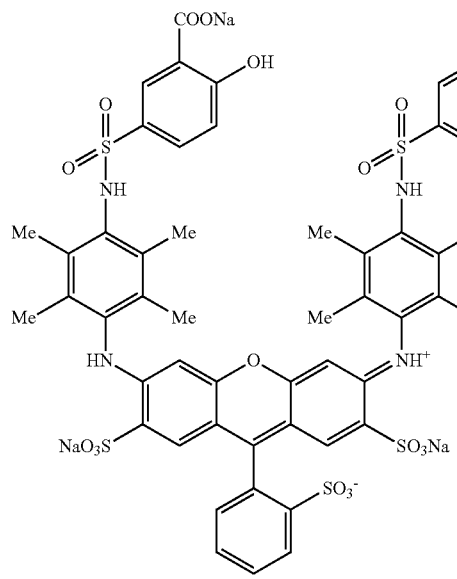
(1-21)
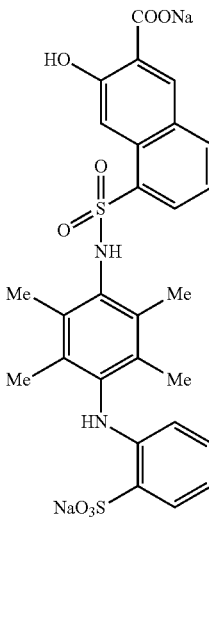
(1-22)
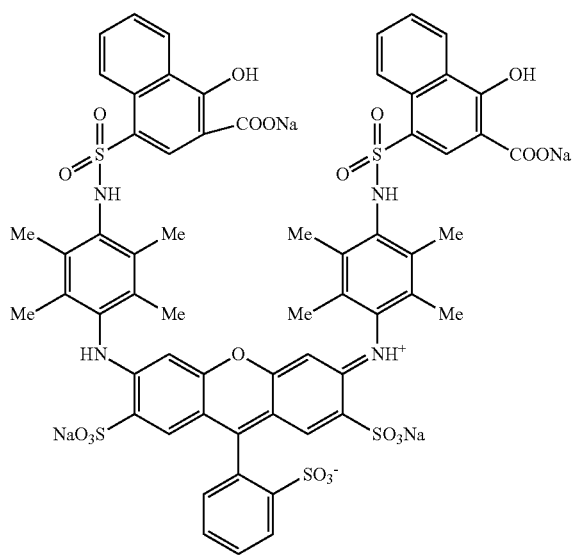
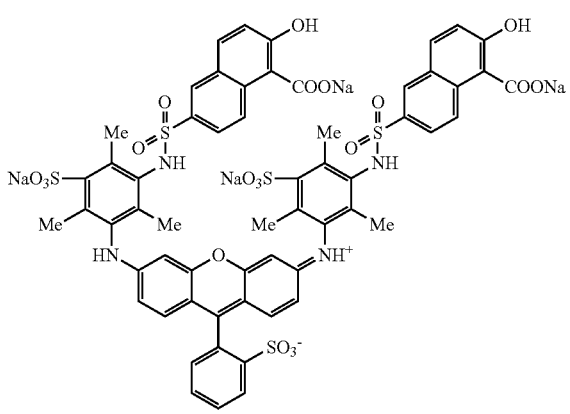
(1-23)
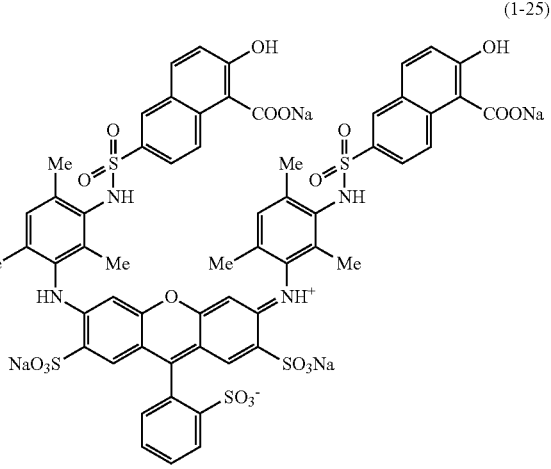
(1-24)
(1-25)

(1-26)
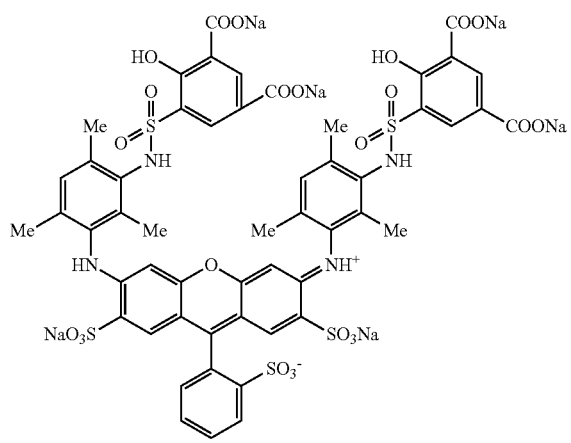
(1-29)
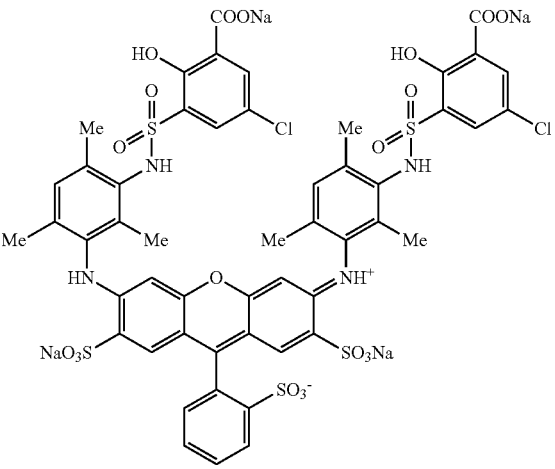
(1-27)
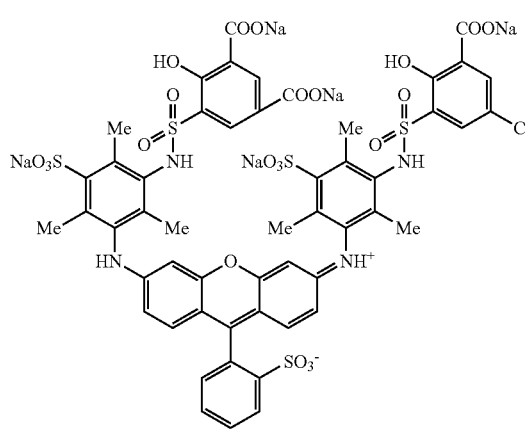
(1-30)
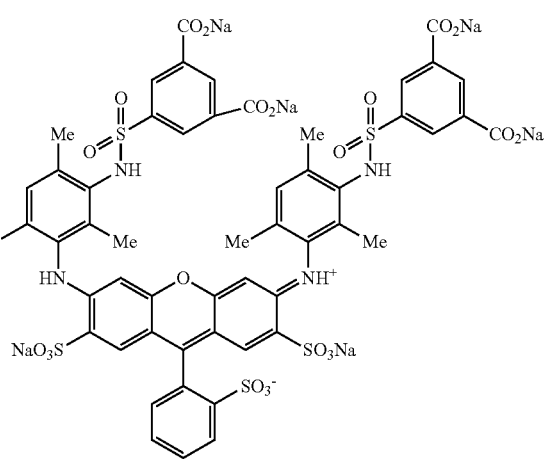
(1-28)
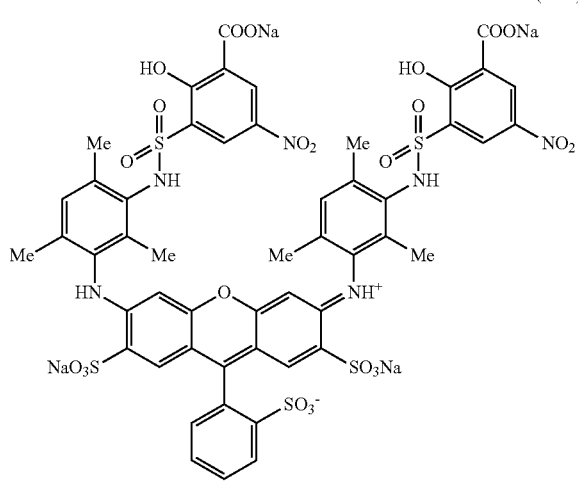
(1-31)
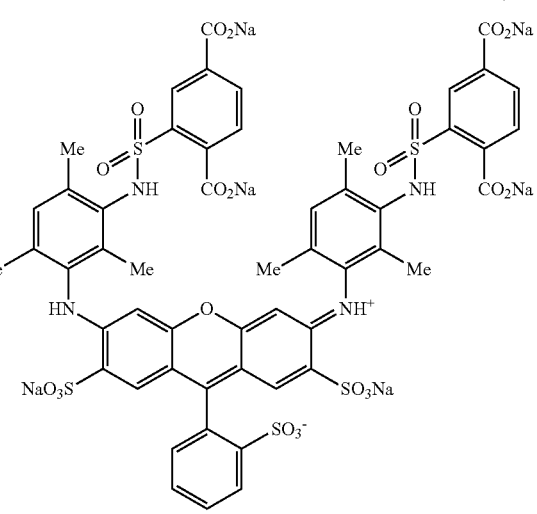

-continued (1-32)
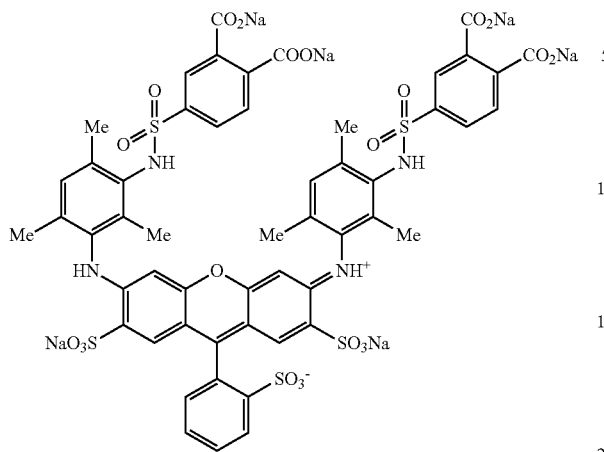

(1-33)
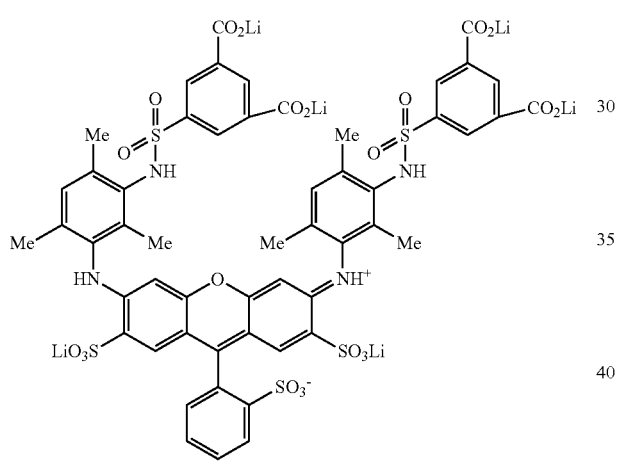

(1-34)
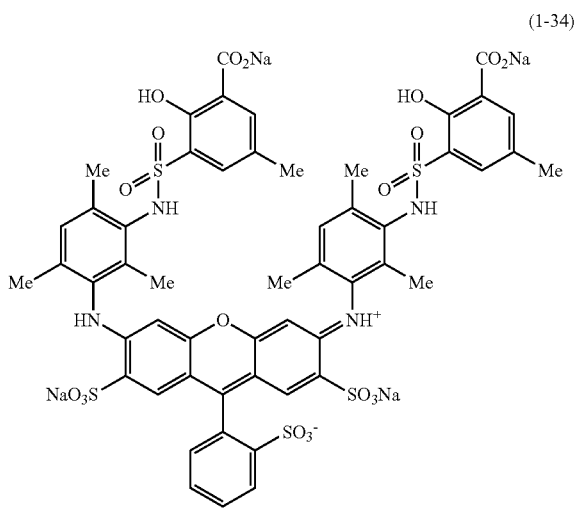

-continued (1-35)
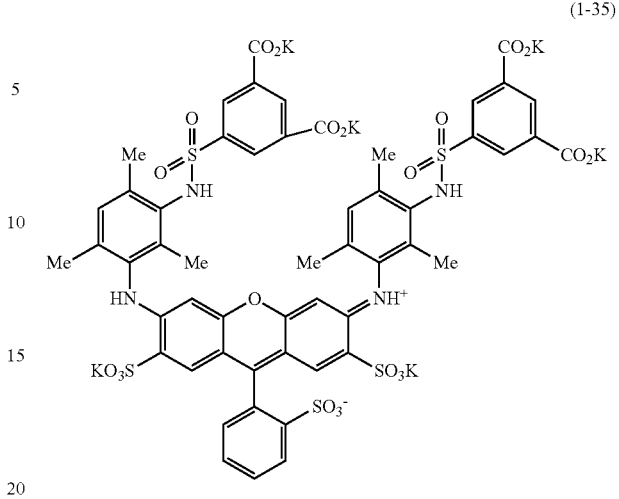

An exemplary specific synthesis method of the compound represented by Formula (1) will be described in Examples below.

[Compound Represented by Formula (D)]

Next, a compound represented by the following Formula (D) will be described.

Formula (D)
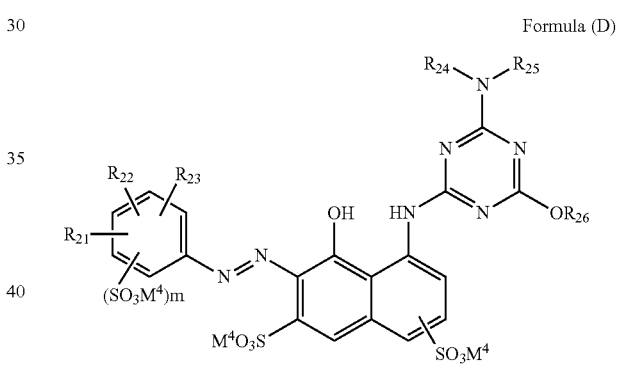

In Formula (D), $R_{21}$, $R_{22}$, and $R_{23}$ each independently represent a hydrogen atom, a substituted or unsubstituted alkyl group having 1 to 9 carbon atoms, an alkoxy group having 1 to 9 carbon atoms, a halogen atom, a hydroxyl group, a substituted or unsubstituted carbamoyl group, a substituted or unsubstituted sulfamoyl group, a substituted or unsubstituted amino group, a nitro group, a sulfonate group, a substituted or unsubstituted alkylsulfonyl group having 1 to 9 carbon atoms, an arylsulfonyl group having 6 to 15 carbon atoms, a carboxyl group, or a carboxylate group. m represents 0, 1, or 2. $R_{24}$, $R_{25}$, and $R_{26}$ each independently represent a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group, or a substituted or unsubstituted heterocyclic group. $M^4$ represents a hydrogen atom or a counter cation. $M^4$'s may be the same as or different from each other.

In Formula (D), $R_{21}$, $R_{22}$, and $R_{23}$ each independently represent a hydrogen atom, a substituted or unsubstituted alkyl group having 1 to 9 carbon atoms, an alkoxy group having 1 to 9 carbon atoms, a halogen atom, a hydroxyl group, a substituted or unsubstituted carbamoyl group, a substituted or unsubstituted sulfamoyl group, a substituted or unsubstituted amino group, a nitro group, a sulfonate group, a substituted or unsubstituted alkylsulfonyl group having 1 to 9 carbon atoms, an arylsulfonyl group having 6 to 15 carbon atoms, a carboxyl group, or a carboxylate group.

The alkyl group having 1 to 9 carbon atoms may be linear, branched, or cyclic (cycloalkyl group), and examples thereof include a methyl group, an ethyl group, an n-propyl group, an isopropyl group, an n-butyl group, and a cyclohexyl group.

As the alkyl group having 1 to 9 carbon atoms, a linear or branched alkyl group is preferable, and a linear or branched alkyl group having 1 to 4 carbon atoms is more preferable.

The alkyl group may have a substituent, and examples of the substituent include the substituents described above regarding the substituent group A. Among these, a halogen atom or an amino group is preferable. The substituents may further have a substituent among the substituents described above regarding the substituent group A.

Examples of the alkyl group having a substituent include a trifluoromethyl group and a dimethylaminomethyl group.

Examples of the alkoxy group having 1 to 9 carbon atoms include a methoxy group, an ethoxy group, an isopropoxy group, and an n-butoxy group. Among these, an alkoxy group having 1 to 4 carbon atoms is preferable, and a methoxy group or an ethoxy group is more preferable.

Examples of the halogen atom include a fluorine atom, a chlorine atom, a bromine atom, and an iodine atom. Among these, a chlorine atom is preferable.

Examples of the carbamoyl group include an unsubstituted carbamoyl group and a carbamoyl group having a substituent.

Examples of the substituent include the substituents described above regarding the substituent group A. Among these, an alkyl group or an aryl group is preferable.

Examples of the carbamoyl group having a substituent include an N,N-dimethylcarbamoyl group and a phenylcarbamoyl group.

Examples of the sulfamoyl group include an unsubstituted sulfamoyl group and a sulfamoyl group having a substituent.

Examples of the substituent include the substituents described above regarding the substituent group A. Among these, an alkyl group or an aryl group is preferable. The substituents may further have a substituent among the substituents described above regarding the substituent group A.

Examples of the sulfamoyl group having a substituent include an N-methylsulfamoyl group, an N-ethylsulfamoyl group, an N-ethyl-N-phenylsulfamoyl group, an N,N-dimethylsulfamoyl group, and a p-carboxyphenylsulfamoyl group.

Examples of the amino group include an unsubstituted amino group and an amino group having a substituent.

Examples of the substituent include the substituents described above regarding the substituent group A. Among these, an alkyl group, a carbamoyl group, or an acyl group is preferable.

Examples of the amino group having a substituent include an N-methylamino group, a carbamoylamino group, an N,N-diethylamino group, and an acetylamino group.

As the sulfonate group, an alkyloxysulfonyl group or an aryloxysulfonyl group can be used, and examples thereof include a phenoxysulfonyl group.

As the alkylsulfonyl group having 1 to 9 carbon atoms, an alkylsulfonyl group having 1 to 4 carbon atoms is preferable, and examples thereof include a methylsulfonyl group and an ethylsulfonyl group.

The alkylsulfonyl group having 1 to 9 carbon atoms may further have a substituent, and Examples of the substituent include the substituents described above regarding the substituent group A. Among these, an aryl group or a hydroxyl group is preferable.

Examples of the alkylsulfonyl group having a substituent include a hydroxyethylsulfonyl group and a benzylsulfonyl group.

Examples of the arylsulfonyl group having 6 to 15 carbon atoms include a phenylsulfonyl group.

Examples of the carboxylate group include an alkyloxycarbonyl group and an aryloxycarbonyl group. Among these, an alkyloxycarbonyl group is preferable, and examples thereof include a methoxycarbonyl group.

From the viewpoints of raw material availability, color on an ink jet printed material, light fastness, ozone fastness, and moisture resistance, $R_{21}$, $R_{22}$, and $R_{23}$ each independently represent preferably an alkyl group having 1 to 3 carbon atoms, a halogen atom, a hydrogen atom, or a carboxyl group, more preferably a halogen atom, a hydrogen atom, or a carboxyl group, and still more preferably a hydrogen atom or a carboxyl group.

In addition, it is preferable that one or two of $R_{21}$, $R_{22}$, and $R_{23}$ represent a hydrogen atom.

In Formula (D), m represents 0, 1, or 2.

From the viewpoint of a balance between moisture resistance and water solubility, m represents preferably 0 or 1 and more preferably 0.

In Formula (D), $R_{24}$, $R_{25}$, and $R_{26}$ each independently represent a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group, or a substituted or unsubstituted heterocyclic group.

The alkyl group having 1 to 18 carbon atoms may be linear, branched, or cyclic (cycloalkyl group), and example thereof include a methyl group, an ethyl group, an n-propyl group, an isopropyl group, an n-butyl group, a t-butyl group, an n-hexyl group, an n-octyl group, an ethylhexyl group, a methylbutyl group, and a cyclohexyl group.

As the alkyl group having 1 to 18 carbon atoms, a linear or branched alkyl group is preferable, and a linear or branched alkyl group having 1 to 8 carbon atoms is more preferable.

The alkyl group may have a substituent, and examples of the substituent include the substituents described above regarding the substituent group A. Among these, an aryl group, a hydroxyl group, a carboxyl group, a carbamoyl group, a mercapto group, or a morpholinyl group is preferable.

Examples of the alkyl group having a substituent include a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, and a 1,2-dicarboxypropyl group.

As the alkenyl group having 2 to 18 carbon atoms, an alkenyl group having 2 to 8 carbon atoms is preferable, and examples thereof include a vinyl group and an allyl group.

The alkenyl group may have a substituent, and examples of the substituent include the substituents described above regarding the substituent group A. Among these, an alkyl group or a carboxyl group is preferable.

Examples of the alkenyl group having a substituent include a 2-methyl-1-propenyl group.

As the aryl group, an aryl group having preferably 6 to 20 carbon atoms is preferable, and examples thereof include a phenyl group and naphthyl group. Among these, a phenyl group is preferable.

The aryl group may have a substituent, and examples of the substituent include the substituents described above regarding the substituent group A. Among these, an alkyl group, a carboxyl group, a substituted or unsubstituted sulfamoyl group, a substituted or unsubstituted carbamoyl group, a nitro group, a hydroxyl group, or a halogen atom is preferable.

Examples of the aryl group having a substituent include a 3,4-dicarboxyphenyl group, a 4-butylphenyl group, and a 4-carboxyphenyl group.

Examples of the aralkyl group include a benzyl group.

The aralkyl group may have a substituent, and examples of the substituent include the substituents described above regarding the substituent group A. Among these, a hydroxyl group or a carboxyl group is preferable. The substituents may further have a substituent among the substituents described above regarding the substituent group A.

Examples of the aralkyl group having a substituent include a 1-carboxy-2-phenyl-ethyl group, a 1-carboxy-2-hydroxyphenylethyl group, and a 4-carboxybenzyl group.

Examples of the heterocyclic group include a pyridyl group, a pyrazinyl group, a thienyl group, a thiadiazolyl group, and a benzothiazolyl group.

The heterocyclic group may have a substituent, and examples of the substituent include the substituents described above regarding the substituent group A. Among these, an alkyl group or a carboxyl group is preferable.

Examples of the heterocyclic group having a substituent include a 2,2,6,6-tetramethylpiperidinyl group.

From the viewpoints of raw material availability, synthesis easiness, water solubility, and moisture resistance, it is preferable that at least one of $R_{24}$, $R_{25}$, or $R_{26}$ represents an alkyl group which is substituted with one to four carboxyl groups, an alkenyl group, an aryl group, an aralkyl group, or a heterocyclic group, and it is more preferable that at least one of $R_{24}$, $R_{25}$, or $R_{26}$ represents an alkyl group which is substituted with one to four carboxyl groups, an alkenyl group, an aryl group, or an aralkyl group.

In addition, it is preferable that one of $R_{24}$ and $R_{25}$ represents a hydrogen atom and the other one of $R_{24}$ and $R_{25}$ represents an alkyl group which is substituted with one to four carboxyl groups, an alkenyl group, an aryl group, or an aralkyl group, and it is more preferable that one of $R_{24}$ and $R_{25}$ represents a hydrogen atom and the other one of $R_{24}$ and $R_{25}$ represents an aryl group which is substituted with one to four carboxyl groups.

In addition, in order to obtain a preferable magenta coloring composition, it is preferable that $R_{24}$ and $R_{25}$ each independently represent a hydrogen atom or a group represented by the following Formula (D-1).

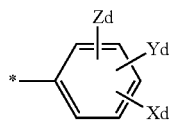

(D-1)

In Formula (D-1), Xd, Yd, and Zd each independently represent a hydrogen atom, a halogen atom, a carboxyl group, a hydroxyl group, a substituted or unsubstituted alkyl group having 1 to 9 carbon atoms, an alkoxy group having 1 to 9 carbon atoms, a substituted or unsubstituted carbamoyl group, a substituted or unsubstituted sulfamoyl group, a substituted or unsubstituted amino group, a nitro group, a sulfonate group, or a carboxylate group. * represents a direct bond to a nitrogen atom.

Specific examples and preferable examples of each of the groups represented by Xd, Yd, and Zd are the same as the specific examples and the preferable examples described above regarding each of the groups represented by $R_{21}$, $R_{22}$, and $R_{23}$.

In Formula (D), $M^4$ represents a hydrogen atom or a counter cation. $M^{4+}$'s may be the same as or different from each other.

In a case where $M^4$ in Formula (D) represents a hydrogen atom, the hydrogen atom is in the form of a free acid. In a case where $M^4$ in Formula (D) represents a counter cation, the counter cation is in the form of a salt.

Examples of the counter cation which forms a salt include a monovalent counter cation. For example, an alkali metal ion, an ammonium ion, or an organic cation is preferable.

Examples of the organic cation include an ammonium ion having a substituent (for example, an ammonium ion which is substituted with an alkyl group or a hydroxyalkyl group), and a cation obtained by adding a hydrogen ion to an organic amine (for example, a cation obtained by adding a hydrogen ion to a polyamine or the like having 2 to 10 amine units such as lower alkylamines, hydroxy-substituted lower alkylamines, carboxy-substituted lower alkylamines, or alkyleneimines having 2 to 4 carbon atoms).

From the viewpoint of water solubility, an alkali metal ion is preferable, and a lithium ion, a sodium ion, or a potassium ion is more preferable. In particular, a sodium ion is preferable from the viewpoint of easy manufacturing.

In Formula (D), $M^{4+}$'s may be the same as or different from each other. That is, the compound represented by Formula (D) being in the form of a salt represent not only a case where all the sulfo groups are salts but also a case where some sulfo groups are in the form of a free acid and some sulfo groups are salts. In addition, as the counter cation which forms a salt, one kind may be used alone, or a plurality of kinds may be used.

In addition, groups (for example, a carboxyl group) other than a sulfo group which may form a salt are as described above.

It is preferable that the total number of sulfo groups, carboxyl groups, and salt groups of acids thereof in a structure of the compound represented by Formula (D) is 6 or less, preferably 5 or less, and still more preferably 4 or less.

In the present invention, the compound represented by Formula (D) in the form of a free acid may be used as it is. In a case where the compound represented by Formula (D) in the form of a salt is obtained during manufacturing, this salt may be used as it is or may be converted into a desired salt form. In addition, some acid groups may be in the form of a salt, a compound in the form of a salt and a compound in the form of a free acid may be present together.

Specific examples of the compound represented by Formula (D) include the following compounds having structures represented by No. 2-1 to 2-61.

2-1
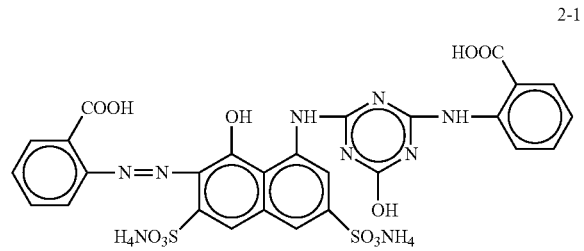
2-2
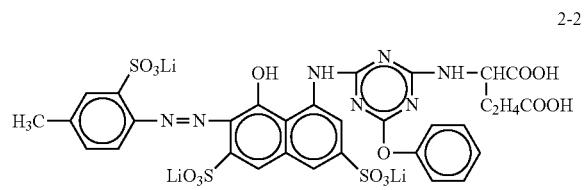
2-3
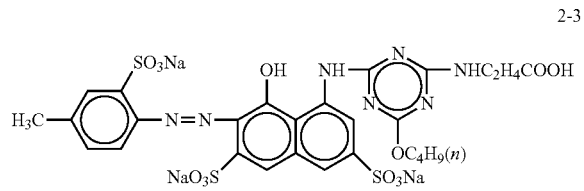
2-4
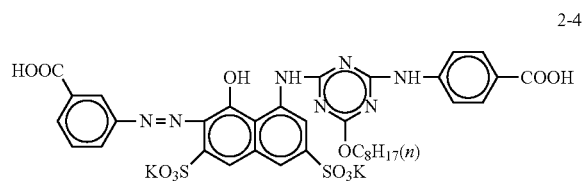
2-5
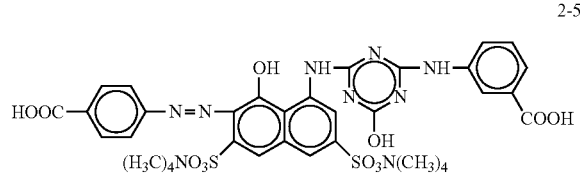
2-6
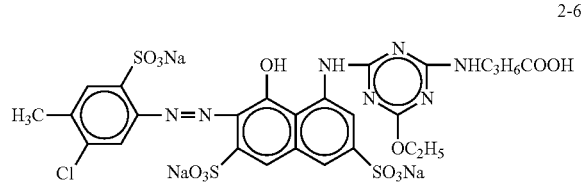
2-7
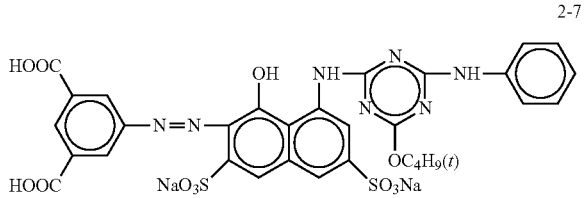
2-8
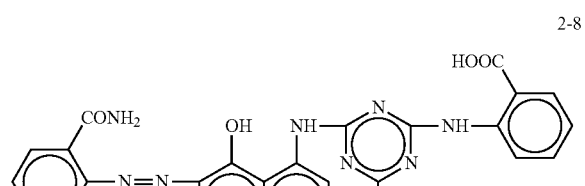
-continued
2-9
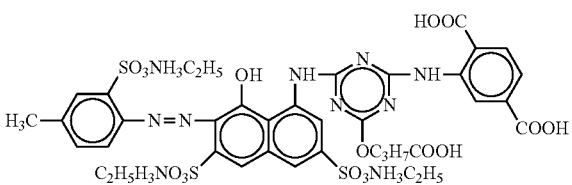
2-10
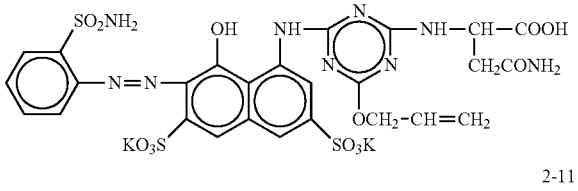
2-11
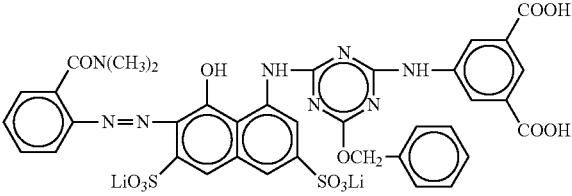
2-12
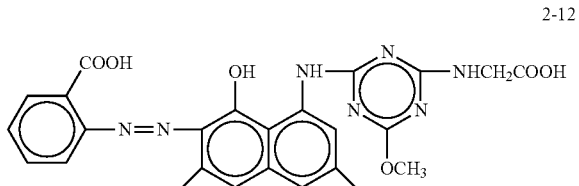
2-13
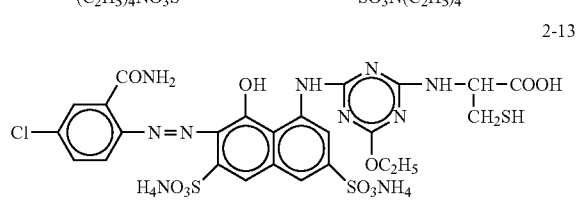
2-14
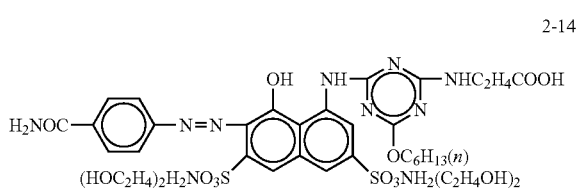
2-15
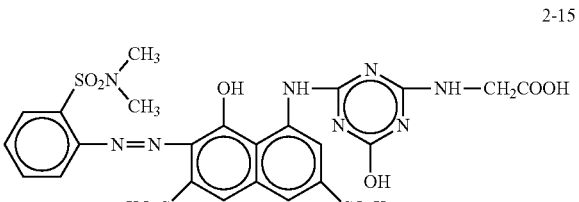
2-16
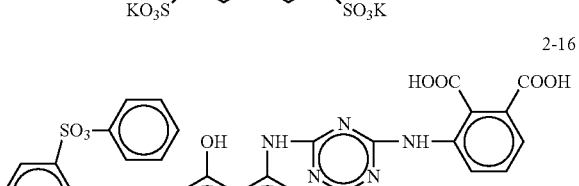

-continued
2-17
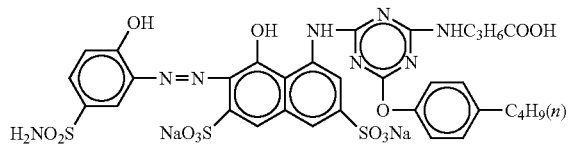
2-18
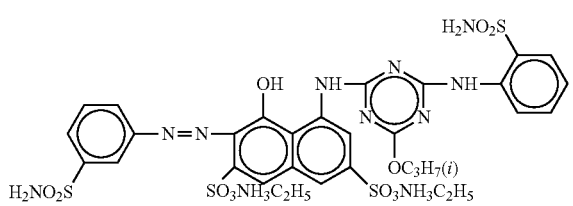
2-19
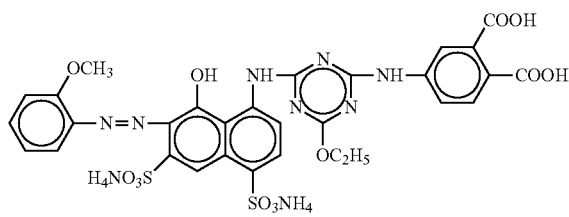
2-20
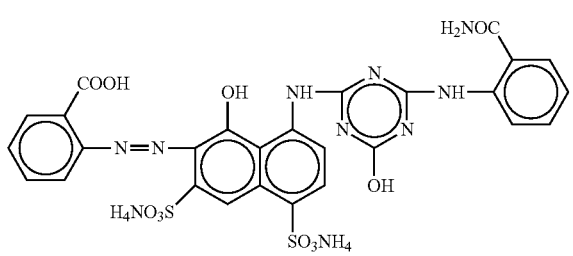
2-21
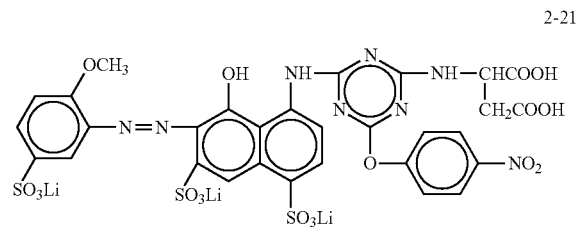
2-22
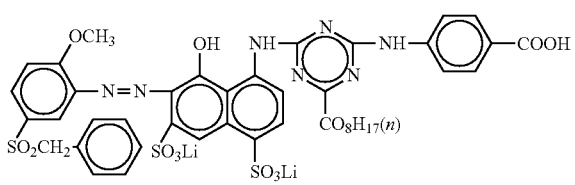
2-23
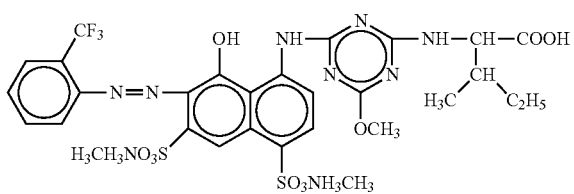
-continued
2-24
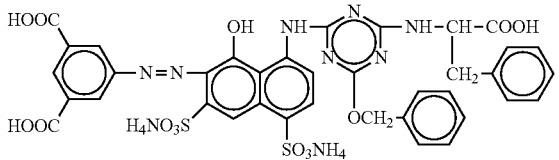
2-25
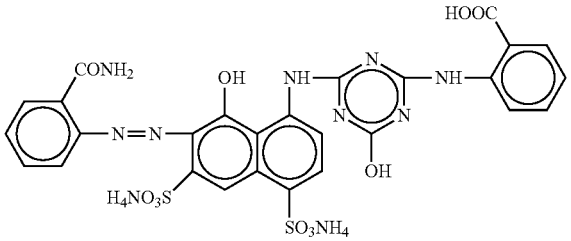
2-26
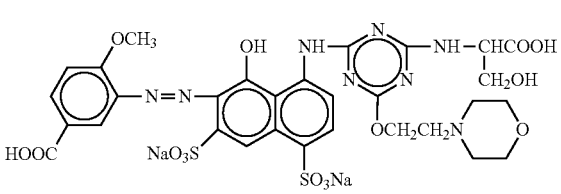
2-27
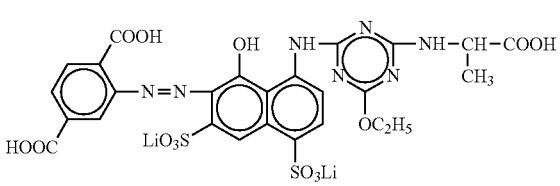
2-28
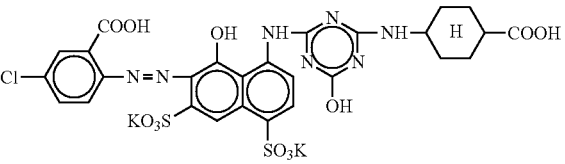
2-29
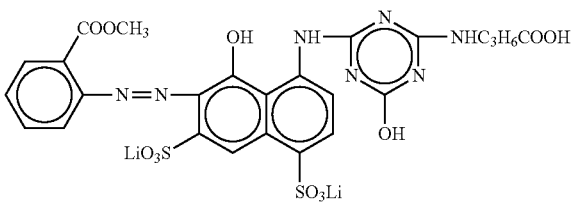
2-30
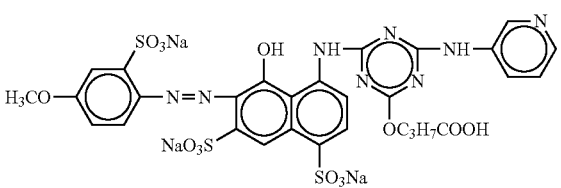

2-31
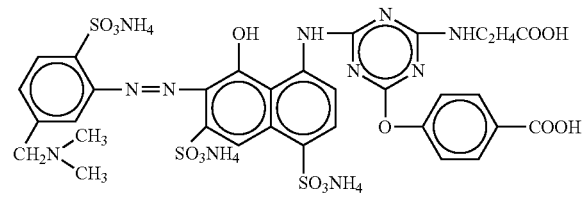
2-32
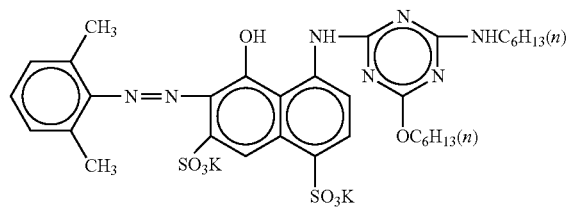
2-33
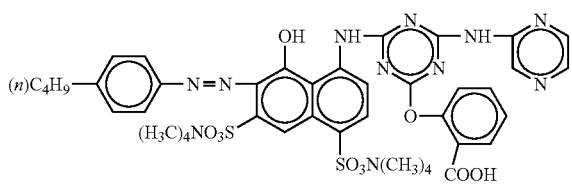
2-34
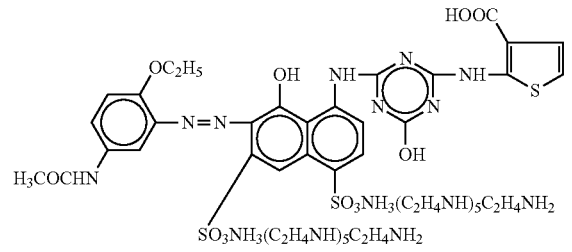
2-35
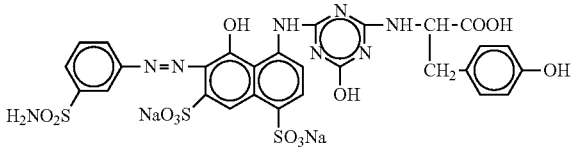
2-36
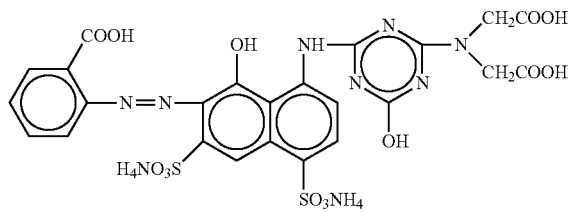
2-37
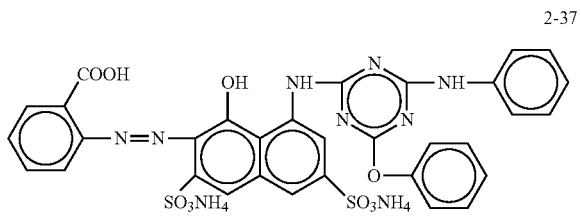
2-38
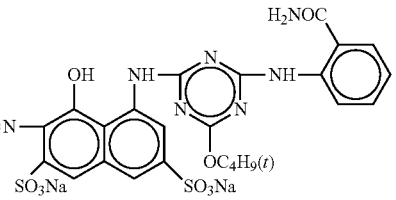
2-39
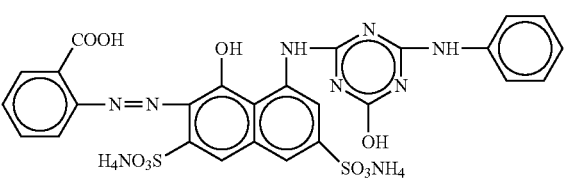
2-40
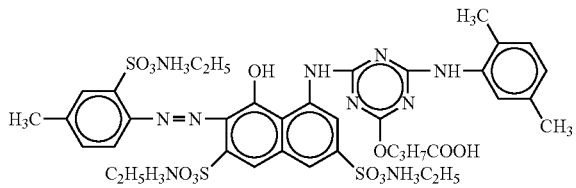
2-41
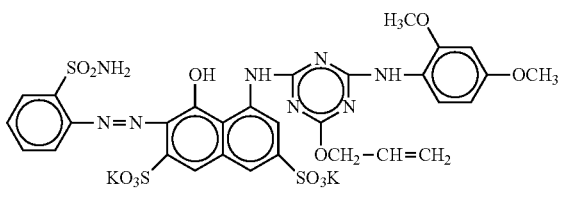
2-42
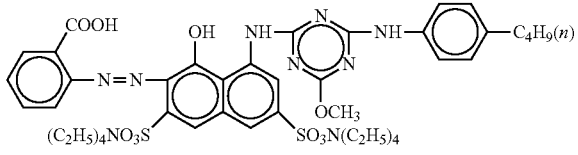
2-43
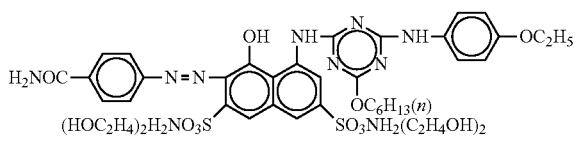
2-44
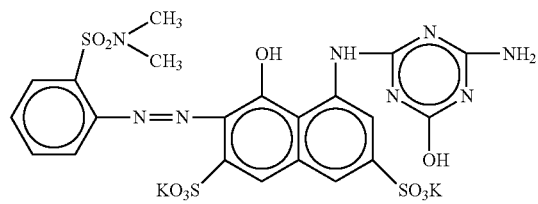

2-45
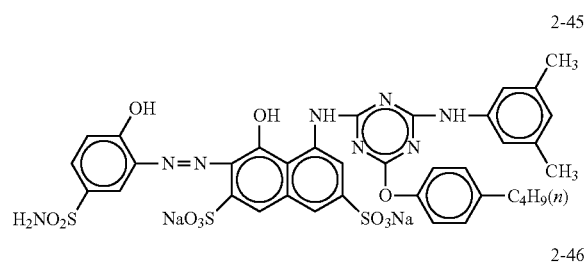
2-46
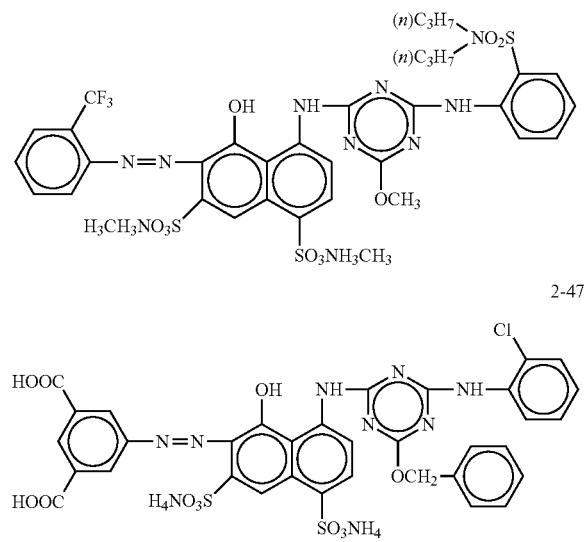
2-47
2-48
2-49
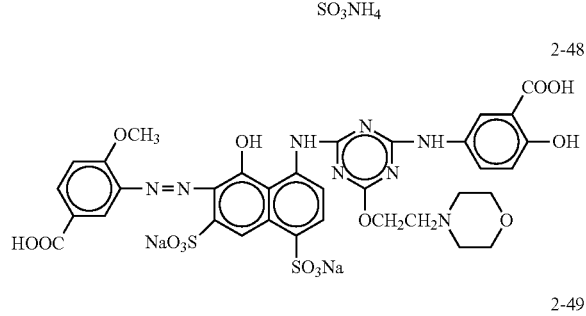
2-50
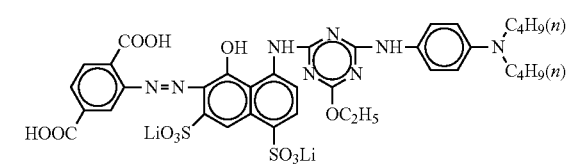
2-51
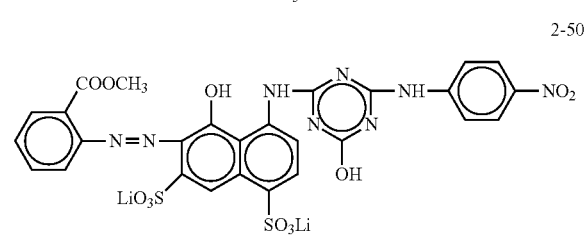
2-52
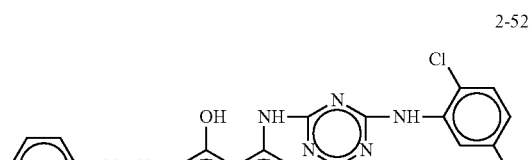
2-53
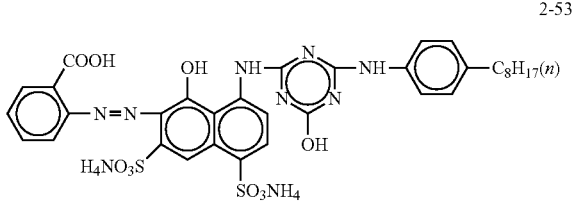
2-54
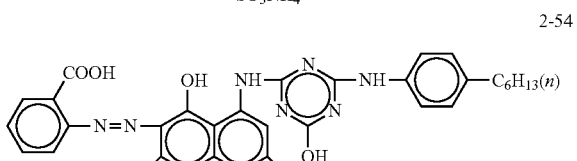
2-55
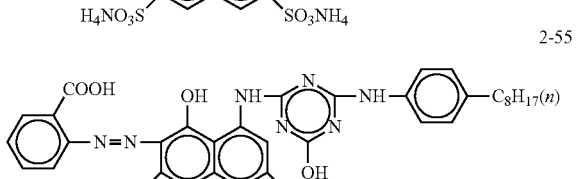
2-56
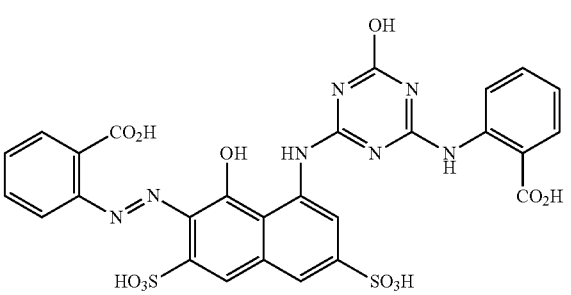
2-57
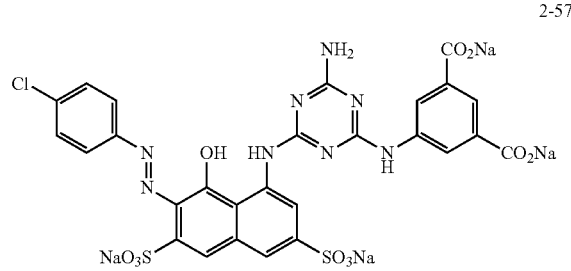
2-58
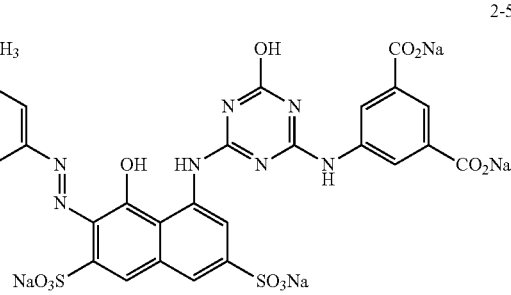

-continued 2-59
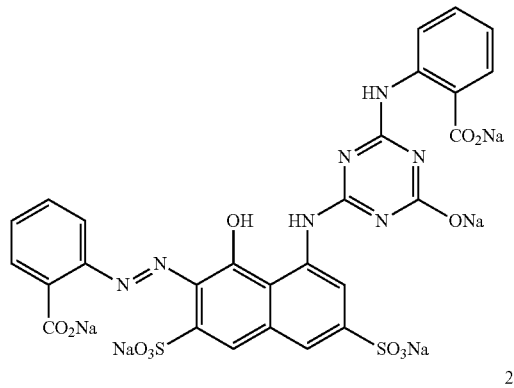

2-60
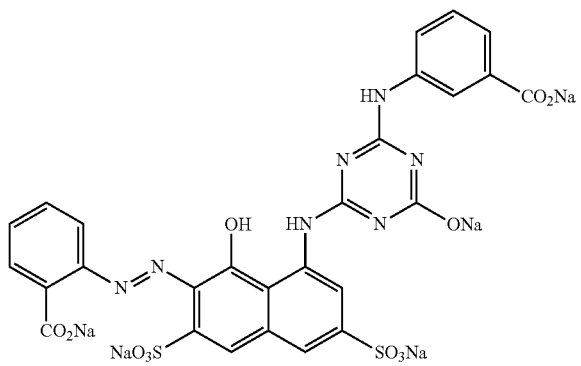

2-61
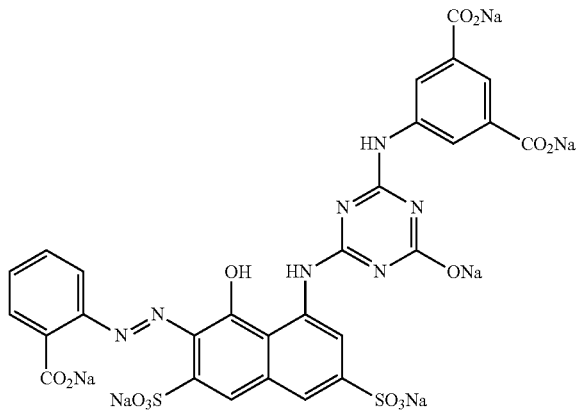

The compound represented by Formula (D) can be synthesized using a well-known synthesis method of the related art (for example, a synthesis method described in JP2013-133397A).

[Coloring Composition]

A coloring composition according to the present invention includes: a compound represented by Formula (1); and a compound represented by Formula (D).

As the compound represented by Formula (1) included in the coloring composition according to the present invention, one kind may be used, or a combination of two or more kinds may be used. In addition, as the compound represented by Formula (D) included in the coloring composition according to the present invention, one kind may be used, or a combination of two or more kinds may be used.

The coloring composition according to the present invention may further include a medium and, in a case where a solvent is used as the medium, is suitable as an ink jet recording ink. The coloring composition according to the present invention can be prepared by using a lipophilic medium or an aqueous medium as the medium and dissolving and/or dispersing the compound represented by Formula (1) and the compound represented by Formula (D) therein. It is preferable that an aqueous medium is used as the medium. Examples of the coloring composition according to the present invention includes an ink composition excluding a medium.

The content of the compound represented by Formula (1) in the coloring composition is determined based on, for example, the kind of the compound represented by Formula (1), and the kind of the solvent component used for manufacturing the coloring composition. The content ($W_1$) of the compound represented by Formula (1) in the coloring composition is preferably 1.0 to 20 mass %, more preferably 2.0 to 10 mass %, still more preferably 2.0 to 5 mass %, even still more preferably 2.0 to 4.0 mass %, and most preferably 2.0 mass % or higher and lower than 3.5 mass % with respect to the total mass of the coloring composition.

The content ($W_D$) of the compound represented by Formula (D) in the coloring composition is preferably 0.1 to 3.0 mass %, more preferably 0.1 to 2.5 mass %, still more preferably 0.1 to 2.0 mass %, and even still more preferably 0.1 mass % or higher and lower than 1.5 mass % with respect to the total mass of the coloring composition.

The total content of the compound represented by Formula (1) and the compound represented by Formula (D) in the coloring composition is preferably 5.0 mass % or lower, more preferably 1.5 to 5.0 mass %, still more preferably 1.5 to 4.5 mass %, even still more preferably 1.5 to 4.0 mass %, even yet still more preferably 1.5 to 3.5 mass %, and most preferably 2.0 to 3.5 mass % with respect to the total mass of the coloring composition.

By adjusting the total content of the compound represented by Formula (1) and the compound represented by Formula (D) in the coloring composition to be 1.5 mass % or higher, the printing density of ink on a recording medium during printing can be improved. In addition, by adjusting the total content of the compound represented by Formula (1) and the compound represented by Formula (D) in the coloring composition to be 5.0 mass % or lower, in a case where the coloring composition is used in an ink jet recording method, the jettability is excellent, and an effect of preventing the clogging or the like of an ink jet nozzle can be obtained.

From the viewpoint of balance between color, saturation, adhesion (printing density), light fastness, ozone fastness, and moisture resistance, a mass ratio ($W_1/W_D$) of the content ($W_1$) of the compound represented by Formula (1) to the content ($W_D$) of the compound represented by Formula (D) is preferably 99/1 to 50/50, more preferably 99/1 to 60/40, still more preferably 99/1 to 70/30, and even still more preferably 95/5 to 80/20.

The coloring composition according to the present invention may further include a coloring material other than the compound represented by Formula (1) and the compound represented by Formula (D).

The coloring composition according to the present invention optionally includes other additives within a range where the effects of the present invention are exhibited. The coloring composition according to the present invention can be preferably used as an ink jet recording ink.

[Ink Jet Recording Ink]

An ink jet recording ink can be prepared by dissolving and/or dispersing the compound represented by Formula (1)

and the compound represented by Formula (D) in a lipophilic medium or an aqueous medium. In the ink jet recording ink, an aqueous medium is preferably used.

In the ink jet recording ink, preferable ranges of the content of the compound represented by Formula (1), the content of the compound represented by Formula (D), and the mass ratio of the content of the compound represented by Formula (1) to the content of the compound represented by Formula (D) are the same as described above.

The ink jet recording ink according to the present invention optionally includes other additives within a range where the effects of the present invention are exhibited. Examples of the other additives include well-known additives such as an anti-drying agent (wetting agent), an antifading agent, an emulsion stabilizer, a penetration enhancer, a ultraviolet absorber, a preservative, a fungicide, a pH adjuster, a surface tension adjuster, an antifoaming agent, a viscosity adjuster, a dispersant, a dispersion stabilizer, a rust inhibitor, a chelating agent, or a betaine compound. In the case of a water-soluble ink, these various additives can be directly added to the ink solution. In a case where an oil-soluble dye is used in the form of a dispersion, in general, the additives are added to a dye dispersion after the preparation of the dispersion. However, the additives may be added in the form of an oil phase or a water phase during the preparation.

The anti-drying agent is preferably used to prevent clogging caused by the ink jet recording ink being dried at an ink jetting port of a nozzle used in an ink jet recording method.

As the anti-drying agent, a water-soluble organic solvent having a lower vapor pressure than water is preferable. Specific examples of the water-soluble organic solvent which is preferable to prevent drying include: a polyhydric alcohol such as ethylene glycol, propylene glycol, diethylene glycol, polyethylene glycol, thiodiglycol, dithiodiglycol, 2-methyl-1,3-propanediol, 1,2,6-hexanetriol, an acetylenic glycol derivative, glycerin, or trimethylolpropane; a polyhydric alcohol lower alkyl ether such as ethylene glycol monomethyl (or ethyl) ether, diethylene glycol monomethyl (or ethyl) ether, or triethylene glycol monoethyl (or butyl) ether; a heterocycle such as 2-pyrrolidone, N-methyl-2-pyrrolidone, 1,3-dimethyl-2-imidazolidinone, or N-ethylmorpholine; a sulfur-containing compound such as sulfolane, dimethyl sulfoxide, or 3-sulfolane; a polyfunctional compound such as diacetone alcohol or diethanolamine; and a urea derivative. Among these, a polyhydric alcohol such as glycerin or diethylene glycol is more preferable. In addition, among the above-described anti-drying agents, one kind may be used alone, or a combination of two or more kinds may be used. The content of the anti-drying agent in the ink is preferably 10 to 50 mass %.

The penetration enhancer is used in order to enhance the penetration of the ink jet recording ink into paper. As the penetration enhancer, for example, an alcohol such as ethanol, isopropanol, butanol, di(tri)ethylene glycol monobutyl ether, or 1,2-hexanediol, sodium lauryl sulfate, sodium oleate, or a nonionic surfactant can be used. Typically, the penetration enhancer sufficiently functions in a case where the addition amount thereof is 5 to 30 mass %. It is preferable that the penetration enhancer is used in an addition amount range where blurring of printed characters and images or page omission (print through) do not occur.

The ultraviolet absorber can be used in order to improve storage of images. As the ultraviolet absorber, for example, a benzotriazole compound described in JP1983-185677A (JP-S58-185677A), JP1986-190537A (JP-S61-190537A), JP1990-782A (JP-H2-782A), JP1993-197075A (JP-H5-197075A), and JP1997-34057A (JP-H9-34057A), a benzophenone compound described in JP1971-2784A (JP-S46-2784A), JP1993-194483A (JP-H5-194483A), and U.S. Pat. No. 3,214,463A, a cinnamic acid compound described in JP1973-30492B (JP-S48-30492B), JP1981-21141B (JP-S56-21141B), and JP1998-88106A (JP-H10-88106A), a triazine compound described in JP1992-298503A (JP-H4-298503A), JP1996-53427A (JP-H8-53427A), JP1996-239368A (JP-H8-239368A), JP1999-182621A (JP-H10-182621A), and JP1996-501291A (JP-H8-501291A), a compound described in Research Disclosure No. 24239, or a so-called fluorescence brightening agent that is a compound that absorbs ultraviolet light to emit fluorescence such as a stilbene compound or a benzoxazol compound can also be used.

The antifading agent can be used in order to improve storage of images. As the antifading agent, various organic antifading agents or metal complexes can be used. Examples of the organic antifading agent include hydroquinones, alkoxyphenols, dialkoxyphenols, phenols, anilines, amines, indanes, chromans, alkoxyanilines, and heterocycles. Examples of the metal complex include a nickel complex and a zinc complex. Specifically, compounds described in the patents which are cited in Sections I to J in No. VII in Research Disclosure No. 17643, Research Disclosure No. 15162, the left column in page 650 in Research Disclosure No. 18716, page 527 in Research Disclosure No. 36544, page 872 in Research Disclosure No. 307105, and Research Disclosure No. 15162, or compounds which are included in formulae and compound examples of representative compounds described in page 127 to page 137 in JP1987-215272A (JP-S62-215272A) can be used.

Examples of the fungicide include sodium dehydroacetate, sodium benzoate, sodium pyridinethione-1-oxide, ethyl p-hydroxybenzoate ester, 1,2-benzisothiazolin-3-one, and salts thereof. The amount of the fungicide used in the ink is preferably 0.02 to 1.00 mass %.

As the pH adjuster, a neutralizer (an organic base or an inorganic alkali) can be used. In order to improve storage stability of the ink jet recording ink, the pH adjuster is added such that the pH of the ink jet recording ink is preferably 6 to 10 and more preferably 7 to 10.

Examples of the surface tension adjuster include a nonionic surfactant, a cation surfactant, and an anionic surfactant. The surface tension of the ink jet recording ink according to the present invention is preferably 25 to 70 mN/m and more preferably 25 to 60 mN/m. In addition, the viscosity of the ink jet recording ink according to the present invention is preferably 30 mPa·s or lower and more preferably 20 mPa·s or lower. Preferable examples of the surfactant include: an anionic surfactant such as an fatty acid salt, an alkylsulfonate, an alkylbenzenesulfonate, an alkylnaphthalenesulfonate, a dialkylsulfosuccinate, an alkylphosphate, a naphthalene sulfonic acid formalin condensate, or a polyoxyethylene alkylsulfonate; and a nonionic surfactant such as polyoxyethylene alkyl ether, polyoxyethylene alkyl aryl ether, polyoxyethylene fatty acid ester, sorbitan fatty acid ester, polyoxyethylene sorbitan fatty acid ester, polyoxyethylene alkyl amine, glycerin fatty acid ester, or an oxyethyleneoxypropylene block copolymer. In addition, SURFYNOLS (manufactured by Air Products&Chemicals Inc.) that is an acetylene polyoxyethylene oxide surfactant can also be preferably used. In addition, for example, an amine oxide amphoteric surfactant such as N,N-dimethyl-N-alkyl amine oxide is also preferable. Further, for example, surfactants which are described in pp. 37 and 38 in JP1984-157636A (JP-S59-157636A) and Research Disclosure No. 308119 (1989) can be used.

As the antifoaming agent, for example, a fluorine compound, a silicone compound, or a chelating agent such as ethylenediaminetetraacetic acid (EDTA) can also be optionally used.

The betaine compound can be used in order to prevent image blurring under a high-humidity condition. As the betaine compound, for example, a compound described in JP2004-285269A can be preferably used. Although a preferable range thereof varies depending on the kind thereof, the addition amount of the betaine compound in the ink jet recording ink is preferably 0.01 to 10.0 mass %, more preferably 0.01 to 5.0 mass %, and most preferably 0.01 to 3.0 mass %.

As the aqueous medium, a mixture including water as a major component and to which a water-miscible organic solvent is optionally added can be used. Examples of the water-miscible organic solvent include an alcohol (for example, methanol, ethanol, propanol, isopropanol, butanol, isobutanol, sec-butanol, t-butanol, pentanol, hexanol, cyclohexanol, or benzyl alcohol), a polyhydric alcohol (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, or thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, or ethylene glycol monophenyl ether), an amine (for example, ethanol amine, diethanol amine, triethanol amine, N-methyl diethanol amine, N-ethyl diethanol amine, morpholine, N-ethyl morpholine, ethylene diamine, diethylene triamine, triethylene tetramine, polyethyleneimine, or tetramethyl propylene diamine), and other polar solvents (for example, formamide, N,N-dimethyl formamide, N,N-dimethyl acetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, or acetone). As the water-miscible organic solvent, two or more kinds may be used in combination.

The viscosity of the ink jet recording ink according to the present invention is preferably 30 mPa·s or lower. In addition, the surface tension of the ink for ink jet textile printing according to the present invention is preferably 25 mN/m to 70 mN/m. The viscosity and the surface tension can be adjusted by adding various additives such as a viscosity adjuster, a surface tension adjuster, a specific resistance adjuster, a film conditioner, an ultraviolet absorber, an antioxidant, an antifading agent, a fungicide, a rust inhibitor, a dispersant, and a surfactant.

The ink jet recording ink according to the present invention can be used as any one of various color inks but is preferably used as a magenta ink. In addition, the ink jet recording ink according to the present invention can be used not only for forming a monochromic image but also for forming a full-color image. In order to form a full-color image, a magenta ink, a cyan ink, and a yellow ink can be used. In addition, in order to adjust the tone, a black ink may be further used.

The ink jet recording ink according to the present invention can be used in a recording method such as printing, duplicating, marking, writing, drawing, or stamping and is particularly suitable in an ink jet recording method.

[Ink Jet Recording Method]

In the ink jet recording method according to the present invention, energy is applied to the ink jet recording ink according to the present invention to form an image on a well-known image receiving material, that is, plain paper or resin coated paper, for example, ink jet paper, films, electrophotographic common paper, fabric, glass, metal, or ceramic described in JP1996-169172A (JP-H8-169172A), JP1996-27693A (JP-H8-27693A), JP1990-276670A (JP-H2-276670A), JP1995-276789A (JP-H7-276789A), JP1997-323475A (JP-H9-323475A), JP1987-238783A (JP-S62-238783A), JP1998-153989A (JP-H10-153989A), JP1998-217473A (JP-H10-217473A), JP1998-235995A (JP-H10-235995A), JP1998-337947A (JP-H10-337947A), JP1998-217597A (JP-H10-217597A), and JP1998-337947A (JP-H10-337947A).

During the formation of an image, in order to impart glossiness and water fastness or to improve weather fastness, a polymer particle dispersion (also referred to as a polymer latex) may also be used. Regarding the timing when the polymer latex is added to the image receiving material, the addition may be performed before, during, or after the addition of the colorants. Therefore, a position where the addition is performed may be the image receiving paper or the ink. Alternatively, a liquid material consisting only of the polymer latex may be used. Specifically, a method described in, for example, JP2000-363090, JP2000-315231, JP2000-354380, JP2000-343944, JP2000-268952, JP2000-299465, and JP2000-297365, can be preferably used.

[Ink Jet Printer Cartridge and Ink Jet Recorded Material]

An ink jet printer cartridge for ink jet recording according to the present invention is filled with the above-described ink jet recording ink according to the present invention. In addition, an ink jet recorded material is obtained by forming a color image on a recording material using the ink jet recording ink according to the present invention.

The ink jet recording ink according to the present invention can be used in well-known ink jet recording methods without any particular limitation, for example, a charge control method of jetting ink using an electrostatic attraction force, a drop-on-demand method (pressure pulse method) using a vibration pressure of a piezoelectric element, an acoustic ink jet method of jetting ink using a radiation pressure by converting an electrical signal into an acoustic beam and irradiating the ink with the acoustic beam, or a thermal ink jet method of heating ink to form bubbles and using a pressure generated from the bubbles. Examples of the ink jet recording method include a method of jetting a plurality of droplets of a low-density ink called photo ink with a small volume, a method of improving image quality using a plurality of inks having substantially the same color and different densities, and a method of using a colorless transparent ink.

EXAMPLES

Hereinafter, the present invention will be described using examples, but the present invention is not limited to these examples. Unless specified otherwise, "%" and "part(s)" represent "mass %" and "part(s) by mass".

Synthesis Examples (Synthesis of Exemplary Compound (1-11))

An exemplary compound (1-11) can be synthesized, for example, using the following scheme.

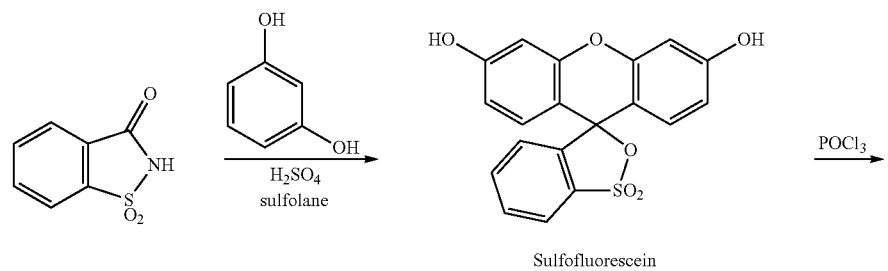
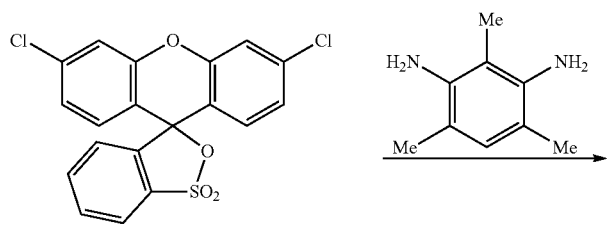
Sulfofluorescein
DCSF
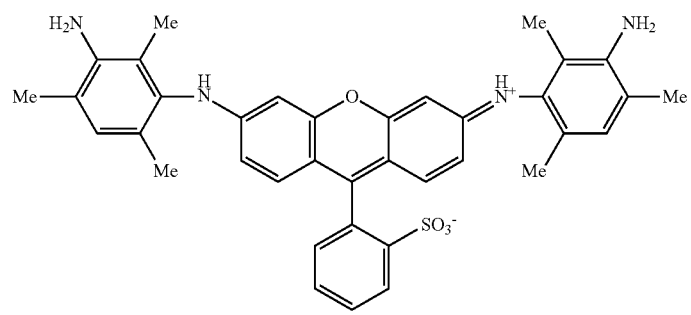
Intermediate (A)
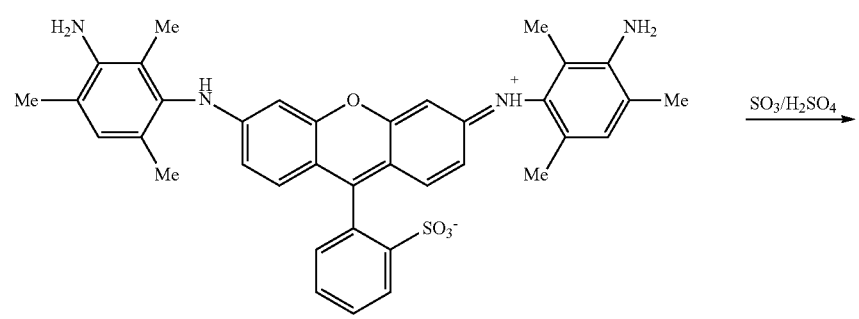
Intermediate (A)
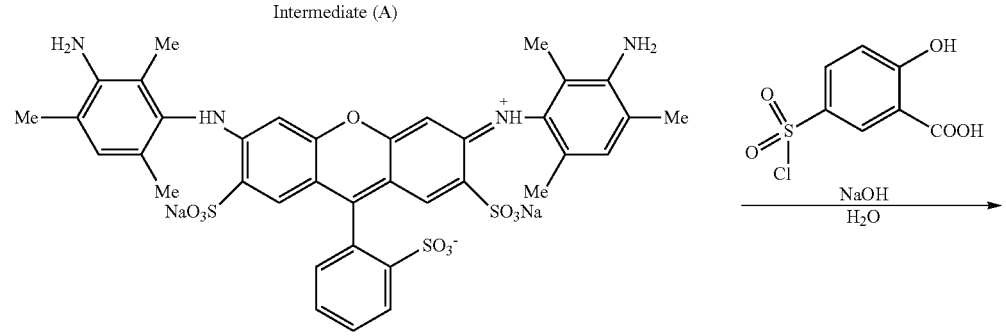
Intermediate (B)

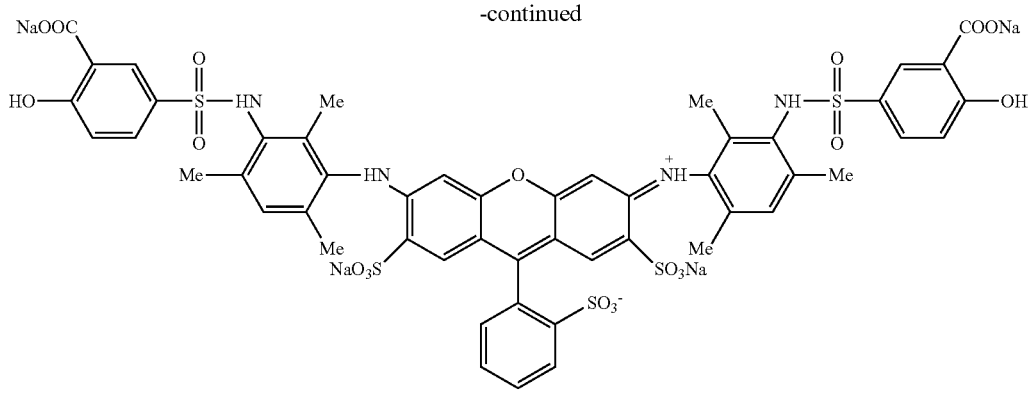

Exemplary Compound (1-11)

(Synthesis of Sulfofluorescein)

76.4 g of saccharin and 100 g of concentrated sulfuric acid were added to a 1L three-neck flask at room temperature (20° C.), and the mixed solution was heated to 120° C. 200 g of sulfolane and 103.3 g of resorcin were added to the mixed solution. After the addition, the mixed solution was heated to 140° C. and was stirred at 140° C. for 20 hours. Next, the obtained reaction solution was cooled to 20° C. for 1 hour. After cooling, 500 g of water was added to the reaction solution for 30 minutes. After the addition, the reaction solution was stirred for 30 minutes. The obtained suspension was filtered, and the obtained crystals were washed with 130 mL of water four times. After washing, the crystals were dried by blowing air at 50° C. for 20 hours. As a result, 68.5 g of sulfofluorescein was obtained as yellow crystals (yield: 45%).

(Synthesis of DCSF)

36.8 g of sulfofluorescein and 150 g of phosphorus oxychloride were added to a 200 mL three-neck flask. The mixture was heated to 105° C. and was stirred at 105° C. for 18 hours. Next, the obtained reaction solution was cooled to 20° C. for 1 hour. The obtained reaction solution was added to a 2 L three-neck flask to which 1 L of water was added for 20 minutes while cooling the flask in a water bath at 20° C. such that the water temperature did not exceed 35° C. After the addition, the reaction solution was stirred at 20° C. for 1 hour. The obtained suspension was filtered, and the obtained crystals were washed with 200 mL of water once and then was washed with 200 mL of acetonitrile twice. After washing, the crystals were dried by blowing air at 50° C. for 18 hours. As a result, 22.7 g of dichloro sulfophthalein (DCSF) was obtained (yield: 56%).

(Synthesis of Intermediate Product (A))

30 g of dichloro sulfophthalein (DCSF), 63 g of 2,4,6-trimethyl-1,3-phenylenediamine (manufactured by Tokyo Chemical Industry Co., Ltd.), and 11 g of zinc chloride were added to 265 g of ethylene glycol, and the components were caused to react with each other at 150° C. for 6 hours. The reaction solution was cooled to room temperature, and 300 mL of 0.6 mol/L hydrochloric acid was added dropwise to precipitate crystals. The precipitated crystals were separated by filtration and were washed with 300 mL of water. The obtained crystals were dried at 60° C. for 12 hours to obtain crystals of an intermediate (A).

Yield amount: 23 g
Yield: 50%
Mass spectrum (MS) (m/z)=633 ([M+1]+, 100%)

(Synthesis of Intermediate (B))

23.0 g of the intermediate (A) was added to 420 g of 10% fuming sulfuric acid, and the components were caused to react with each other at room temperature for 48 hours. The reaction solution was poured into a large excess of ethyl acetate, and precipitated crystals was separated by filtration. The separated crystals were dissolved in 500 mL of methanol, the solution was adjusted to pH 7 using a 28% sodium methoxide methanol solution, and precipitated sodium sulfate was removed by filtration. Next, the filtrate was condensed and dried using a rotary evaporator. The obtained residue was purified by column chromatography (filler: SEPHADEX LH-20 (manufactured by Pharmacia)), developing solvent: methanol) to obtain crystals of an intermediate (B).

Yield amount: 21.0 g
Yield: 68%
Mass spectrum (MS) (m/z)=793 ([M−2Na+H]−, 100%)

(Synthesis of Exemplary Compound (1-11))

3.0 g of the intermediate (B) was dissolved in 15 mL of ultrapure water, and the reaction solution was cooled to an internal temperature of 10° C. or lower. 2.55 g of powder of 5-(chlorosulfonyl)salicylic acid (synthesized using a method described in German Patent No. DE264786) was added, 10% NaOH aqueous solution was added dropwise at an internal temperature of 10° C. or lower such that the pH of the reaction solution was maintained at 8.0, and the dropwise addition was continued until the pH did not change. The obtained reaction solution was poured into a large excess of isopropyl alcohol, and precipitated solid was separated by filtration. The obtained solid was dissolved in 20 mL of a mixed solvent (water/methanol=1/1). Next, the obtained solution was purified by column chromatography (filler: SEPHADEX LH-20 (manufactured by Pharmacia), developing solvent: water/methanol). Next, an inorganic salt and a residual organic solvent were removed using a dialysis membrane (molecular weight cutoff: 3500, Spectra/Por 3 Dialysis Membrane (trade name, manufactured by Spectrum, Inc.)). The pH of the obtained aqueous solution was adjusted to 7 using a diluted sodium hydroxide aqueous solution, and dust was removed by filtration using a membrane filter. The obtained aqueous solution was condensed and dried using a rotary evaporator. As a result, green glossy crystals of the exemplary compound (1-11) were obtained.

Yield amount: 1.5 g
Yield: 33%
MS (m/z)=1191 ([M−1]−, 100%)

In an absorption spectrum of the exemplary compound (1-11) in the dilute aqueous solution, the absorption maximum was 532 nm, and the molar absorption coefficient was 87000. FIG. 1 is a diagram showing a $^1$H-NMR spectrum of the exemplary compound (1-11) in dimethyl sulfoxide-d6.

(Synthesis of Exemplary Compound (1-18))

An exemplary compound (1-18) can be synthesized, for example, using the following scheme.

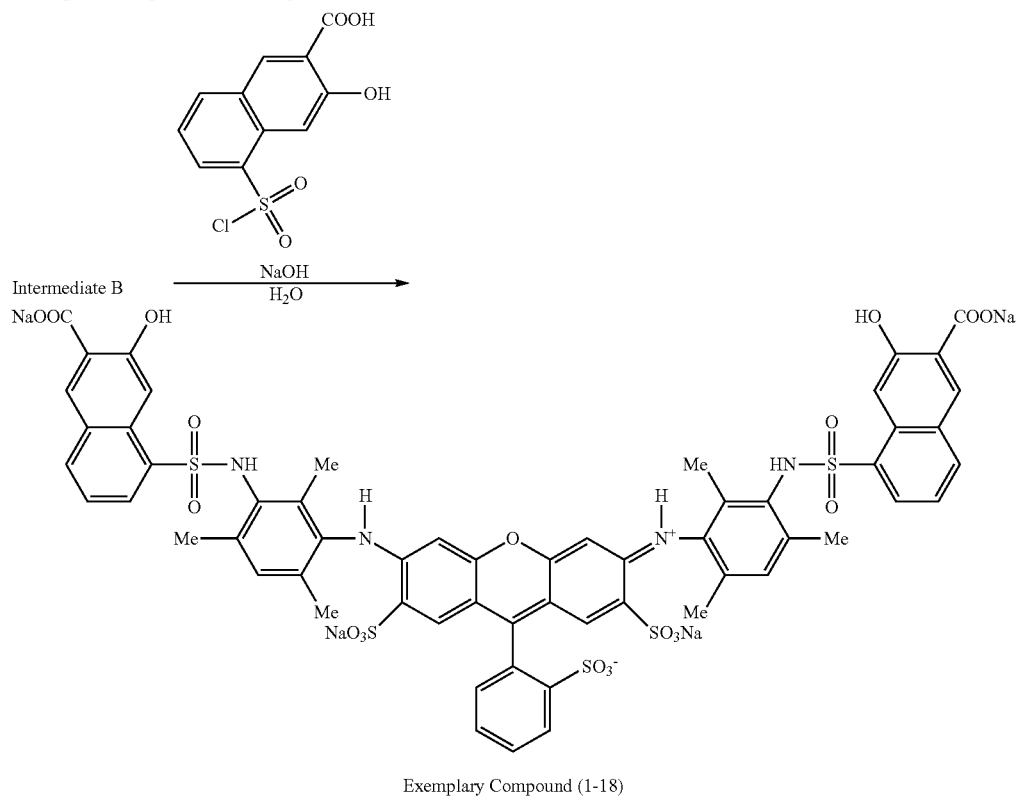

Exemplary Compound (1-18)

3.0 g of the intermediate (B) obtained as the synthetic intermediate of the exemplary compound (1-11) described above was dissolved in 15 mw of ultrapure water, and the obtained solution was cooled to an internal temperature of 10° C. or lower. 2.2 g of powder of 5-chlorosulfonyl-3-hydroxy-2-napthoic acid (synthesized using a method described in German Patent No. DE264786) was added, 10% NaOH aqueous solution was added dropwise at an internal temperature of 10° C. or lower such that the pH of the reaction solution was maintained at 7.5, and the dropwise addition was continued until the pH did not change. The obtained reaction solution was poured into a large excess of isopropyl alcohol, and precipitated solid was separated by filtration. The obtained aqueous solid was dissolved in 20 mL of a mixed solvent water/methanol=1/1). Next, the obtained solution was purified by column chromatography (filler: SEPHADEX LH-20 (manufactured by Pharmacia), developing solvent: water/methanol). Next, an inorganic salt and a residual organic solvent were removed using a dialysis membrane (molecular weight cutoff: 3500, Spectra/Por 3 Dialysis Membrane (trade name, manufactured by Spectrum, Inc.)). The pH of the obtained aqueous solution was adjusted to 7 using a diluted sodium hydroxide aqueous solution, and dust was removed by filtration using a membrane filter. The obtained aqueous solution was condensed and dried using a rotary evaporator. As a result, green glossy crystals of the exemplary compound (1-18) were obtained.

Yield amount: 1.2 g

Yield: 24%

MS (m/z)=1291 ([M−1]⁻, 1000%)

Figure 2:
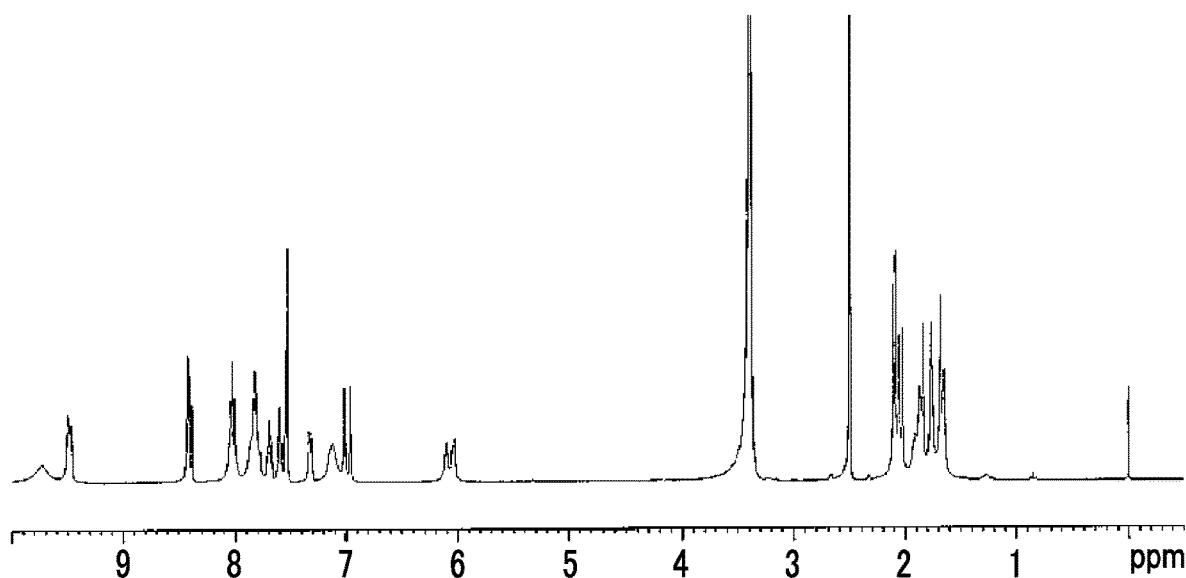
FIG. 2 is a diagram showing a ¹H-NMR spectrum of an exemplary compound (1-18) in dimethyl sulfoxide-d6.

In an absorption spectrum of the exemplary compound (1-18) in the dilute aqueous solution, the absorption maximum was 532 nm, and the molar absorption coefficient was 85000. FIG. 2 is a diagram showing a $^1$H-NMR spectrum of the exemplary compound (1-18) in dimethyl sulfoxide-d6.

(Synthesis of Exemplary Compound (1-25))

An exemplary compound (1-25) can be synthesized, for example, using the following scheme.

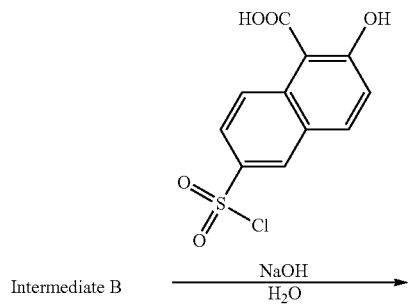

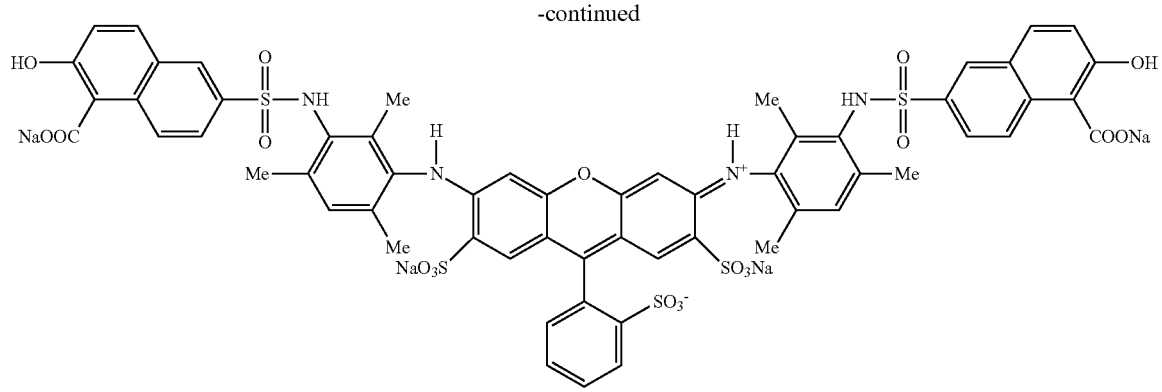

Exemplary Compound (1-25)

3.0 g of the intermediate (B) obtained as the synthetic intermediate of the exemplary compound (1-11) described above was dissolved in 15 mL of ultrapure water, and the obtained solution was cooled to an internal temperature of 10° C. or lower. 2.2 g of powder of 6-chlorosulfonyl-2-hydroxy-1-naphthoic acid (synthesized using a method described in German Patent No. DE278091) was added, 10% NaOH aqueous solution was added dropwise at an internal temperature of 10° C. or lower such that the pH of the reaction solution was maintained at 7.5, and the dropwise addition was continued until the pH did not change. The obtained reaction solution was poured into a large excess of isopropyl alcohol, and precipitated solid was separated by filtration. The obtained solid was dissolved in 20 mL of a mixed solvent (water/methanol=1/1). Next, the obtained solution was purified by column chromatography (filler: SEPHADEX LH-20 (manufactured by Pharmacia), developing solvent: water/methanol). Next, an inorganic salt and a residual organic solvent were removed using a dialysis membrane (molecular weight cutoff: 3500, Spectra/Por 3 Dialysis Membrane (trade name, manufactured by Spectrum, Inc.)). The pH of the obtained aqueous solution was adjusted to 7 using a diluted sodium hydroxide aqueous solution, and dust was removed by filtration using a membrane filter. The obtained aqueous solution was condensed and dried using a rotary evaporator. As a result, green glossy crystals of the exemplary compound (1-25) were obtained.

Yield amount: 1.3 g
Yield: 26%
MS (m/z)=1291 ([M−1]$^-$, 100%)

In an absorption spectrum of Exemplary Compound (1-25) in the dilute aqueous solution, the absorption maximum was 532 nm, and the molar absorption coefficient was 83000.

(Synthesis of Exemplary Compound (1-26))

An exemplary compound (1-26) can be synthesized, for example, using the following scheme.

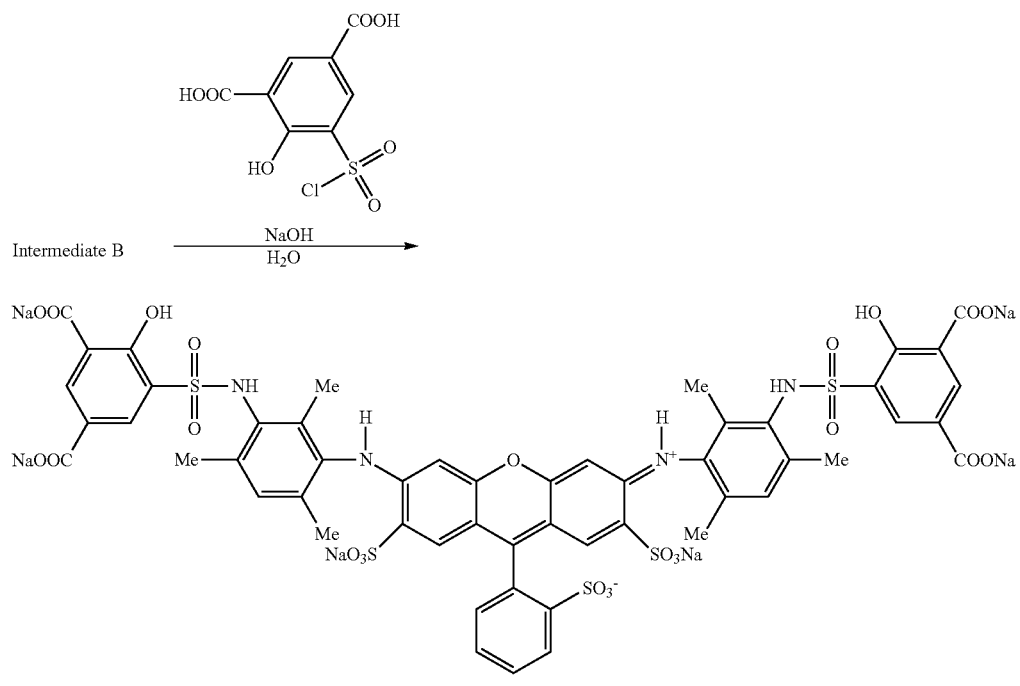

Exemplary Compound (1-26)

3.0 g of the intermediate (B) obtained as the synthetic intermediate of the exemplary compound (1-11) described above was dissolved in 15 mL of ultrapure water, and the obtained solution was cooled to an internal temperature of 10° C. or lower. 2.7 g of powder of 5-chlorosulfonyl-4-hydroxyisophthalic acid (synthesized using a method described in German Patent No. DE264786) was added, 10% NaOH aqueous solution was added dropwise at an internal temperature of 10° C. or lower such that the pH of the reaction solution was maintained at 7.5, and the dropwise addition was continued until the pH did not change. The obtained reaction solution was poured into a large excess of isopropyl alcohol, and precipitated solid was separated by filtration. The obtained solid was dissolved in 20 mL of a mixed solvent (water/methanol=1/1). Next, the obtained solution was purified by column chromatography (filler: SEPHADEX LH-20 (manufactured by Pharmacia), developing solvent: water/methanol). Next, an inorganic salt and a residual organic solvent were removed using a dialysis membrane (molecular weight cutoff: 3500, Spectra/Por 3 Dialysis Membrane (trade name, manufactured by Spectrum, Inc.)). The pH of the obtained aqueous solution was adjusted to 7 using a diluted sodium hydroxide aqueous solution, and dust was removed by filtration using a membrane filter. The obtained aqueous solution was condensed and dried using a rotary evaporator. As a result, green glossy crystals of the exemplary compound (1-26) were obtained.

Yield amount: 1.8 g

Yield: 36%

MS (m/z)=1279 ([M−1]−, 100%)

Figure 3:
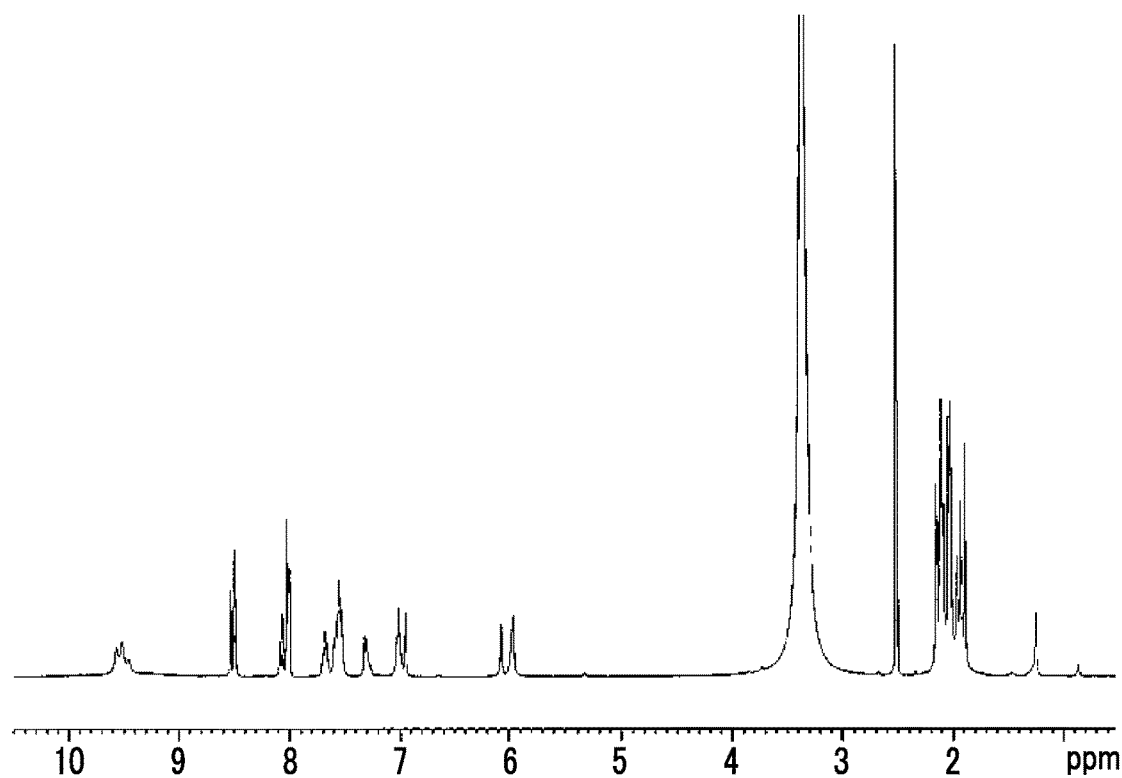
FIG. 3 is a diagram showing a ¹H-NMR spectrum of an exemplary compound (1-26) in dimethyl sulfoxide-d6.

In an absorption spectrum, Inc)) The pH of the of Exemplary Compound (1-26) in the dilute aqueous solution, the absorption maximum was 534 nm, and the molar absorption coefficient was 95000. FIG. 3 is a diagram showing a $^1$H-NMR spectrum of the exemplary compound (1-26) in dimethyl sulfoxide-d6.

(Synthesis of Exemplary Compound (1-30))

An exemplary compound (1-30) can be synthesized, for example, using the following scheme.

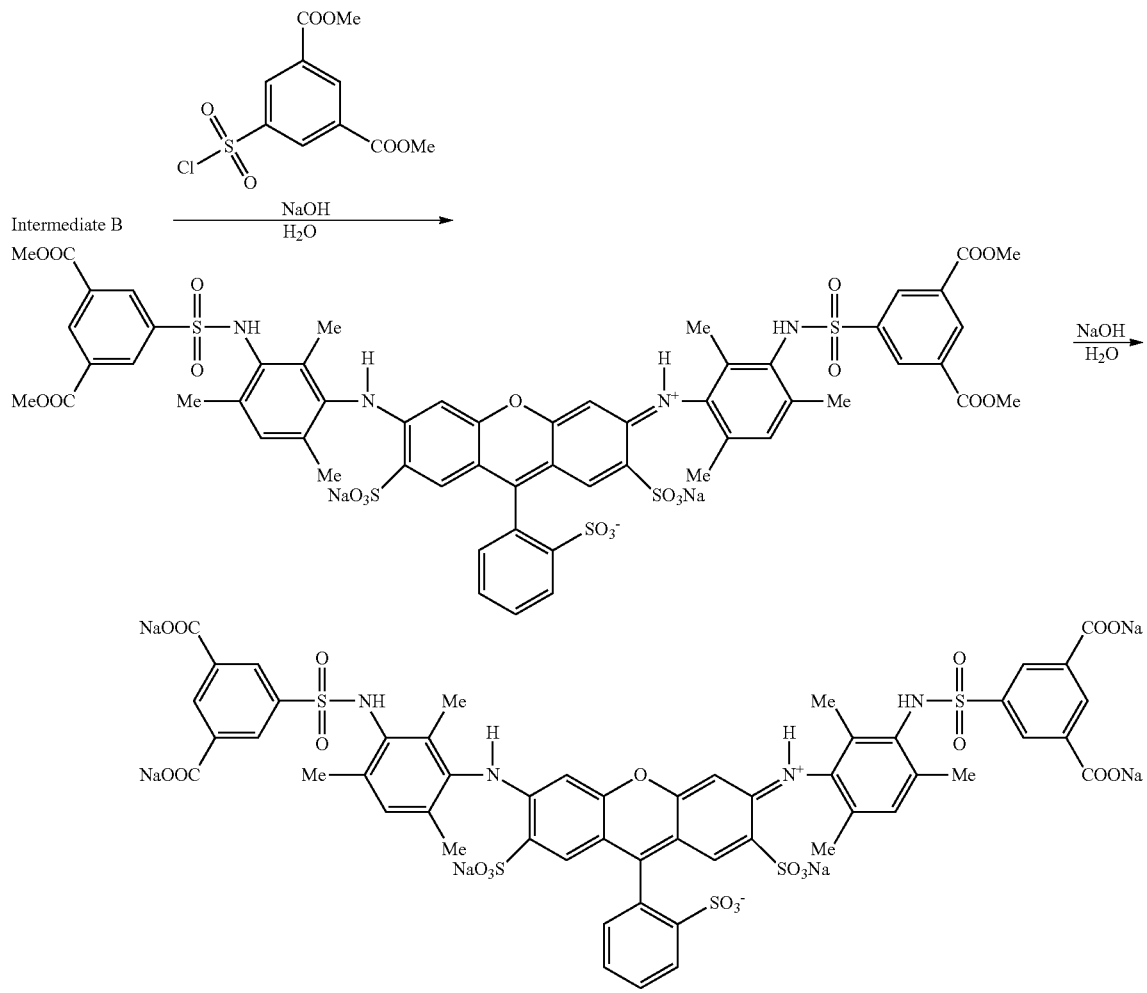

(Exemplary Compound 1-30)

3.0 g of the intermediate (B) obtained as the synthetic intermediate of the exemplary compound (1-11) described above was dissolved in 15 mL of ultrapure water. 2.2 g of powder of dimethyl 5-(chlorosulfonyl)isophthalate (synthesized using a method described in German Patent No. DE278091) was added, 10% NaOH aqueous solution was added dropwise such that the pH of the reaction solution was maintained at 5 to 7, and the dropwise addition was continued until the pH did not change. After completion of the reaction, 3 mL of 50% NaOH aqueous solution was added and stirred for 1 hour. The obtained reaction solution was poured into a large excess of ethanol and precipitated solid was separated by filtering. The obtained solid was dissolved in 20 m of a mixed solvent (water/methanol=1/1). Next, the obtained solution was purified by column chromatography (filler: SEPHADEX LH-20 (manufactured by Pharmacia), developing solvent: water/methanol). Next, an inorganic salt and a residual organic solvent were removed using a dialysis membrane (molecular weight cutoff: 3500, Spectra/Por 3 Dialysis Membrane (trade name, manufactured by Spectrum, Inc.)). The pH of the obtained aqueous solution was adjusted to 7 using a diluted sodium hydroxide aqueous solution, and dust was removed by filtration using a membrane filter. The obtained aqueous solution was condensed and dried using a rotary evaporator. As a result, green glossy crystals of the exemplary compound (1-30) were obtained.

Yield amount: 3.7 g
Yield: 70%
MS (m/z)=1247 ([M−1]−, 100%)

Figure 4:
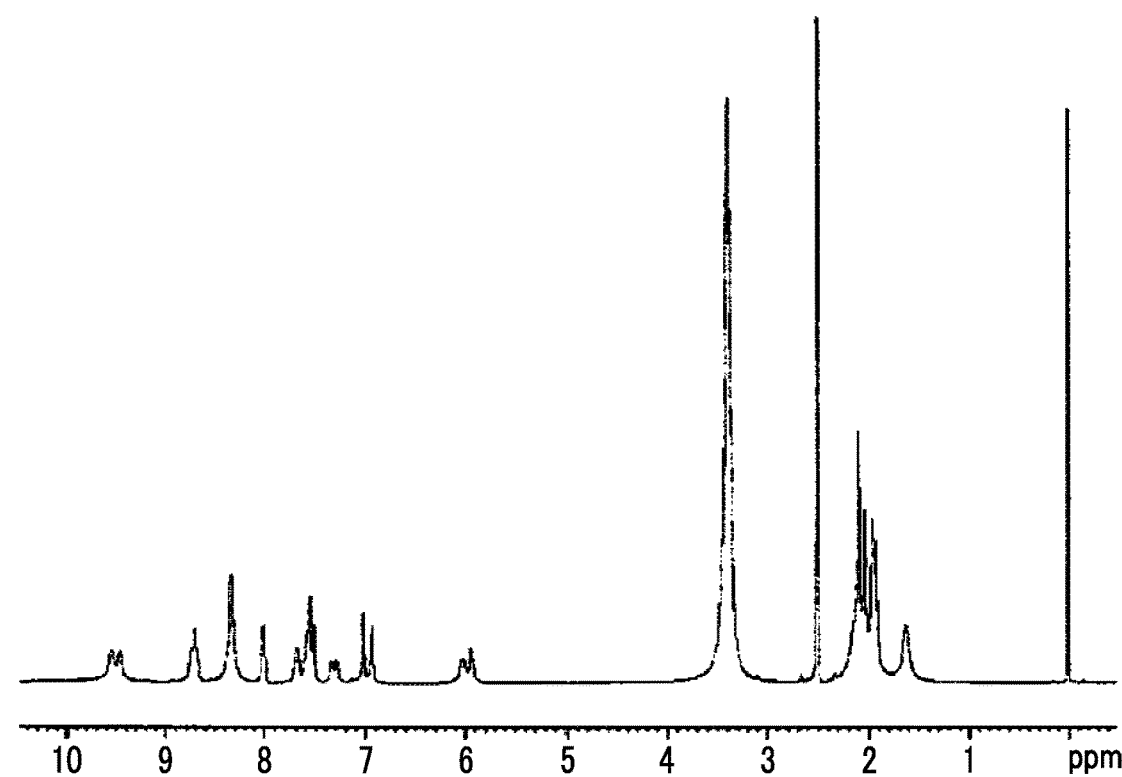
FIG. 4 is a diagram showing a ¹H-NMR spectrum of an exemplary compound (1-30) in dimethyl sulfoxide-d6.

In an absorption spectrum of Exemplary Compound (1-30) in the dilute aqueous solution, the absorption maximum was 532 nm, and the molar absorption coefficient was 82000. FIG. 4 is a diagram showing a $^1$H-NMR spectrum of the exemplary compound (1-30) in dimethyl sulfoxide-d6.

Other Exemplary Compounds can be synthesized using the above-described method.

Example 1

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, an ink jet recording ink 1 for magenta was prepared.

| | |
|---|---|
| Compound of Formula (1) (exemplary compound (1-11)) | 2.25 g |
| Compound 2-X | 0.25 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

(Compound 2-X)

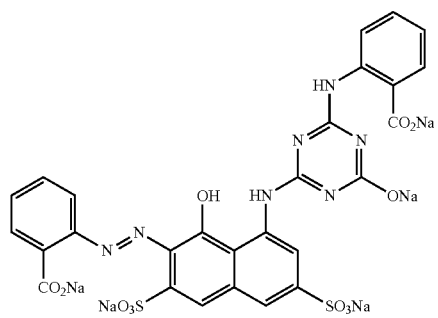

Example 2

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, an ink jet recording ink 2 for magenta was prepared.

| | |
|---|---|
| Compound of Formula (1) (exemplary compound (1-11)) | 2.25 g |
| Compound 2-X | 0.25 g |
| PROXEL XLII (preservative, manufactured by Lonza) | 0.11 g |
| Betaine-1 (betaine compound having the following structure) | 1.28 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

(Betaine-1)

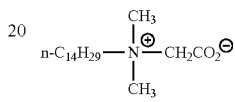

Example 3

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, an ink jet recording ink 3 for magenta was prepared.

| | |
|---|---|
| Compound of Formula (1) (exemplary compound (1-11)) | 2.25 g |
| Compound 2-X | 0.25 g |
| PROXEL XLII (preservative, manufactured by Lonza) | 0.11 g |
| Betaine-2 (betaine compound having the following structure) | 1.28 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

(Betaine-2)

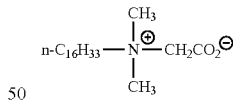

Example 4

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, an ink jet recording ink 4 for magenta was prepared.

| | |
|---|---|
| Compound of Formula (1) (exemplary compound (1-11)) | 2.00 g |
| Compound 2-X | 0.25 g |

-continued

| | |
|---|---|
| PROXEL XLII (preservative, manufactured by Lonza) | 0.11 g |
| Betaine-1 | 1.14 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Example 5

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, an ink jet recording ink 5 for magenta was prepared.

| | |
|---|---|
| Compound of Formula (1) (exemplary compound (1-11)) | 1.75 g |
| Compound 2-X | 0.25 g |
| PROXEL XLII (preservative, manufactured by Lonza) | 0.11 g |
| Betaine-1 | 1.00 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Example 6

An ink jet recording ink 6 was prepared through the same operation as in Example 2, except that the exemplary compound (1-18) was used instead of the exemplary compound (1-11).

Example 7

An ink jet recording ink 7 was prepared through the same operation as in Example 2, except that the exemplary compound (1-19) was used instead of the exemplary compound (1-11).

Example 8

An ink jet recording ink 8 was prepared through the same operation as in Example 2, except that the exemplary compound (1-20) was used instead of the exemplary compound (1-11).

Example 9

An ink jet recording ink 9 was prepared through the same operation as in Example 2, except that the exemplary compound (1-25) was used instead of the exemplary compound (1-11).

Example 10

An ink jet recording ink 10 was prepared through the same operation as in Example 1, except that the exemplary compound (1-26) was used instead of the exemplary compound (1-11).

Example 11

An ink jet recording ink 11 was prepared through the same operation as in Example 2, except that the exemplary compound (1-26) was used instead of the exemplary compound (1-11).

Example 12

An ink jet recording ink 12 was prepared through the same operation as in Example 2, except that the exemplary compound (1-29) was used instead of the exemplary compound (1-11).

Example 13

An ink jet recording ink 13 was prepared through the same operation as in Example 1, except that the exemplary compound (1-30) was used instead of the exemplary compound (1-11).

Example 14

An ink jet recording ink 14 was prepared through the same operation as in Example 2, except that the exemplary compound (1-30) was used instead of the exemplary compound (1-11).

Example 15

An ink jet recording ink 15 was prepared through the same operation as in Example 2, except that the exemplary compound (1-34) was used instead of the exemplary compound (1-11).

Example 16

An ink jet recording ink 16 was prepared through the same operation as in Example 1, except that the exemplary compound (1-35) was used instead of the exemplary compound (1-11).

Example 17

An ink jet recording ink 17 was prepared through the same operation as in Example 2, except that the exemplary compound (1-35) was used instead of the exemplary compound (1-11).

Example 18

An ink jet recording ink 18 was prepared through the same operation as in Example 1, except that the following compound 2-Y was used instead of the compound 2-X.

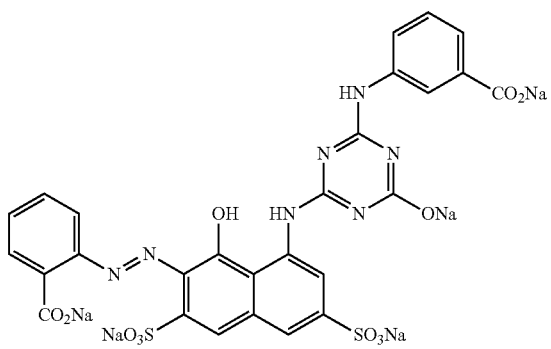

(Compound 2-Y)

Example 19

An ink jet recording ink 19 was prepared through the same operation as in Example 2, except that the compound 2-Y was used instead of the compound 2-X.

Example 20

An ink jet recording ink 20 was prepared through the same operation as in Example 2, except that the following compound 2-Z was used instead of the compound 2-X.

(Compound 2-Z)

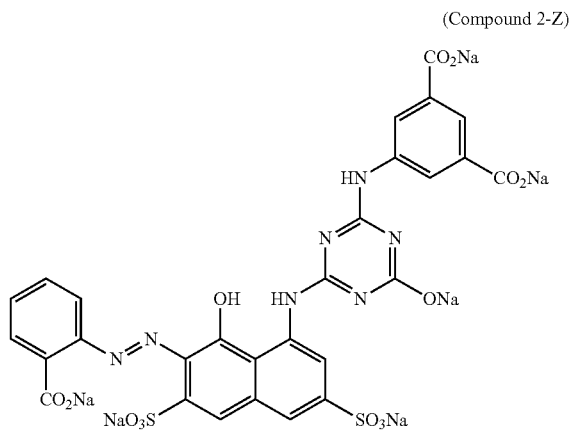

Example 21

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, an ink jet recording ink 21 for magenta was prepared.

| | |
|---|---|
| Compound of Formula (1) (exemplary compound (1-26)) | 2.00 g |
| Compound 2-X | 0.25 g |
| The following compound (compound X) | 0.75 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

(Compound X)

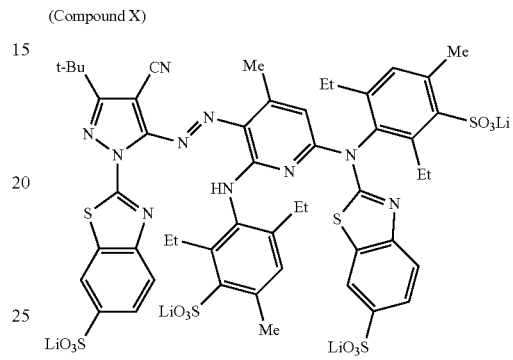

Example 22

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, an inkjet recording ink 22 for magenta was prepared.

| | |
|---|---|
| Compound of Formula (1) (exemplary compound (1-26)) | 2.00 g |
| Compound 2-X | 0.25 g |
| The following compound (compound Y) | 0.75 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

(Compound Y)

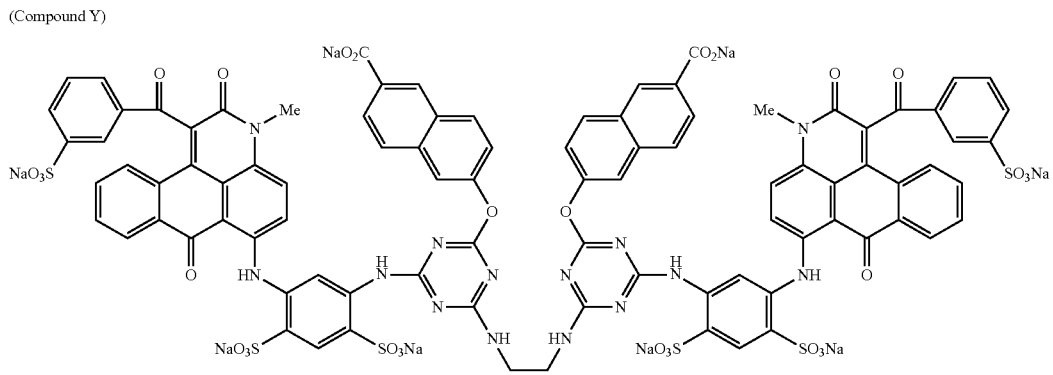

Example 23

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, an ink jet recording ink 23 for magenta was prepared.

| | |
|---|---|
| Compound of Formula (1) (exemplary compound (1-26)) | 2.00 g |
| Compound 2-X | 0.25 g |
| The following compound (compound Z) | 0.75 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

(Compound Z)

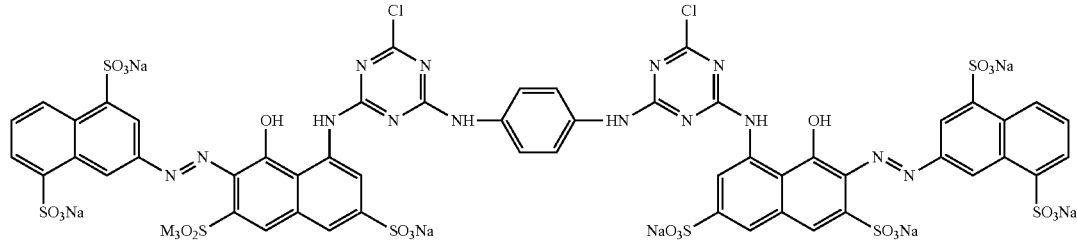

Example 24

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, an ink jet recording ink 24 for magenta was prepared.

| | |
|---|---|
| Compound of Formula (1) (exemplary compound (1-27)) | 2.25 g |
| Compound 2-X | 0.25 g |
| PROXEL XLII (preservative, manufactured by Lonza) | 0.11 g |
| Glycerin | 7.00 g |
| Ethylene urea | 7.00 g |
| 1,5-pentanediol | 7.00 g |
| 2-pyrrolidone | 5.00 g |
| SURFYNOL (manufactured by Air Products&Chemicals Inc.) | 0.50 g |

Example 25

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, an ink jet recording ink 25 for magenta was prepared.

| | |
|---|---|
| Compound of Formula (1) (exemplary compound (1-30)) | 2.25 g |
| Compound 2-X | 0.25 g |
| PROXEL XLII (preservative, manufactured by Lonza) | 0.11 g |
| Glycerin | 7.00 g |
| Ethylene urea | 7.00 g |
| 1,5-pentanediol | 7.00 g |
| 2-pyrrolidone | 5.00 g |
| SURFYNOL (manufactured by Air Products&Chemicals Inc.) | 0.50 g |

Comparative Example 1

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 1 for magenta was prepared.

| | |
|---|---|
| Compound 2-X | 2.50 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Comparative Example 2

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 2 for magenta was prepared.

| | |
|---|---|
| Compound 2-X | 2.50 g |
| PROXEL XLII (preservative, manufactured by Lonza) | 0.11 g |
| Betaine-1 | 1.43 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Comparative Example 3

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 3 for magenta was prepared.

| | |
|---|---|
| Compound of Formula (1) (exemplary compound (1-11)) | 1.00 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Comparative Example 4

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 4 for magenta was prepared.

| | |
|---|---|
| Compound 2-X | 1.00 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Comparative Example 5

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 5 for magenta was prepared.

| | |
|---|---|
| Compound 2-Y | 1.00 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Comparative Example 6

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 6 for magenta was prepared.

| | |
|---|---|
| Compound 2-Z | 1.00 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Comparative Example 7

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 7 for magenta was prepared.

| | |
|---|---|
| Comparative compound 1 | 2.00 g |
| Compound 2-X | 0.50 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Comparative Example 8

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 8 for magenta was prepared.

| | |
|---|---|
| Comparative compound 2 | 2.00 g |
| Compound 2-X | 0.50 g |
| PROXEL XLII (preservative, manufactured by Lonza) | 0.11 g |

-continued

| | |
|---|---|
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Comparative Example 9

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 9 for magenta was prepared.

| | |
|---|---|
| Comparative compound 3 | 2.00 g |
| Compound 2-X | 0.50 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Comparative Example 10

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 10 for magenta was prepared.

| | |
|---|---|
| Comparative compound 4 | 2.00 g |
| Compound 2-X | 0.50 g |
| PROXEL XLII (preservative, manufactured by Lonza) | 0.11 g |
| Glycerin | 10.00 g |
| Triethylene glycol | 2.00 g |
| Triethylene glycol monobutyl ether | 10.00 g |
| 2-pyrrolidone | 2.00 g |
| SURFYNOL (manufactured by Air Products&Chemicals Inc.) | 1.00 g |

Comparative Example 11

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 pun. As a result, a comparative ink jet recording ink 11 for magenta was prepared.

| | |
|---|---|
| Compound 2-X | 2.50 g |
| PROXEL XLII (preservative, manufactured by Lonza) | 0.11 g |
| Glycerin | 7.00 g |
| Ethylene urea | 7.00 g |
| 1,5-pentanediol | 7.00 g |
| 2-pyrrolidone | 5.00 g |
| SURFYNOL (manufactured by Air Products&Chemicals Inc.) | 0.50 g |

Comparative Example 12

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 12 for magenta was prepared.

| | |
|---|---|
| Comparative compound 1 | 2.00 g |
| Compound 2-X | 0.50 g |
| PROXEL XLII (preservative, manufactured by Lonza) | 0.11 g |
| Glycerin | 7.00 g |
| Ethylene urea | 7.00 g |
| 1,5-pentanediol | 7.00 g |
| 2-pyrrolidone | 5.00 g |
| SURFYNOL (manufactured by Air Products&Chemicals Inc.) | 0.50 g |

Comparative Example 13

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 13 for magenta was prepared.

| | |
|---|---|
| Comparative compound 2 | 2.00 g |
| Compound 2-X | 0.50 g |
| PROXEL XLII (preservative, manufactured by Lonza) | 0.11 g |
| Glycerin | 7.00 g |
| Ethylene urea | 7.00 g |
| 1,5-pentanediol | 7.00 g |
| 2-pyrrolidone | 5.00 g |
| SURFYNOL (manufactured by Air Products&Chemicals Inc.) | 0.50 g |

Comparative Example 14

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 14 for magenta was prepared.

| | |
|---|---|
| Comparative compound 3 | 2.00 g |
| Compound 2-X | 0.50 g |

| | |
|---|---|
| PROXEL XLII (preservative, manufactured by Lonza) | 0.11 g |
| Glycerin | 7.00 g |
| Ethylene urea | 7.00 g |
| 1,5-pentanediol | 7.00 g |
| 2-pyrrolidone | 5.00 g |
| SURFYNOL (manufactured by Air Products&Chemicals Inc.) | 0.50 g |

Comparative Example 15

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 15 for magenta was prepared.

| | |
|---|---|
| Comparative compound 4 | 2.00 g |
| Compound 2-X | 1.00 g |
| PROXEL XLII (preservative, manufactured by Lonza) | 0.11 g |
| Glycerin | 7.00 g |
| Ethylene urea | 7.00 g |
| 1,5-pentanediol | 7.00 g |
| 2-pyrrolidone | 5.00 g |
| SURFYNOL (manufactured by Air Products&Chemicals Inc.) | 0.50 g |

Comparative Example 16

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 16 for magenta was prepared.

| | |
|---|---|
| Comparative compound 5 | 2.00 g |
| Compound 2-X | 1.00 g |
| PROXEL XLII (preservative, manufactured by Lonza) | 0.11 g |
| Glycerin | 7.00 g |
| Ethylene urea | 7.00 g |
| 1,5-pentanediol | 7.00 g |
| 2-pyrrolidone | 5.00 g |
| SURFYNOL (manufactured by Air Products&Chemicals Inc.) | 0.50 g |

Comparative Example 17

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 17 for magenta was prepared.

| | |
|---|---|
| Comparative compound 3 | 5.00 g |
| Compound 2-X | 2.00 g |
| PROXEL XLII (preservative, manufactured by Lonza) | 0.11 g |
| Glycerin | 7.00 g |
| Ethylene urea | 7.00 g |
| 1,5-pentanediol | 7.00 g |
| 2-pyrrolidone | 5.00 g |
| SURFYNOL (manufactured by Air Products&Chemicals Inc.) | 0.50 g |

Comparative Example 18

Deionized water was added to the following components such that the balance was 100 g, and the components were stirred for 1 hour while heating them at 30° C. to 40° C. Next, the pH of the solution was adjusted to 8.5 using 10 mol/L of sodium hydroxide aqueous solution, and the obtained solution was filtered under reduced pressure through a microfilter having an average pore size of 0.20 μm. As a result, a comparative ink jet recording ink 18 for magenta was prepared.

| | |
|---|---|
| Comparative compound 3 | 8.00 g |
| PROXEL XLII (preservative, manufactured by Lonza) | 0.11 g |
| Glycerin | 7.00 g |
| Ethylene urea | 7.00 g |
| 1,5-pentanediol | 7.00 g |
| 2-pyrrolidone | 5.00 g |
| SURFYNOL (manufactured by Air Products&Chemicals Inc.) | 0.50 g |

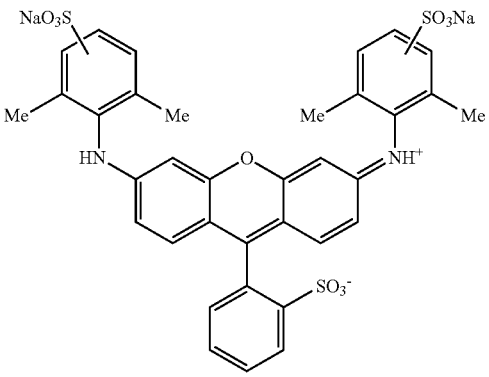

(Comparative Compound 1)

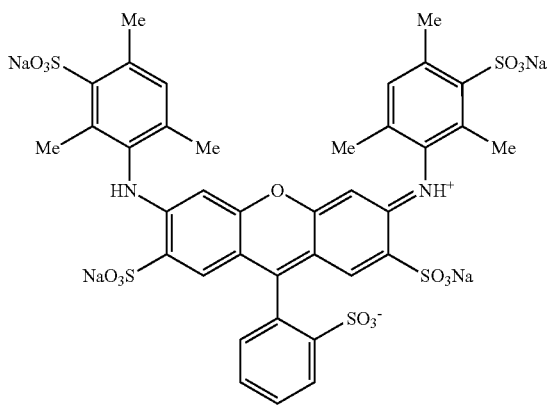

(Comparative Compound 2)

-continued (Comparative Compound 3)

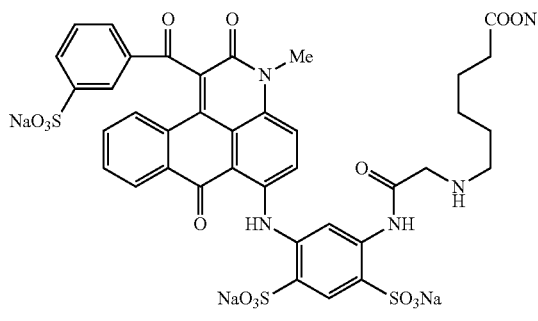

(Comparative Compound 4)

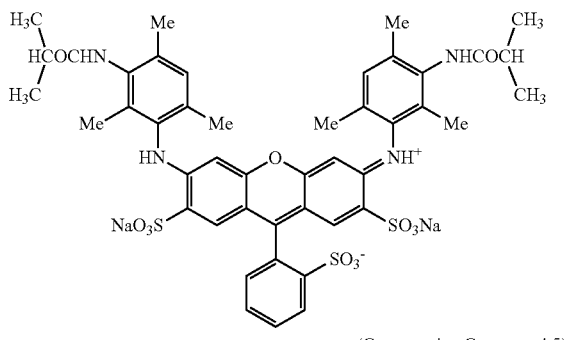

(Comparative Compound 5)

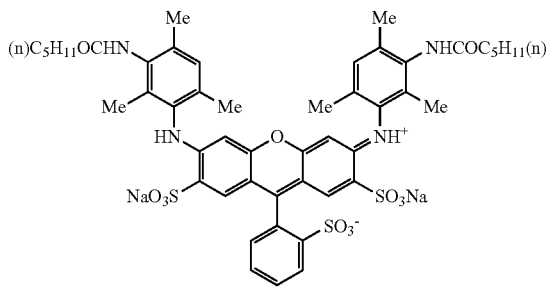

(Image Formation and Evaluation)

Using each of the ink jet recording inks prepared as described above, an image was formed and was evaluated as described below. In each of Examples and Comparative Examples, an image was formed and evaluated using a combination of an ink jet printer and a recording paper shown below.

The ink jet recording inks 1 to 23 according to Examples and the comparative ink jet recording inks 1 to 10 according to Comparative Examples were evaluated as follows. The results are shown in Tables 1 and 2 below. Tables 1 and 2 show the results of the respective evaluations performed after filling an ink cartridge with each of the ink jet recording inks and recording an image on photographic paper ("KOUTAKU", manufactured by Seiko Epson Corporation) using an ink jet printer (PM-700C, manufactured by Seiko Epson Corporation)

The ink jet recording inks 24 and 25 according to Examples and the comparative ink jet recording inks 11 to 18 according to Comparative Examples were evaluated as follows. The results are shown in Tables 1 and 2 below. Tables 1 and 2 show the results of the respective evaluations performed after filling an ink cartridge with each of the ink jet recording inks and recording an image on photographic paper (photo glossy paper PT-201, manufactured by Canon Corporation) using an ink jet printer (PIXUS Pro 9000 Mk II, manufactured by Canon Corporation).

<Color>

In a case where the color of a printed sample was determined by visual inspection, a sample having a color of pure magenta was evaluated as "A", a sample having a color of reddish magenta was evaluated as "B", and a sample having a color of reddish violet was evaluated as "C".

<Saturation>

The saturation (C*) of a printed material was calculated according to the following expression based on measurement of color characteristics. Using a reflection densitometer (trade name: X-Rite 310TR, manufactured by X-Rite Inc.), the lightness L* and the chromaticity a* and b* of a printed image portion at an applied voltage of 50% were measured according to the CIE L*a*b* color system (International Commission on Illumination (1976) or JIS (Japanese Industrial Standards) Z8781-4:2013)). The saturation (C*) was obtained from the obtained values according to the following calculation expression and was evaluated based on the following evaluation criteria.

$$\text{Saturation } (C^*) = (a^{*2} + b^{*2})^{1/2}$$

A: C* was 90 or higher
B: C* was 80 or higher and lower than 90
C: C* was lower than 80

<Printing Density>

Using the above-described combination of the ink jet printer and the recording paper and each of the ink jet recording inks, a solid image (printed image at an applied voltage of 100%) was formed.

The printing density of the formed solid image was measured using a reflection densitometer (trade name: X-Rite 310 TR, manufactured by X-Rite Inc.). A solid image having a printing density of 2.0 or higher was evaluated as "A", a solid image having a printing density of 1.8 or higher and lower than 2.0 was evaluated as "B", a solid image having a printing density of 1.7 or higher and lower than 1.8 was evaluated as "C", and a solid image having a printing density of lower than 1.7 was evaluated as "D".

<Light Fastness>

Immediately after the formation of the solid image, an image density Ci was measured. Next, the image was irradiated with xenon light (100000 lux) for 28 hours using a weather meter (ATLAS C.165), and then an image density Cf1 was measured again. Based on the image density values before and after the irradiation of the xenon light, a coloring agent residue rate was calculated and evaluated. The image density was measured using a reflection densitometer (trade name: X-Rite 310TR, manufactured by X-rite). The coloring agent residue rate was measured in an image portion where the initial image density was 1.0±0.2.

The coloring agent residue rate was obtained according to the following expression, and light fastness was evaluated based on the following evaluation criteria.

$$\text{Coloring Agent Residue Rate } (\%) = (Cf1/Ci) \times 100$$

A: the coloring agent residue rate was 90% or higher and lower than 95%
B: the coloring agent residue rate was 80% or higher and lower than 90%
C: the coloring agent residue rate was lower than 80%

<Ozone Fastness>

A 5 kV alternating current voltage was applied while causing dry air to flow through the inside of a double glass tube of an ozonizer (manufactured by Siemens AG). The recording paper on which the image was formed was left to stand for 3 days in a box having an ozone gas concentration of 5±0.1 ppm that was set in a dark place at room temperature (20° C.) using the ozonizer. Next, the image density was measured using a reflection densitometer (trade name: X-Rite 310TR, manufactured by X-rite) before and after leaving the recording paper to stand in ozone gas. Based on an initial image density Ci and an image density Cf2 measured after leaving the recording paper to stand in ozone gas, a coloring agent residue rate was calculated and evaluated. The coloring agent residue rate was measured in an image portion where the initial image density was 1.0±0.2. The ozone gas concentration in the box was set using an ozone gas monitor (Mode: OZG-EM-01, manufactured by Applics Corporation).

The coloring agent residue rate was obtained according to the following expression, and ozone fastness was evaluated based on the following evaluation criteria.

Coloring Agent Residue Rate (%)=(Cf2/Ci)×100

A: the coloring agent residue rate was 85% or higher and lower than 90%

B: the coloring agent residue rate was 80% or higher and lower than 85%

C: the coloring agent residue rate was lower than 80%

<Moisture Resistance>

Regarding image blurring under high-humidity conditions, a 3 cm×3 cm printing pattern was prepared by disposing 1 mm×1 mm magenta squares such that 0.5 mm white spaces were formed between the squares. After storing this image sample under conditions of 45° C. and a relative humidity of 80% for 7 days, the blurring of the magenta dye was observed in the white spaces.

Specifically, the OD value of the printed material before (immediately before printing) the exposure to the conditions (conditions of 45° C. and a relative humidity of 80%) and the OD value of the printed material after the storage under the conditions for 7 days were measured using a reflection densitometer "Spectrilino" (trade name, manufactured by Gretag Macbeth GmbH), and an increase in the magenta density of the white space after the storage under the conditions for 7 days from the magenta density immediately after the printing was measured in a green filter of Status A. A case where the measured value was lower than 0.02 was evaluated as "A", a case where the measured value was 0.02 or higher and lower than 0.05 was evaluated as "B", a case where the measured value was 0.05 or higher and lower than 0.10 was evaluated as "C", and a case where the measured value was 0.10 or higher was evaluated as "D".

<Jetting Stability>

First, immediately after the preparation of each of the ink jet recording inks, the ink jetted from all the nozzles of the ink jet printer was observed using the combination of the ink jet printer and the recording paper. Next, printing was performed on 100 pieces for each of the recording papers, and the following evaluation was performed based on the following criteria. In all the Examples and Comparative Examples, the evaluation results were "A". The size of the recording paper used was A4.

Next, each of the ink jet recording inks was stored under conditions of 40° C. and a relative humidity of 80% for 2 weeks, and then each of the ink jet recording inks jetted from all the nozzles of the ink jet printer was observed using the combination of the ink jet printer and the recording paper (the size of the recording paper was A4). Next, printing was performed on 100 pieces for each of the recording papers, and jetting stability was evaluated based on the following criteria.

The results are shown in Tables 1 and 2 below.

A: Substantially no irregularities of characters was found from the start to the end of printing B: irregularities of characters were found on some pieces of the recording paper C: irregularities of characters were found was found from the start to the end of printing

TABLE 1

| | Color | Saturation | Printing Density | Light Fastness | Ozone Fastness | Moisture Resistance | Jetting Stability |
|---|---|---|---|---|---|---|---|
| Example 1 | A | A | A | A | A | B | A |
| Example 2 | A | A | A | A | A | A | A |
| Example 3 | A | A | A | A | A | A | A |
| Example 4 | A | A | A | B | B | A | A |
| Example 5 | A | A | A | B | B | B | A |
| Example 6 | A | A | A | A | A | A | A |
| Example 7 | A | A | A | A | A | A | A |
| Example 8 | A | A | A | A | A | A | A |
| Example 9 | A | A | A | A | A | A | A |
| Example 10 | A | A | A | A | A | B | A |
| Example 11 | A | A | A | A | A | A | A |
| Example 12 | A | A | A | A | A | A | A |
| Example 13 | A | A | A | A | A | B | A |
| Example 14 | A | A | A | A | A | A | A |
| Example 15 | A | A | A | A | A | A | A |
| Example 16 | A | A | A | A | A | B | A |
| Example 17 | A | A | A | A | A | A | A |
| Example 18 | A | A | A | A | A | B | A |
| Example 19 | A | A | A | A | A | A | A |
| Example 20 | A | A | A | A | A | A | A |
| Example 21 | B | A | A | A | A | A | A |
| Example 22 | C | A | B | B | B | A | A |
| Example 23 | B | A | A | B | B | B | A |
| Example 24 | A | A | A | A | A | A | A |
| Example 25 | A | A | A | A | A | A | A |

TABLE 2

| | Color | Saturation | Printing Density | Light Fastness | Ozone Fastness | Moisture Resistance | Jetting Stability |
|---|---|---|---|---|---|---|---|
| Comparative Example 1 | B | B | B | C | C | C | A |
| Comparative Example 2 | A | B | B | C | C | B | A |
| Comparative Example 3 | A | A | C | A | A | B | A |
| Comparative Example 4 | B | B | C | C | C | C | A |
| Comparative Example 5 | B | B | C | C | C | C | A |
| Comparative Example 6 | B | B | C | C | C | B | A |
| Comparative Example 7 | A | A | A | C | C | C | A |
| Comparative Example 8 | A | A | A | C | B | C | A |
| Comparative Example 9 | C | B | C | C | B | C | A |
| Comparative Example 10 | A | A | A | B | B | C | A |
| Comparative Example 11 | B | B | B | C | C | C | A |
| Comparative Example 12 | A | A | A | C | C | C | A |
| Comparative Example 13 | A | A | A | C | B | C | A |
| Comparative Example 14 | C | B | C | C | C | B | A |
| Comparative Example 15 | B | B | B | B | B | C | A |
| Comparative Example 16 | A | B | B | B | B | C | A |

TABLE 2-continued

| | Col-or | Satu-ration | Print-ing Density | Light Fast-ness | Ozone Fast-ness | Moisture Resist-ance | Jetting Stabil-ity |
|---|---|---|---|---|---|---|---|
| Comparative Example 17 | C | B | B | C | C | C | B |
| Comparative Example 18 | C | B | A | B | B | B | C |

As can be seen from the results of Tables 1 and 2, each of the ink jet recording inks according to Examples were excellent in all the evaluations of color, saturation, adhesion (printing density), light fastness, ozone fastness, moisture resistance, and jetting stability in an ink jet printer.

INDUSTRIAL APPLICABILITY

According to the present invention, it is possible to provide: a coloring composition with which an image having excellent color, saturation, and adhesion (printing density) and having excellent light fastness, ozone fastness, and moisture resistance can be formed and that has excellent jetting stability in an ink jet printer; an ink jet recording ink including the coloring composition; an ink jet recording method using the ink jet recording ink; and an ink jet printer cartridge that is filled with the ink jet recording ink.

The present invention has been described in detail with reference to the specific embodiment. However, it is obvious to those skilled in the art that various modifications and changes can be made within a range not departing from the scope of the present invention.

What is claimed is:

1. A coloring composition comprising:
a compound represented by the following Formula (1); and
a compound represented by the following Formula (D),

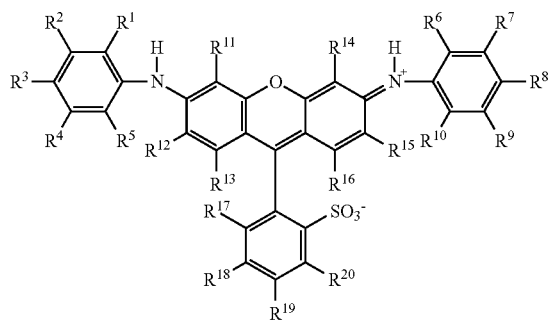

Formula (1)

in Formula (1), $R^1$, $R^5$, $R^6$, and $R^{10}$ each independently represent an alkyl group, $R^4$, $R^9$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent, $R^2$, $R^3$, $R^7$, and $R^8$ each independently represent a hydrogen atom, an alkyl group, or a substituent represented by the following Formula (A), and at least one of $R^2$, $R^3$, $R^7$, or $R^8$ represents a substituent represented by the following Formula (A),

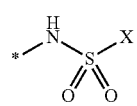

Formula (A)

in Formula (A), X represents a substituent represented by the following Formula (X1), (X2), or (X3), and

* represents a direct bond to a benzene ring,

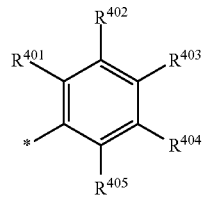

Formula (X1)

in Formula (X1), $R^{401}$, $R^{402}$, $R^{403}$, $R^{404}$, and $R^{405}$ each independently represent a hydrogen atom or a substituent, $R^{401}$, $R^{402}$, $R^{403}$, $R^{404}$, and $R^{405}$ satisfy the following condition (i) or (ii),

* represents a direct bond to a sulfur atom, the condition (i): at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group, and the condition (ii): at least two of $R^{401}$, $R^{402}$, $R^{403}$, $R^{404}$, or $R^{405}$ represent a carboxyl group,

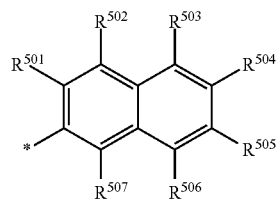

Formula (X2)

in Formula (X2), $R^{501}$, $R^{502}$, $R^{503}$, $R^{504}$, $R^{505}$, $R^{506}$, and $R^{507}$ each independently represent a hydrogen atom or a substituent, $R^{501}$, $R^{502}$, $R^{503}$, $R^{504}$, $R^{505}$, $R^{506}$, and $R^{507}$ satisfy the following condition (iii) or (iv),

* represents a direct bond to a sulfur atom, the condition (iii): at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group, and the condition (iv): at least two of $R^{501}$, $R^{502}$, $R^{503}$, $R^{504}$, $R^{505}$, $R^{506}$, or $R^{507}$ represent a carboxyl group,

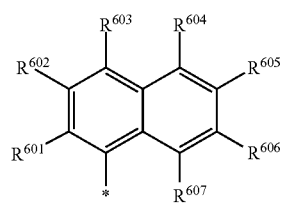

Formula (X3)

in Formula (X3), $R^{601}$, $R^{602}$, $R^{603}$, $R^{604}$, $R^{605}$, $R^{606}$, and $R^{607}$ each independently represent a hydrogen atom or a substituent, $R^{601}$, $R^{602}$, $R^{603}$, $R^{604}$, $R^{605}$, $R^{606}$, and $R^{607}$ satisfy the following condition (v) or (iv),

* represents a direct bond to a sulfur atom, the condition (v): at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group, and the condition (vi): at least two of $R^{601}$, $R^{602}$, $R^{603}$, $R^{604}$, $R^{605}$, $R^{606}$, or $R^{607}$ represent a carboxyl group, Formula (D)

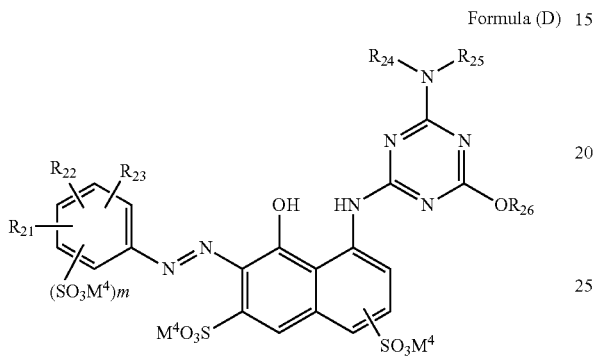

in Formula (D), $R_{21}$, $R_{22}$, and $R_{23}$ each independently represent a hydrogen atom, a substituted or unsubstituted alkyl group having 1 to 9 carbon atoms, an alkoxy group having 1 to 9 carbon atoms, a halogen atom, a hydroxyl group, a substituted or unsubstituted carbamoyl group, a substituted or unsubstituted sulfamoyl group, a substituted or unsubstituted amino group, a nitro group, a sulfonate group, a substituted or unsubstituted alkylsulfonyl group having 1 to 9 carbon atoms, an arylsulfonyl group having 6 to 15 carbon atoms, a carboxyl group, or a carboxylate group, m represents 0, 1, or 2, $R_{24}$, $R_{25}$, and $R_{26}$ each independently represent a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group, or a substituted or unsubstituted heterocyclic group, $M^4$ represents a hydrogen atom or a counter cation, and $M^4$'s may be the same as or different from each other.

2. The coloring composition according to claim 1, wherein X in Formula (A) represents a substituent represented by Formula (X1), and $R^{401}$, $R^{402}$, $R^{403}$, $R^{404}$, and $R^{405}$ in Formula (X1) satisfy the condition (i).

3. The coloring composition according to claim 1, wherein X in Formula (A) represents a substituent represented by Formula (X2), and $R^{501}$, $R^{502}$, $R^{503}$, $R^{504}$, $R^{505}$, $R^{506}$, and $R^{507}$ in Formula (X2) satisfy the condition (iii).

4. The coloring composition according to claim 1, wherein X in Formula (A) represents a substituent represented by Formula (X3), and $R^{601}$, $R^{602}$, $R^{603}$, $R^{604}$, $R^{605}$, $R^{606}$, and $R^{607}$ in Formula (X3) satisfy the condition (v).

5. The coloring composition according to claim 1, wherein a total content of the compound represented by Formula (1) and the compound represented by Formula (D) is 5.0 mass % or lower with respect to the coloring composition.

6. The coloring composition according to claim 1, wherein a mass ratio $W_1/W_D$ of a content $W_1$ of the compound represented by Formula (1) to a content $W_D$ of the compound represented by Formula (D) is 99/1 to 50/50.

7. The coloring composition according to claim 1, further comprising a coloring material other than the compound represented by Formula (1) and the compound represented by Formula (D).

8. An ink jet recording ink comprising the coloring composition according to claim 1.

9. An ink jet recording method using the ink jet recording ink according to claim 8.

10. An ink jet printer cartridge that is filled with the ink jet recording ink according to claim 8.

11. The coloring composition according to claim 1, wherein the mass ratio $W_1/W_D$ of the content $W_1$ of the compound represented by Formula (1) to the content $W_D$ of the compound represented by Formula (D) is 99/1 to 60/40.

* * * * *